(12) United States Patent
Federighi et al.

(10) Patent No.: US 6,604,109 B1
(45) Date of Patent: Aug. 5, 2003

(54) OBJECT GRAPH EDITING CONTEXT AND METHODS OF USE

(75) Inventors: Craig Federighi, Mountain View, CA (US); Dan Willhite, San Francisco, CA (US); Eric Noyau, Mountain View, CA (US)

(73) Assignee: Next Software, Inc., Redwood City, CA (US)

( * ) Notice: Subject to any disclaimer, the term of this patent is extended or adjusted under 35 U.S.C. 154(b) by 389 days.

(21) Appl. No.: 09/607,870

(22) Filed: Jun. 30, 2000

Related U.S. Application Data

(63) Continuation of application No. 09/167,522, filed on Oct. 6, 1998, now Pat. No. 6,085,197, which is a continuation of application No. 08/682,198, filed on Jul. 17, 1996, now Pat. No. 5,956,728.

(51) Int. Cl.$^7$ ............................................. G06F 17/00

(52) U.S. Cl. .................... 707/102; 707/103 R; 707/203

(58) Field of Search ............. 707/1–206; 709/100–332; 717/174; 382/203

(56) References Cited

U.S. PATENT DOCUMENTS

| | | | | |
|---|---|---|---|---|
| 6,307,964 B1 | * | 10/2001 | Lin et al. ..................... | 382/203 |
| 6,400,846 B1 | * | 6/2002 | Lin et al. ..................... | 382/203 |
| 6,490,722 B1 | * | 12/2002 | Barton et al. ................ | 717/174 |

OTHER PUBLICATIONS

Potter et al., "The ins and outs of objects", Software Engineering Conference, 1998, Proceedings, 1998 Australian, Nov. 9–13, 1998, pp. 80–89.*

Hill et al., "Visualising the structure of object–oriented systems", Visual languages, 2000, Proceedings. 2000 IEEE International Symposium on, 2000, pp. 191–198.*

Frohlich et al., "Interactive analysis of object architectures", Technology of Object–Oriented Languages and Systems, 1997, TOOLS 25, Proceedings, Nov. 24–28, 1997, pp. 252–266.*

* cited by examiner

*Primary Examiner*—David Jung
(74) *Attorney, Agent, or Firm*—The Hecker Law Group

(57) ABSTRACT

The present invention comprises a novel system for managing changes to a graph of data bearing objects. In one embodiment, an object graph manager object referred to as an editing context is used to identify changes made to data bearing enterprise objects and to notify other interested objects when changes occur. As a result, data bearing objects need not themselves contain code necessary for monitoring changes. In another embodiment of the invention, the editing context is used to provide event-based "undo" capabilities. In another embodiment of the invention, each enterprise object has a primary key that is used to maintain the identification between an enterprise object instance and a corresponding database row. In another embodiment of the invention, multiple levels of editing contexts are used to provide multiple isolated object graphs, each of which allows independent manipulation of the underlying data bearing objects.

18 Claims, 12 Drawing Sheets

OBJECT GRAPH EDITING CONTEXT AND METHODS OF USE

This is a continuation of application Ser. No. 09/167,522 filed Oct. 6, 1998 now U.S. Pat. No. 6,085,197 which is a continuation of application Ser. No. 08/682,198 filed Jul. 17, 1996 now U.S. Pat. No. 5,056,728.

BACKGROUND OF THE INVENTION

1. Field of the Invention

The present invention relates to the field of object oriented application programming environments, particularly for applications accessing databases.

2. Background Art

Object oriented programming languages are non-procedural programming languages in which program elements are viewed as objects that can pass messages to each other. An object includes its own data and programming code and is internally self-reliant. The programming code of an object includes procedures or methods. The methods of an object are invoked by messages received from another object. Each object is an instance of an object class. The properties of the objects in a class are defined by a class definition. A class definition may utilize a hierarchical class structure in which objects in the class inherit properties of a parent class in addition to properties explicitly defined for the class. This inheritance property allows code for object classes to be customized for reuse in different applications, facilitating the sharing of programming code between different programs.

To write an application program in an object oriented programming language, a programmer identifies the real-world objects of a problem, the data and processing requirements of those objects, and the communications needed between the objects, and encapsulates these in class definitions. This process is simplified by taking advantage of the inheritance property of object classes by basing the class definitions to the extent possible on preexisting object classes.

Objects are assembled in a modular fashion to create applications. Objects call on other objects to perform operations or procedures by sending appropriatemessages. An appropriate message is a message to which the receiving object can respond. The sending object must therefore know the type of functions that a receiving object can perform and be able to generate the corresponding message that will invoke the desired operation. The sending object must also be prepared to accept and process any resulting response.

Although objects are generally internally self-reliant, and can therefore be viewed as modules that can be assembled with other objects into a variety of application programs, the simple assembling of objects does not create a functional program. The objects must also be able to properly interact and intercommunicate with each other. Although objects represent reusable code, additional code must be written to provide for the generation of appropriate outgoing messages and for processing and responding to incoming messages.

One type of application program that is commonly used in business is a database application program. A database application program is a program that manipulates data stored in a database. The database is often managed by a separate program, called a database management program, which has the ability to respond to requests to store, retrieve, search for, extract and update data in the database. In order to access data in the database, the database application program must generate appropriate database requests to the database management program.

There are many types of database structures and many kinds of database management programs. In order to be able to access a particular database, a database application program must know the structure of the database and the syntax used by the database management program. As these can vary from one database to another, a single database application program cannot generally be used with different databases. Instead, separate versions of a database application program are needed to deal with different databases and different database management programs.

Two types of database structures are flat file databases and relational databases.

A flat file database can be viewed as a single large table having a number of rows and a number of columns. Each row ("record") corresponds to a particular entity, and each column of that row ("field") corresponds to a particular attribute of that entity. For example, an employee database may contain information about employees, including name, address, social security number, salary, department, etc. Each row would correspond to a particular employee. Separate columns would correspond to name, address, social security number, salary, department, etc., respectively. One of the columns contains an entry that uniquely identifies each row. This entry is often called the "primary key". For the employee database example, the primary key might be the employee's name, the social security number, or an index number generated by the database management program. To find the salary for Jane Doe in the employee database, for example, one would look in the row corresponding to Jane Doe, and read off the salary in the salary column. In a flat file, the only data available about an entity is the information contained in the row corresponding to the entity, that is, only the information for which there is a column, or "field", in the table.

In a relational database, information in one table may be related to information in other tables. For example, a company database may include an employee name and address table that contains a row for each employee, with fields for the name and address of each employee in each row. The database may also contain a departmental table that contains a row for each department, with each row containing a department ID field as well as fields for the names of all employees in the department. The departmental table may be linked to the employee name and address table by including a field for the department ID in the employee name and address table. This department ID, called a "foreign key", may be viewed as a pointer from the employee name and address table to the departmental table, indicating where additional related data may be found.

An example of a database application program that might use the relational database described in the preceding paragraph is an application that compiles the names and addresses of all employees of a particular department. This application might operate as follows. First, the application program requests the database management program to extract the names of all employees in the department in question from the departmental table. To do so, the application program needs to know the structure of the departmental table, and needs to formulate the request in the specific syntax of the database management program. Then, for each employee name obtained, the application program requests the corresponding address from the employee name and address table. Again, the application program must know the structure of the name and address table and needs to formulate the request, or in this case the series of requests, one for each employee name, in the correct syntax. The application program then needs to assemble the received data into a coherent form and display it to a user. The application program for even this simple function is complicated: the program must know about the structure of the tables in the database, must be able to generate a variety of database requests in the particular syntax of the database management program, must be able to process the data received, and must be able to assemble the data and display it on a user interface.

Database application program writing may be simplified by using object oriented programming techniques. Objects can be constructed that perform input and output functions such as requesting data from a database manager program or displaying data on a user interface. An application program therefore need not be provided with code for handling these lower level functions. The application program can let appropriate objects take care of these and other requirements. Writing the application program is simplified.

Object oriented programming environments provide tools to programmers such as predefined object classes that can simplify the building of applications.

One prior art set of tools and resources for an object oriented programming environment that can be used to build database applications is Enterprise Objects Framework 1x (™), a set of tools and resources for the NEXTSTEP (™) object oriented programming environment from NeXT Computer, Inc.

The architecture and data flow of an Enterprise Objects Framework 1x application is shown in FIG. 1. In the application shown in FIG. 1, data flows from a relational database 100 to a user interface 160, and vice versa, via a number of intervening modules and levels. Each of the blocks shown in FIG. 1 constitutes a portion of the overall application program and may be made up of one or more objects.

The flow of data from the relational database 100 to user interface 160 proceeds as follows. Data in the form of rows of data from relational database 100 are retrieved from relational database 100 to an adaptor level 110, using well-known relational database access techniques. At adaptor level 110, the raw data received from relational database 100 is packaged into "dictionary objects." Dictionary objects contain key-value pairs: each key typically represents the name of a database column, and the key's value corresponds to the data for the column of the particular row that was read from relational database 300. As shown in FIG. 1, data in the form of these dictionary objects is passed from adaptor level 110 to database level 120.

Database level 120 creates "enterprise objects" from the dictionary objects. Enterprise objects are like other objects used in object oriented programming languages in that they couple data with methods for operating on that data. However, under Enterprise Objects Framework 1x, an enterprise object has certain characteristics that distinguish it from other object classes. An enterprise object has properties that map to stored data, and an instance of an enterprise object typically corresponds to a single row or record in a database. Further, an enterprise object knows how to interact with other parts of the Enterprise Object Framework to give and receive values for its properties. The ingredients that make up an enterprise object are its class definition and the data values for the row or record to which it corresponds. The enterprise object also contains pointers to other enterprise objects created from rows of related database tables.

These other enterprise objects typically contain yet other pointers to other related objects. The entire set of enterprise objects used by an application program thus forms an interconnected graph of data bearing enterprise objects. This graph constitutes a particular view of the underlying database.

The enterprise objects created at database level 120 are passed from database level 120 to data source 130. Data source 130 is an object that has the ability to fetch, insert, update and delete enterprise objects. As such it is both a source and a sink for enterprise objects. Changes made by data source 130 to an enterprise object are passed down via database level 120 and adaptor level 110 to relational database 100 so that a corresponding change is made to the database for a change made to an enterprise object. The data source 130 does not know the structure of the underlying database. Those details are taken care of by adaptor level 110. Accordingly, as long as the appropriate adaptor 110 is used, the same data source 130 can be used for a variety of different databases.

Data source 130 supplies enterprise objects created at database level 120 to controller 140. As shown in FIG. 1, controller 140 transports data in the form of values from the enterprise objects to user interface 160 via association objects 150. Controller 140 coordinates the values displayed in the user interface with the corresponding enterprise object values. When enterprise objects are modified in the user interface, controller 140 tells data source 130, which is responsible for propagating changes to relational database 100.

In Enterprise Objects Framework 1x, changes to enterprise objects must be made by editing values in the user interface or by using the controller method "setValues:for Object:." Because enterprise objects typically include the business logic needed for the application, it would be useful if enterprise objects could be worked on by an application program in the same way most objects are worked on: i.e. by sending an enterprise object an appropriate message. However, because the integrity of the underlying database must be maintained, certain procedures performed on enterprise objects, such as procedures that make changes to the data in an enterprise object, must be specially handled. For example, changes made directly by sending a message to an enterprise object in Enterprise Objects Framework 1x bypass controller 140. Accordingly, as controller 140 controls messages to the user interface 160 and the database level 120, these changes are not updated in the user interface and are not saved in the database. In order for these changes to propagate to the user interface and the database, the enterprise object itself must keep track of changes and must explicitly notify controller 140 when changes occur. This requirement requires additional code in each enterprise object, making the building of enterprise objects, and applications using enterprise objects, more complicated and time consuming than other kinds of object oriented programming.

Another limitation of Enterprise Objects Framework 1x is that because controller 140 is tightly coupled to user interface 160, controller 140 is not usable for database server and other non-user interface applications. Accordingly, buffering and undo functions that are implemented in controller 140 in Enterprise Objects Framework 1x are not available for applications written for server platforms.

SUMMARY OF THE INVENTION

The present invention comprises a novel system for managing changes to a graph of data bearing objects. In one embodiment, an object graph manager object referred to as an editing context is used to identify changes made to data bearing enterprise objects and to notify other interested objects when changes occur. As a result, data bearing objects need not themselves contain code necessary for monitoring changes. In this embodiment, a data bearing object broadcasts a "willChange" message to a list of observer objects, one of which is the editing context, prior to undergoing any changes. Upon receiving the "willChange" message, the editing context takes a "snapshot" of the object prior to the change. After the change is made, and the change is to be committed to the database, the editing context takes a second snapshot of the object. The editing context uses snapshot differencing to identify the change that occurred, and then records the change in the database. The editing context also registers other objects, for example user interface objects, that need to be notified if the object has changed, and notifies these registered objects when a change occurs.

In another embodiment of the invention, the snapshots recorded by the editing context are used to provide event-based "undo" capabilities. In this embodiment, a change event begins, and a data bearing object about to be changed broadcasts a "willChange" message. The editing context receives the "willChange" message and takes a snapshot. The editing context ignores succeeding "willChange" messages from the object until the change event is completed. At that point, the editing context records the snapshot on an undo stack. This way, undo's are bracketed by a "willChange" message and the end of a change event. Intermediate changes are not recorded.

In another embodiment of the invention, each enterprise object has a primary key that is used to maintain the identification between an enterprise object instance and a corresponding database row. In this embodiment, the editing context monitors the creating of new enterprise objects to insure that another instance of an enterprise object is not created when a row with the same primary key is fetched from the database.

In another embodiment of the invention, multiple levels of editing contexts are used to provide multiple isolated object graphs, each of which allows independent manipulation of the underlying data bearing objects. In this embodiment, an underlying editing context provides objects from its object store to one or more overlying editing contexts. Each of the overlying editing contexts creates and manages its own object store containing copies of the objects in the underlying editing context. Changes can be made to objects in an overlying object graph without effecting the state of the same objects in the underlying object graph or in the other object graphs. When a change is final, the change can be passed down to the underlying editing context, and passed up to the other overlying object graphs.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

Figure 2:
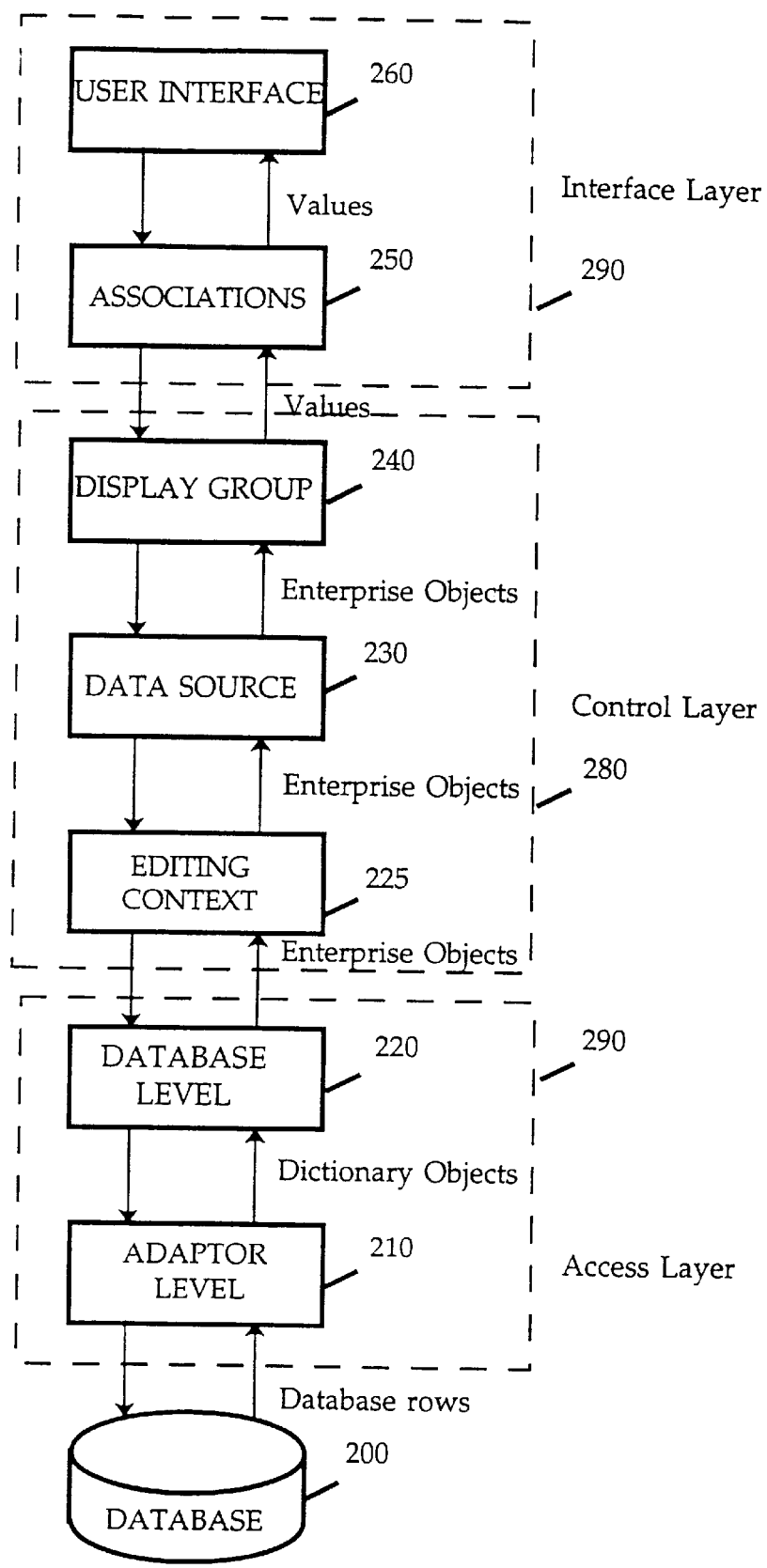
FIG. 2 is a block level diagram illustrating one embodiment of a database application of the present invention.

The general structure of one embodiment of a database application program utilizing the present invention is shown in FIG. 2. This embodiment is used in the Enterprise Objects Framework 2.0 database application programming package from NeXT Software, Inc., assignee of the present invention. Enterprise Objects Framework 2.0 is described in the Enterprise Objects Framework Developer Guide, preliminary release, attached hereto as Appendix A.

Figure 1:
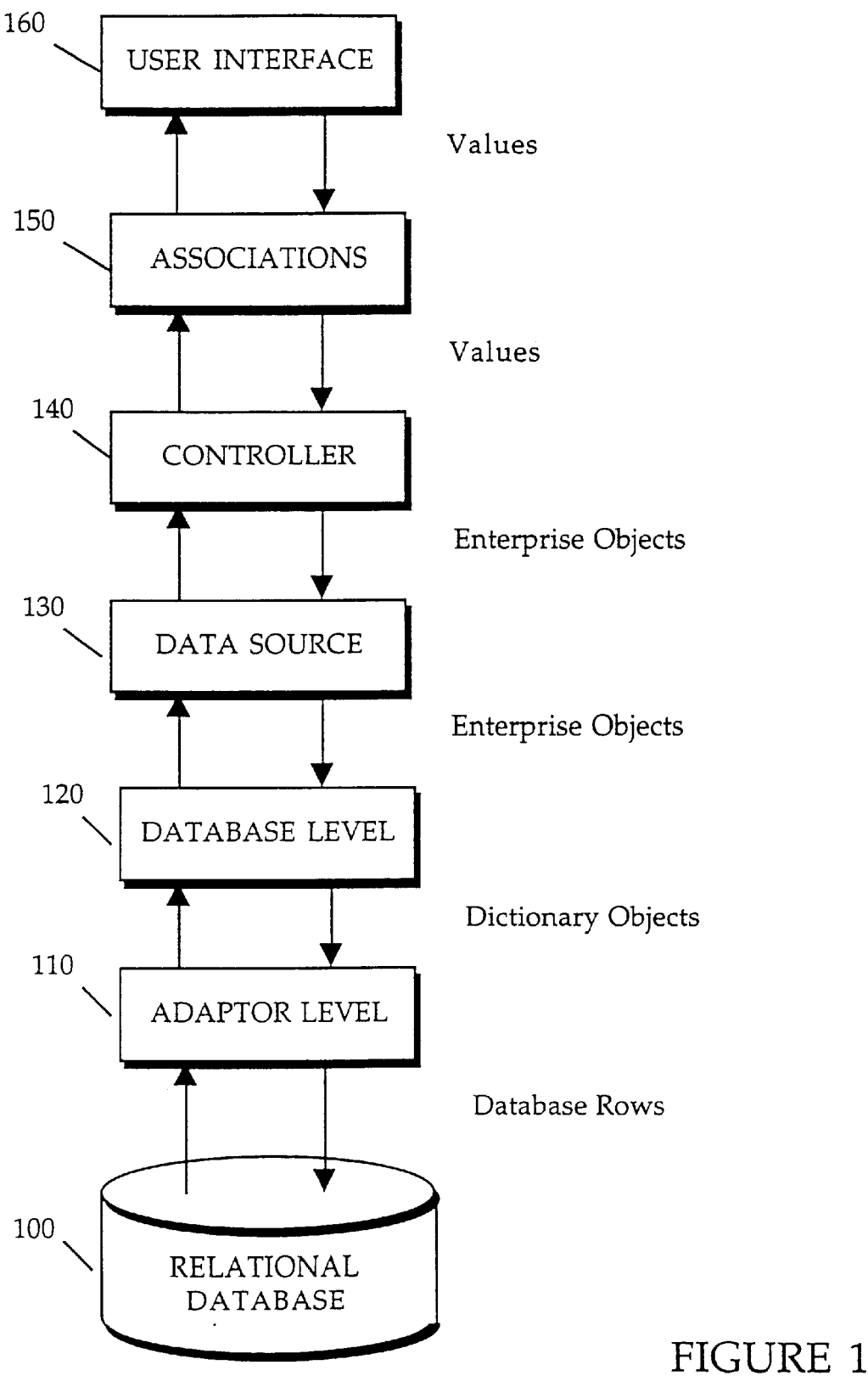
FIG. 1 is a block level diagram illustrating a database application of the prior art.

In the application shown in FIG. 2, like in the prior art application shown in FIG. 1, data flows from a relational database 200 to a user interface 260, and vice versa, via a number of intervening modules and levels. Each of the blocks shown in FIG. 2 constitutes a portion of the overall application program and may be made up of one or more objects. Although certain of the modules shown in FIG. 2 are similar to those shown in FIG. 1, there are certain significant differences, as outlined below.

The modules shown in FIG. 2 are a database 200, and adaptor level 210, a database level 220, an editing context 225, a data source 230, a display group 240, associations 250, and user interface 260. As shown in FIG. 2, these modules are divided into three layers. Database 200, adaptor level 210, and database level 220 constitute access layer 270. Editing context 225, data source 230, and display group 240 constitute control layer 280. Associations 250 and user interface 260 constitute interface layer 290.

The flow of data from the relational database 200 to user interface 260 proceeds as follows. Data in the form of rows of data from relational database 200 are retrieved from relational database 200 to an adaptor level 210, using well-known relational database access techniques. Adaptor level 210 consists of an adaptor that translates database requests received from database level 220 to the correct syntax and format for the particular database 200 being accessed. For example, if database 200 is an Oracle database, an Oracle adaptor level 210 is used. If data base 200 is a Sybase database, a Sybase adaptor level 210 is used. In this way, every module above adaptor level 210 is database independent.

At adaptor level 210, the raw data received from relational database 200 is packaged into "dictionary objects." Dictionary objects contain key-value pairs: each key typically represents the name of a database column, and the key's value corresponds to the data for the column of the particular row that was read from relational database 200. As shown in FIG. 2, data in the form of these dictionary objects is passed from adaptor level 210 to database level 220.

Database level 220 creates "enterprise objects" from the dictionary objects. Unlike the embodiment of FIG. 1, the enterprise objects of the present invention need not have any special knowledge about the underlying database or need to include methods for monitoring changes, other than being able to send "willChange" messages, as described below. In addition, unlike the embodiment of FIG. 1, in which the enterprise objects created at database level 120 were passed directly to data source 130, in the embodiment of FIG. 2, there is an additional module, editing context 225, between database level 220 and data source 230. As will be discussed in detail below, editing context 225 provides many of the inventive features of the present invention. Enterprise objects created at database level 220 are passed from database level 220 to editing context 225.

Editing context 225 functions as the manager of the object graph created by the application of FIG. 2 from database 200. Important functions performed by editing context 225 include object uniquing, user interface notification, change notification, change tracking, save notification, and providing undo capabilities.

Upon receiving an enterprise object from database level 220, editing context 225 registers each enterprise object in a lookup table, using its primary key or other unique identifier to uniquely identify the object to the external database 200, as part of its uniquing function to ensure that only one enterprise object is created in the object graph managed by editing context 225 for each database row.

Enterprise objects in Enterprise Object Frameworks 2.0 have the ability to register any other object as an observer. An observer is an object that is interested in any changes made to the objects with which it is registered as an observer. Editing context 225 registers itself as an observer of each enterprise object that is part of its object graph.

Data source 230 is an object that acts as an interface between display group 240 and editing context 225. It forwards requests for insertion and deletion of objects from display group 240 to editing context 225. Changes made by editing context 225 to an enterprise object are passed down via database level 220 and adaptor level 210 to relational database 200.

Display group 240 acts as the interface between interface layer 290 and control layer 280. It is the mechanism by which interface layer 290 accesses stored data. Editing context 225 supplies enterprise objects created at database level 220 via data source 230 to display group 240. As shown in FIG. 2, display group 240 transports data in the form of values from the enterprise objects to user interface 260 via association objects 250. Display group 240 coordinates the values displayed in the user interface with the corresponding enterprise object values. When enterprise objects are modified in the user interface, editing context 225 tracks the changes, and propagates changes, as appropriate, to relational database 200.

Figure 3:
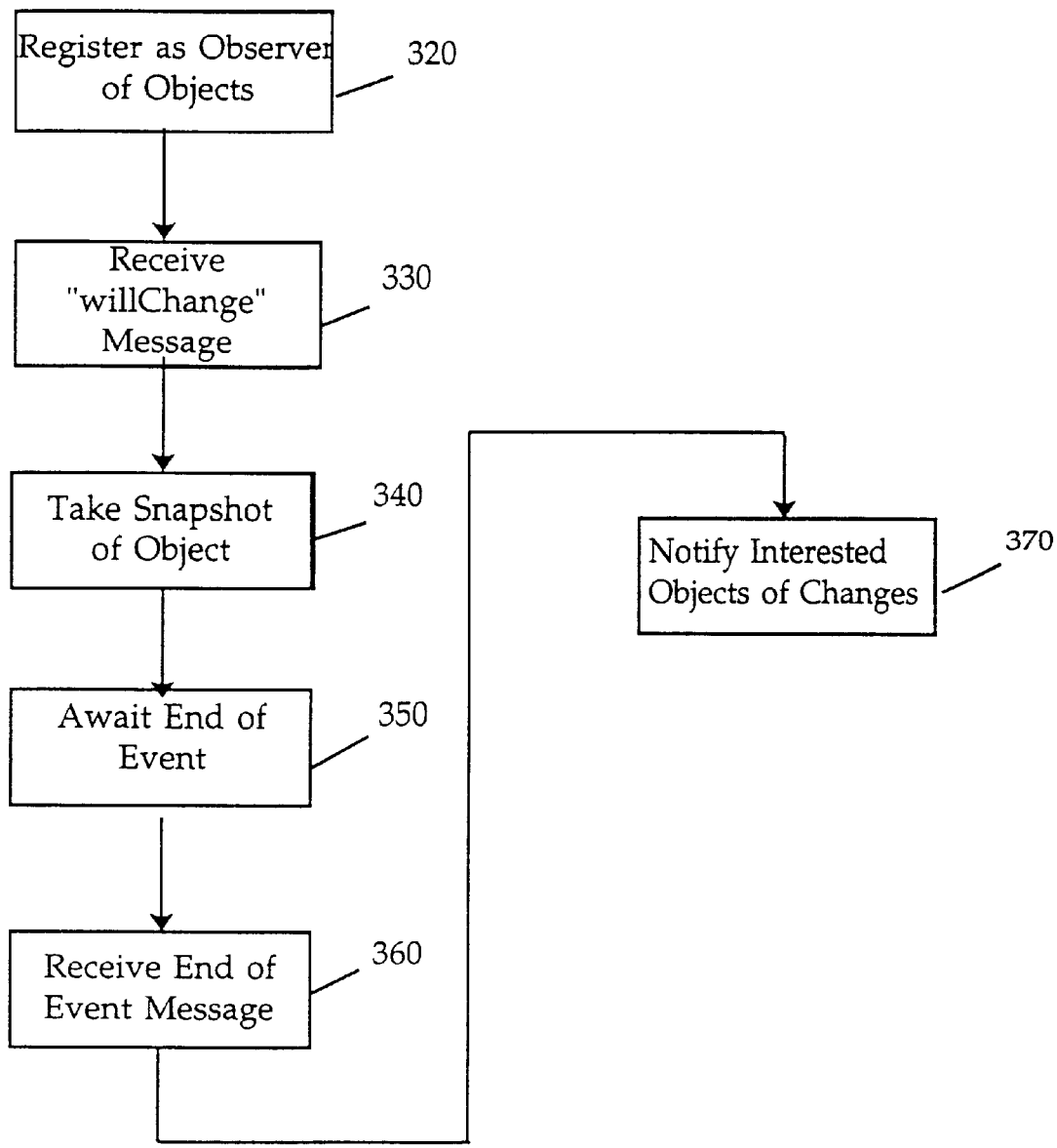
FIG. 3 is a block diagram showing how the editing context of one embodiment of the present invention performs the functions of change tracking and notification.

FIG. 3 is a block diagram showing how the editing context of one embodiment of the present invention performs the functions of change tracking and notification. As shown in FIG. 3, at block 320, the editing context registers itself as an observer of all enterprise objects in its object graph. This ensures that any enterprise object that is about to undergo a change will first send a "willChange" message to the editing context. In the embodiment shown in FIG. 3, the editing context receives such a "willChange" message from an enterprise object about to undergo a change event at block 330.

After receiving a "willChange" message, the editing context records a snapshot of the object that sent the message at block 340. At block 350, the editing context awaits the receipt of an end of event message indicating the end of the event that caused the issuance of the "willChange" message.

The generating of "willChange" and end of event messages may for example proceed as follows. The operating system of the computer system using the embodiment of FIG. 3 receives notification of an event. Events may have a variety of forms, depending on the operating system. Examples of events are user events such as moving a mouse, clicking a mouse button, or pressing a key, as well as network events such as remote procedure calls or other network messages.

After receiving notification of an event, the event manager of the operating system in turn sends notification of the event to the application code. The application code then executes as appropriate in response to the event. If, as part of the execution of the application code, a change is made to an enterprise object, the enterprise object broadcasts a "willChange" message to its observer objects, including the editing context. Upon receiving the "willChange" message, the editing context sends the event manager of the operating system a message requesting that the editing context be called back by the operating system after the execution of the application code triggered by the event has been completed. The application code executes to completion, and the operating system sends the editing context a message indicating the end of the event.

Once the editing context receives an end of event message at block 360, the editing context broadcasts a change message at block 370 to those other. objects that have registered themselves with the editing context as observers of the changed object. In certain situations, for example when it is desired to preserve referential integrity, such as by propagating deletes, the editing context may at this point also take a second, post change snapshot of the object.

Figure 4:
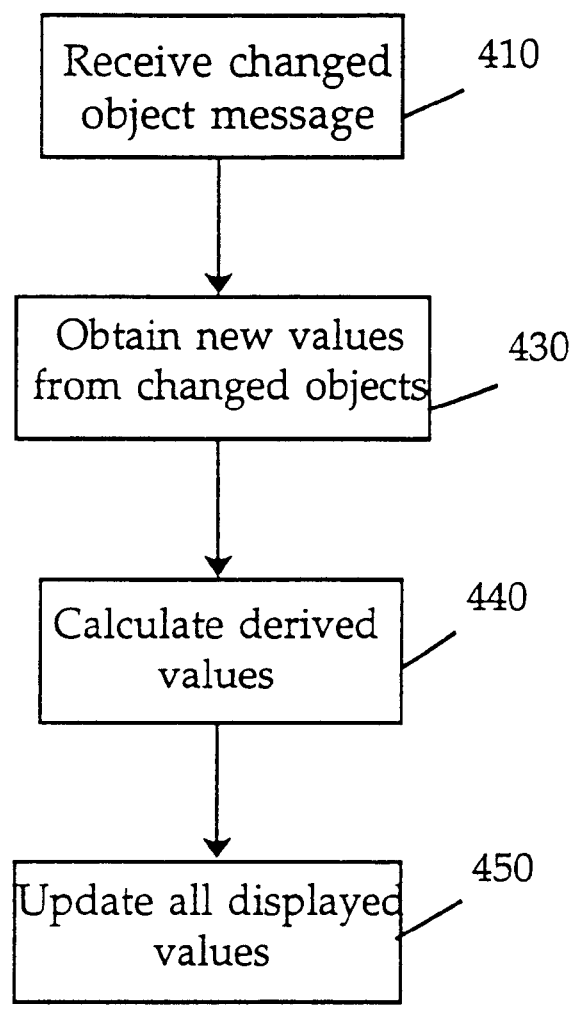
FIG. 4 is a block diagram showing how the user interface is updated in response to an update message from the editing context in one embodiment of the present invention.

In order to ensure that the user interface is updated properly in response to changes made to an enterprise object, display group 240 may register itself as an observer with the editing context. Display group 240 is therefore notified when any enterprise objects whose values are displayed on the user interface are changed. Display group 240 can then update all of the values in the display. The purpose updating all the displayed values is to ensure that all values displayed in the user interface reflect the change made to the enterprise object. Some of the values displayed in the interface may be derived values calculated from the changed data. If only the changed data is updated in response to the changed data message sent by the editing context at block 370, but not any displayed data derived from the changed data, then the data displayed in the user interface would be inconsistent. By updating all the data displayed in the user interface, the display group assures that the user interface is consistent FIG. 4 is a block diagram showing how the user interface is updated by the display group in response to an changed object message from the editing context in one embodiment of the present invention. As shown in FIG. 4, display group receives a message indicating changes made to an enterprise object, corresponding to the message sent by the editing context at block 370 of FIG. 3, at block 410. The user interface then obtains the new values for the changed enterprise object at block 430. In one embodiment, the changed values are contained in the message received from the editing context at block 410. In another embodiment, the message received from the editing context at block 410 contains the identity of the changed object but not the changes themselves. In this embodiment, the user interface obtains the changed values by querying the changed enterprise object directly.

After obtaining the changed values, the user interface calculates any derived values at block 440. Finally, all values displayed by the user interface are updated with at block 450.

Figure 5:
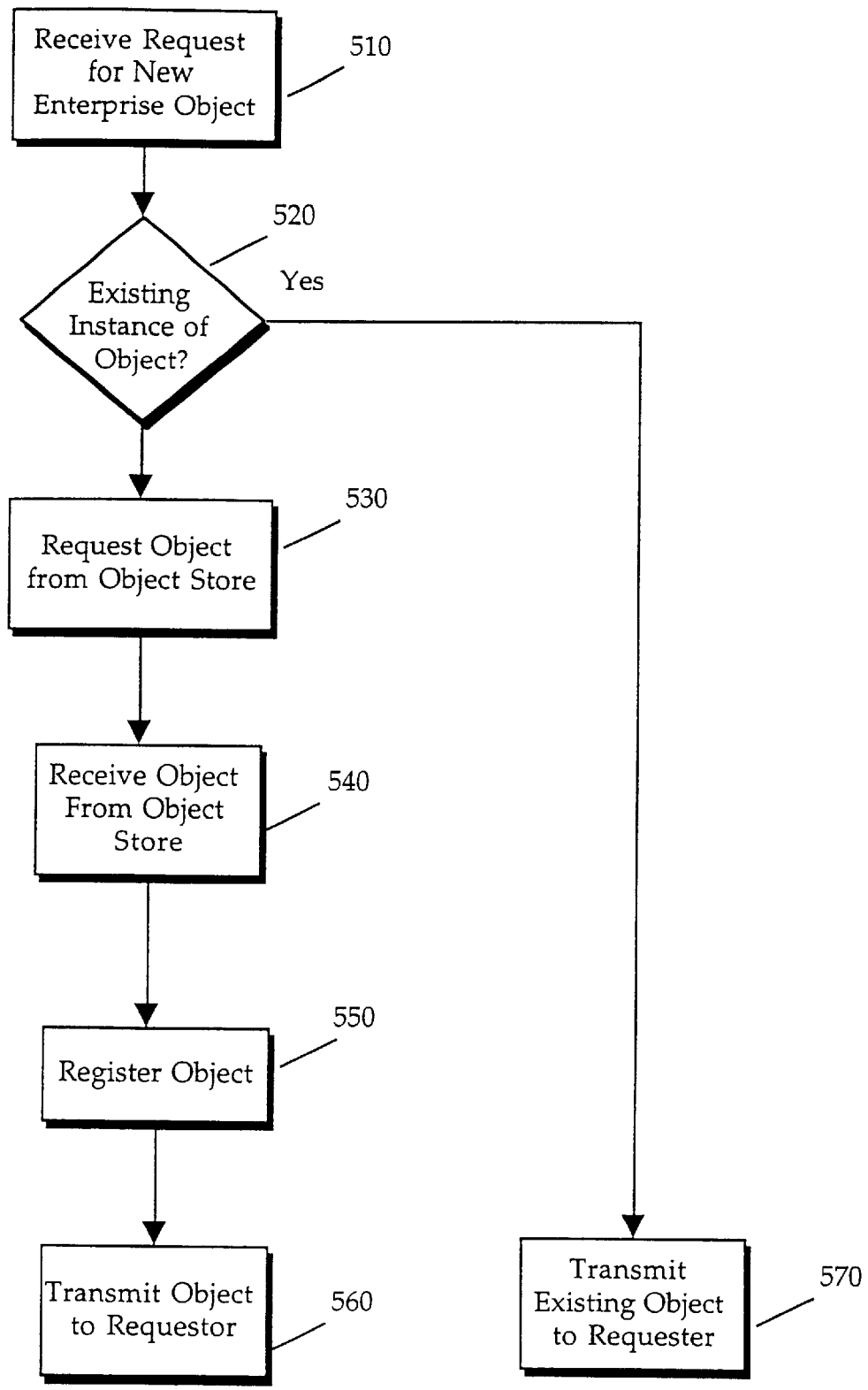
FIG. 5 is a block diagram showing how one embodiment of the editing context of the present invention performs the function of object uniquing.

FIG. 5 is a block diagram showing how one embodiment of the editing context of the present invention performs the function of object uniquing. As shown in FIG. 5, the editing context receives the request for a new enterprise object at block 510. This request may come, for example, from data source 230 of FIG. 2. After receiving the request, the editing context checks to see whether an instance of the requested object already exists at decision block 520. If an instance of the object already exists, the editing context transmits the existing object to the requester at block 570. If no instance of the object exists, the editing context passes a request for the object from its underlying object store, which may consist, for example, of database level 220, adaptor level 210, and database 200 of FIG. 2. After receiving the requested object from the object store at block 540, the editing context registers a unique identifier of the object at block 550 and transmits the new object to the requester at block 560.

Figure 6:
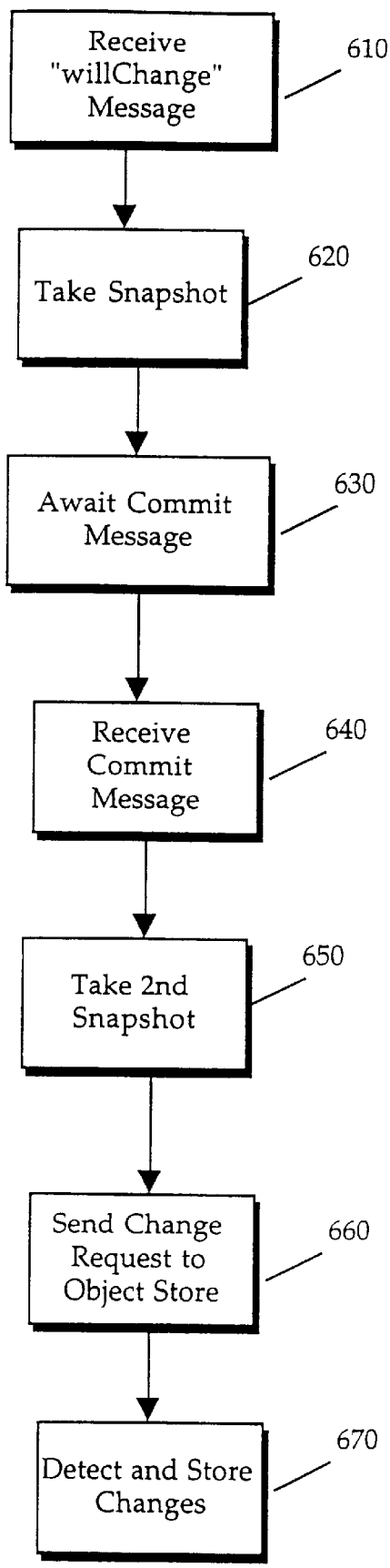
FIG. 6 is a block diagram showing how one embodiment of the editing context of the present invention performs the function of saving changes to enterprise objects.

FIG. 6 is a block diagram showing how one embodiment of the present invention performs the function of detecting and saving changes to enterprise objects in the underlying database or other object store. As shown in FIG. 6, after the editing context receives a "willChange" message from an enterprise object at block 610, the editing context takes a snapshot of the object in its unchanged state at block 620. The editing context then awaits a commit message indicating that a change has been completed and that the changed data is to be committed to the database at block 630. The editing context may receive additional "willChange" messages from the enterprise object between the time it receives the initial "willChange" message and the commit message, but these additional "willChange" messages are ignored. After the editing context receives a commit message at block 640, the editing context takes a second snapshot of the enterprise object at block 650. At block 660, the editing context sends a change request to the object store to save the change made to the enterprise object. The object store detects the change by comparing the first and second snapshots and stores the change at block 670.

In the embodiment of FIG. 2, the object store comprises the access layer 290 and database 200. The object store may also be any other entity or mechanism that appears to the editing context to function in a database level like manner: that is, it stores and retrieves enterprise object data in response to data base requests from the editing context.

Figure 7:
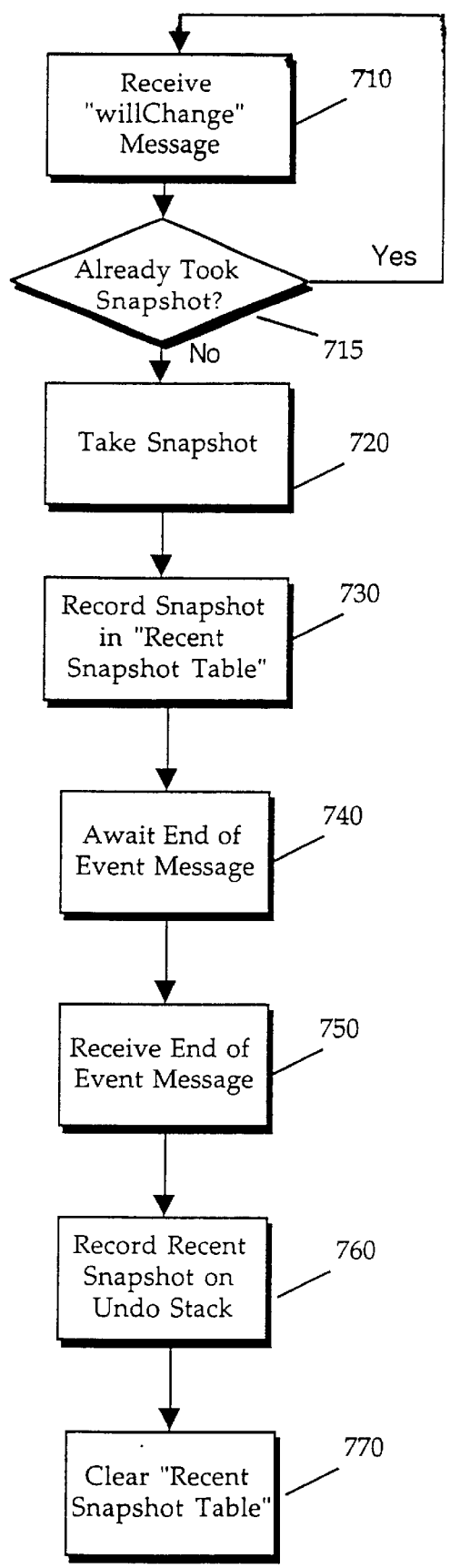
FIG. 7 is a block diagram showing how one embodiment of the editing context of the present invention provides undo functionality.

FIG. 7 is a block diagram showing how one embodiment of the editing context of the present invention provides undo functionality. At block 710, the editing context receives a "willChange" message from an enterprise object, indicating that the enterprise object anticipates undergoing a change. At block 715, the editing context checks to see whether a snapshot for the current change event has already been taken. A change event is a set of one or more successive changes made to an enterprise object within the pre-defined limits of the change event. For example, a change event may occur when a user makes several successive changes in a user interface to observe the results. In this case, the change event would commence when the first change is entered and the enterprise object sends out an initial "willChange" message. The change event may be deemed to continue until the user activates a save command or moves a mouse pointer to another data field.

If a snapshot has already been taken during the current change event, the current "willChange" message is ignored. If no snapshot has been taken, the editing context takes a snapshot at block 720. At block 730, the editing context places the snapshot into a "recent snapshot table". The recent snapshot table acts as a holding place for the snapshot until it is placed on the undo stack, as described below.

After placing the snapshot in the recent snapshots table, the editing context awaits a end of event message, indicating that the current change event has ended, at block 740. Upon receiving the end of event message at block 750, the editing context, at block 760, records the snapshot stored in the recent snapshot table at block 730 on the undo stack. Finally, the editing context clears the recent snapshot table at block 770. The result is that the top level of the undo stack now contains a snapshot of the object prior to the changes made during the change event. The changes made can therefore be undone by changing the enterprise object back to the state reflected in the topmost snapshot in the undo stack.

The snapshots on the undo stack allow successive reversion of the state of the enterprise object to the states captured in each snapshot of the stack. By bracketing the snapshots, and therefore the captured states of the object, between the initial "willChange" message and a corresponding end of a change event, short-term, intermediate changes in the enterprise object are ignored. Instead of inefficiently filling the undo stack with every little incremental change in the state of the enterprise object, only significant changes are recorded, resulting in an efficient and fast undo facility.

In the prior art, in order to provide an undo capability, undo code had to be written into the application program, resulting in the investment of substantial coding time and effort, and creating the opportunity for a variety of errors. By using the undo facilities of the present invention described above, however, an application program automatically obtains undo capabilities without the need of complex coding and with little risk of error.

Although the user interface update, object uniquing, data saving, and undo capabilities of the editing context of the present invention have been described with respect to the separate embodiments of FIGS. 3, 5, 6, and 7, respectively, a single editing context of the present invention may provide some or all of these capabilities concurrently.

Figure 8:
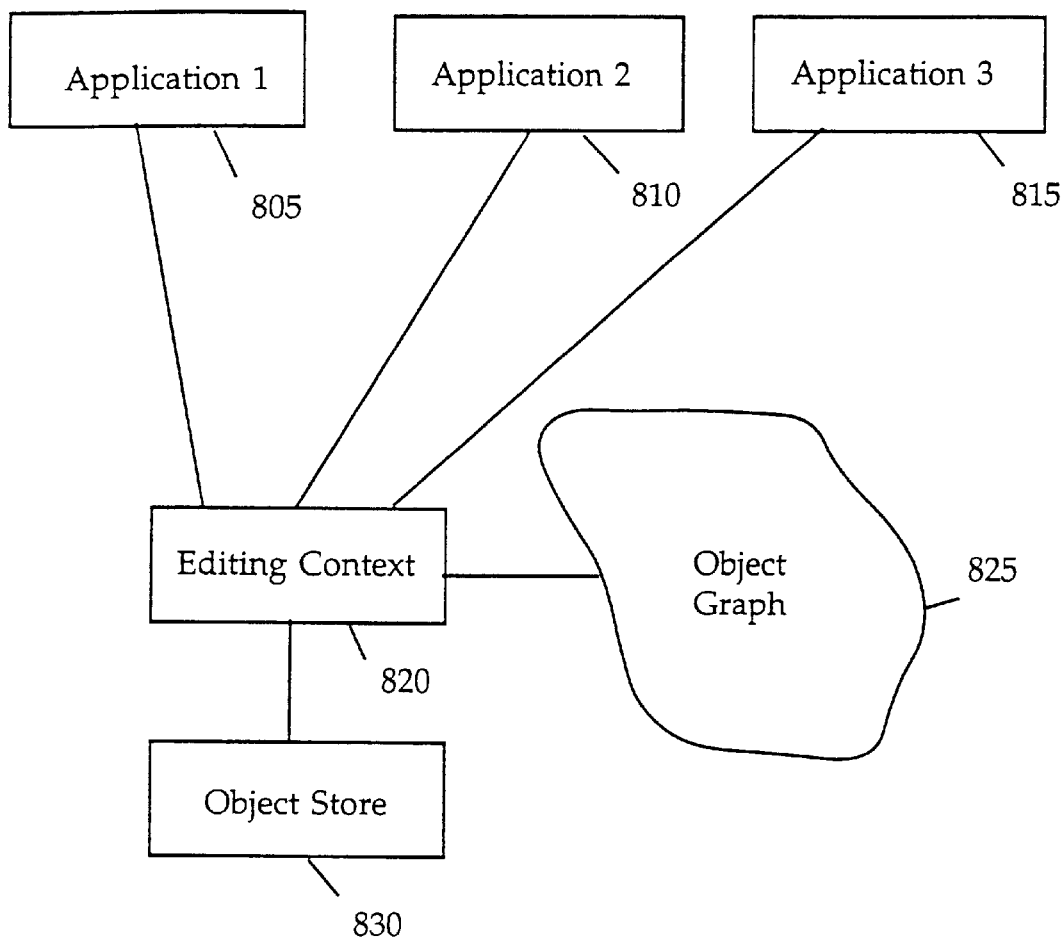
FIG. 8 is a schematic diagram showing the structure of one embodiment of the present invention.

In each of the embodiments of the present invention described above with respect to FIGS. 2–7, the editing context functions on behalf of one or more application programs as the manager of an object graph obtained from an underlying data storage entity referred to by the generic name "object store". This basic structure is shown in FIG. 8, which shows editing context 820 managing object graph 825 on behalf of applications 805, 810 and 815.

Object graph 825 represents a particular view of the database structure underlying object store 830. From the point of view of editing context 820, object store 830 represents a source of new objects and a sink for changed objects. As described above, object store 830 may consist of the access layer 290 and database 200 of FIG. 2. However, object store 830 may consist of other entities and/or systems that can respond to requests from editing context 820 to perform database functions related to object graph 825 managed by editing context 820.

Figure 9:
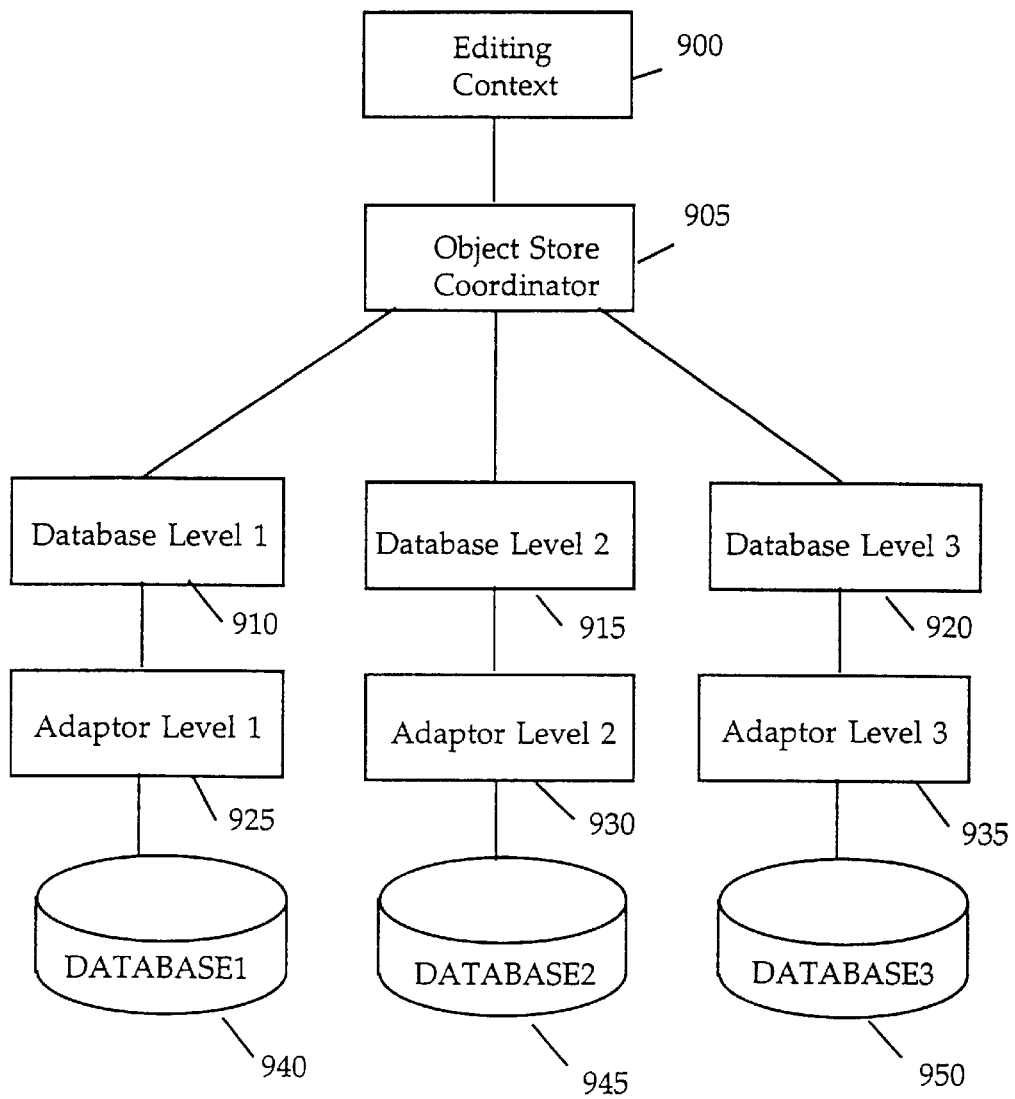
FIG. 9 is a schematic diagram showing the structure of one embodiment of the object store of the present invention including multiple adaptor levels and multiple databases.
Figure 10:
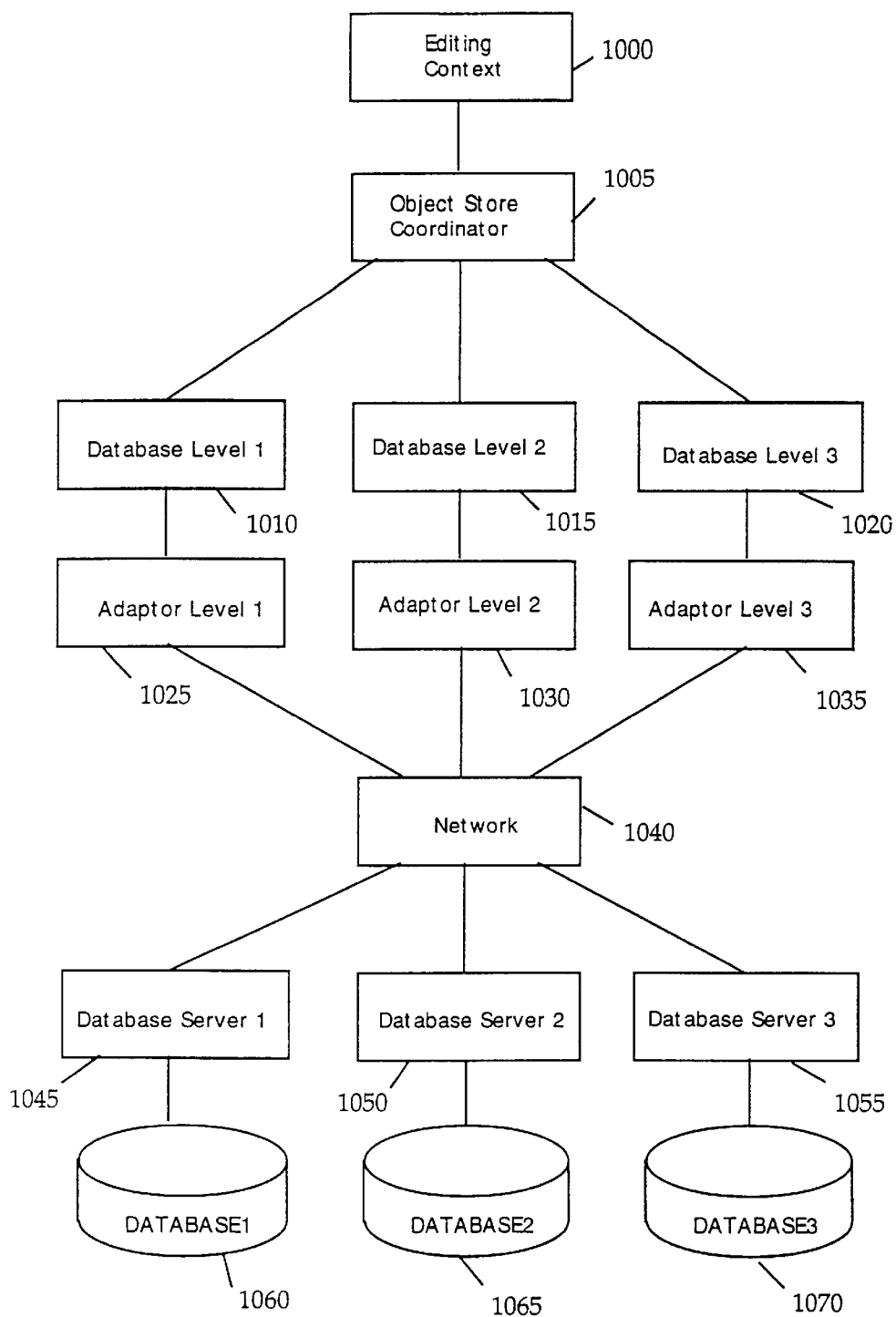
FIG. 10 is a schematic diagram showing the structure of one embodiment of the object store of the present invention including multiple network linked databases.

FIGS. 9–10 illustrate example embodiments of structures that can be used as object store 830. From the point of view of the editing context, each of these embodiments looks the same.

FIG. 9 is a schematic diagram showing the structure of one embodiment of the object store of the present invention including multiple adaptor levels and multiple databases. In this embodiment, the object store consists of an object store coordinator 905, three different databases 940, 945, and 950, respectively, three corresponding adaptor levels 925, 930, and 935, respectively, and three corresponding database levels 910, 915, and 920, respectively. The three databases may be managed by different database management systems. For example, database 940 may be an Oracle database, database 945 may be a Sybase database, and database 950 may be another database. Object store coordinator 905 coordinates database requests received from editing context 900, decides which database corresponds to each request received, and sends the appropriate message to the appropriate database level, which, via the corresponding adaptor level, performs the database function requested. If the request from editing context 900 involves updating data contained in an enterprise object, object store coordinator 905 identifies the database corresponding to the changed data and sends an appropriate message to the corresponding database level. If the request from editing context 900 involves the creation of a new enterprise object, object store coordinator 905 performs the required object to database mapping and extracts the appropriate data from one or more of the databases.

In the embodiment of FIG. 9, the multiple databases are all part of a single computer system. However, the databases may be spread over different machines in a computer network, as shown in FIG. 10.

The embodiment of FIG. 10, like the embodiment of FIG. 9, includes an editing context 1000, an object store coordinator 1005, three database levels 1010, 1015, and 1020, and three corresponding adaptor levels 1025, 1030, and 1035. The embodiment of FIG. 10 also include three different databases 1060, 1065, and 1070. However, instead of being directly connected to their corresponding adaptor levels, databases 1060, 1065, and 1070 are distributed over a network, and managed by separate database servers 1045, 1050, and 1055, respectively. Accordingly, instead of directly accessing a connected database as in FIG. 9, in the embodiment of FIG. 10, an adaptor level contacts its corresponding database by sending a network message to the appropriate database server. In this embodiment, object store coordinator 1005 coordinates database requests received from editing context 1000, decides which database corresponds to each request received, and sends an appropriate message to the applicable database level. The database level transmits a corresponding message to its adaptor level, which formulates the appropriate network message to the appropriate database server to perform the database function requested. If the request from editing context 1000 involves updating data contained in an enterprise object, object store coordinator 1005 identifies the database corresponding to the changed data and sends an appropriate message to the corresponding database level. The database level sends a corresponding message to its adaptor level, which transmits an appropriate network message to the applicable database server. If the request from editing context 1000 involves the creation of a new enterprise object, object store coordinator 1005 performs the required object to database mapping and extracts the appropriate data from one or more of the databases, again via the applicable database level, adaptor level, network, and database server. Again, the complexities underlying editing context 1000 are hidden. Editing context 1000 interacts with object store coordinator 1005 in the same manner as with database level 220 in the simple structure of FIG. 2.

Figure 11:
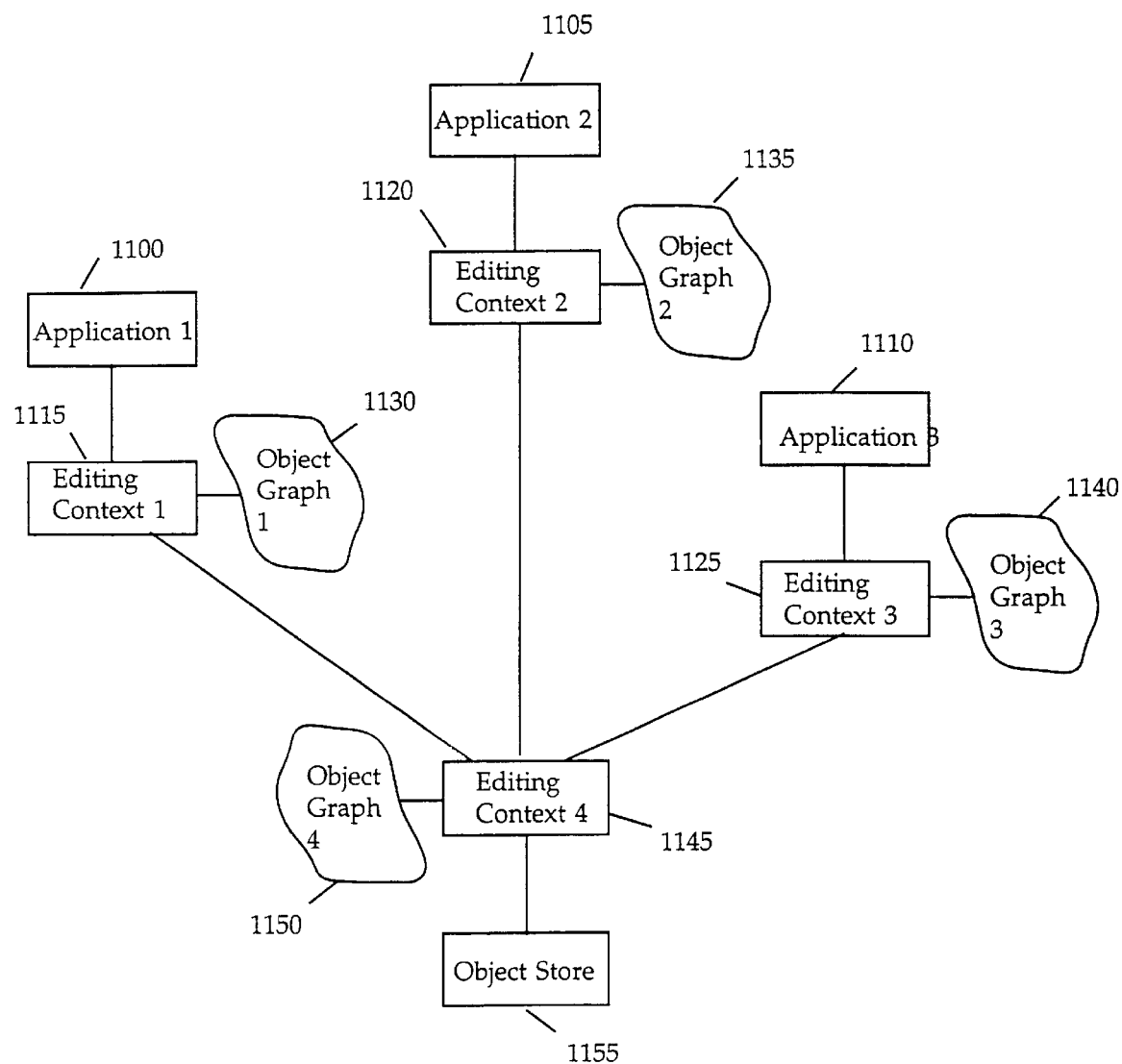
FIG. 11 is a schematic diagram showing the structure of one embodiment of the present invention including multiple nested editing contexts.

FIG. 11 is a schematic diagram showing the structure of one embodiment of the present invention including multiple nested editing contexts. This embodiment is similar to the embodiment of FIG. 8. However, instead of having an editing context 820 managing an object graph 825 for multiple applications 805, 810 and 815, as in FIG. 8, in the embodiment of FIG. 11, editing context 1145 manages object graph 1150 on behalf of three other editing contexts 1115, 1120 and 1125, respectively. Each of these other editing contexts manages its own object graph on behalf of its own application, which may be a separate application program, but more typically is a separate task being performed by a single application program. For example, each application may consist of a separate window looking at different or the same views of the underlying data. As such, editing context 1115 manages object graph 1130 on behalf of application 1100, editing context 1120 manages object graph 1135 on behalf of application 1105, and editing context 1125 manages object graph 1140 on behalf of application 1110. To each of editing contexts 1115, 1120, and 1125, editing context 1145 looks like an object store 830 of FIG. 8. Conversely, each of editing contexts 1115, 1120 and 1125 looks to editing context 1145 of FIG. 11 like an application program 805, 810, or 815 of FIG. 8. Each of editing contexts 1115, 1120 and 1125 manages a separate object graph 1130, 1135, and 1140, respectively. Object graphs 1130, 1135, and 1140 constitute independent views of the data provided by editing context 1145. As each object graph is created independently, there may be multiple instances of enterprise objects spread across object graphs 1130, 1135 and 1140, respectively. Each of applications 1100, 1105 and 1110 can therefore independently work and make changes to separate instances of the same enterprise objects. When an application program 1100, 1105 or 1110 wishes to commit a change to the database, a commit change to database message is sent to editing context 1145. Editing context 1145 then updates the appropriate enterprise objects in its object graph 1150, and also broadcasts a change message to editing contexts 1115, 1120 and 1125, respectively. Editing contexts 1115, 1120 and 1125 may or may not pass these changes on to their respective applications 1100, 1105 and 1110, depending on the particular configuration and purpose of the application programs. Editing context 1145 does not commit the changes to underlying object store 1155 unless it receives an explicit message to do so. Each of the editing contexts 1115, 1120, 1125 and 1145 may in general perform any of the functions for an editing context described with respect to FIGS. 2–7.

The nested editing context structure of FIG. 11 provides a simplified means for creating a database application program utilizing "drill down user interfaces." Drill down user interfaces consist, for example, of a series of pop-up windows that can be used to make changes to data displayed in a window. For example, a window may display the employees of a department, their salaries, and department budget data. A department manager may wish to be able to investigate various "what if" scenarios without actually changing the underlying database. An application program may be designed to allow the manager to pop up a second window in which the manager can make various changes in the displayed data to see what the resultant effects are. When the manager is satisfied with the changes, a command button might be provided to commit the changes to the database.

In the prior art, designing such an application was complex. To create the pop-up window, the application had to copy values from the underlying database objects to local variable, which would be displayed in the pop up window. The application would also have to recreate the validation methods of the underlying objects and take into account any derived values. Once changes to the local variables were to be committed, the application would have to manually harvest the changed values and transmit them to the underlying objects.

The present invention provides a much less complex way to design drill down interfaces. By using nested editing contexts and thereby creating independent copies of the underlying enterprise objects, instead of having to create and deal with local variables, the enterprise objects themselves can be manipulated in a pop-up window. Accordingly, the same code can be used to manipulate data in the pop up window as is used in the main window. Because the user operates on copies of the objects, instead of on derived local variables, all methods of the object are preserved. The present invention thus provides a simpler and less error prone way to create application programs using drill down interfaces.

Figure 12:
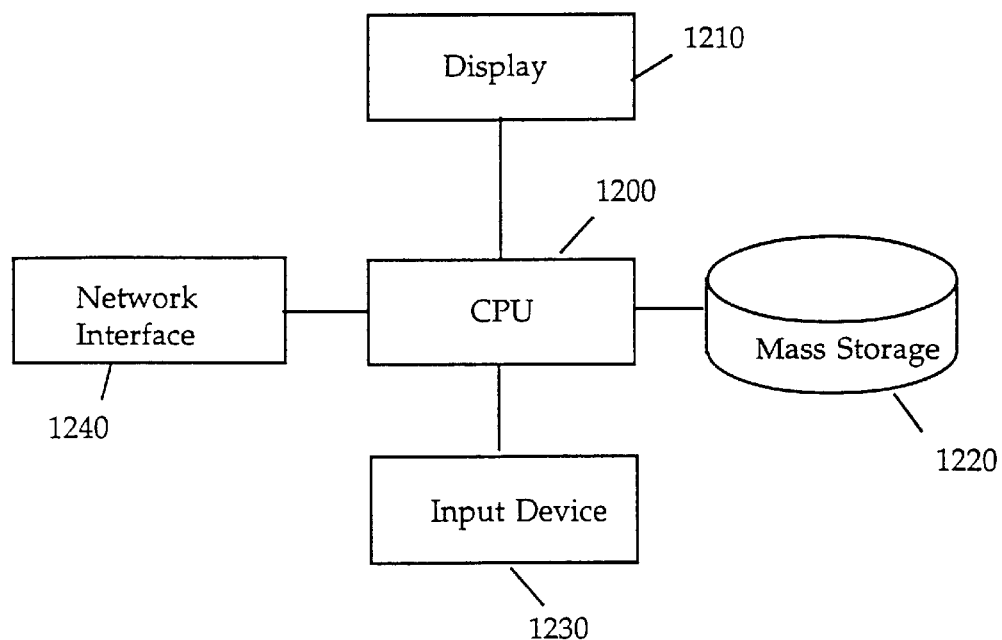
FIG. 12 is a schematic diagram of one embodiment of a computer system on which the present invention may be implemented.

The present invention can be implemented by means of software programming on any of a variety of one or more computer systems as are well known in the art, including, without limitation, computer systems such as that shown in FIG. 12. The computer system shown in FIG. 12 includes a CPU unit 1200 that includes a central processor, main memory, peripheral interfaces, input-output devices, power supply, and associated circuitry and devices; a display device 1210 which may be a cathode ray tube display, LCD display, gas-plasma display, or any other computer display; an input device 1230, which may include a keyboard, mouse, digitizer, or other input device. The computer system may or may not include non-volatile storage 1220, which may include magnetic, optical, or other mass storage devices. The computer system may also include a network interface 1240 allowing the computer system to communicate with other systems over a communications network. Any of a variety of other configurations of computer systems may also be used.

Thus a novel method and apparatus for managing an object graph of data bearing objects was presented. Although the present invention has been described with respect to certain example embodiments, it will be apparent to those skilled in the art that the present invention is not limited to these specific embodiments.

Appendix A

ENTERPRISE OBJECTS FRAMEWORK DEVELOPER'S GUIDE
OPENSTEP DEVELOPER'S LIBRARY

NeXT and the publishers have tried to make the information contained in this manual as accurate and reliable as possible, but assume no responsibility for errors or omissions. They disclaim any warranty of any kind, whether express or implied, as to any matter whatsoever relating to this manual, including without limitation the merchantability or fitness for any particular purpose. In no event shall NeXT or the publishers be liable for any indirect, special, incidental, or consequential damages arising out of purchase or use of this manual or the information contained herein. NeXT will from time to time revise the software described in this manual and reserves the right to make such changes without obligation to notify the purchaser.

Copyright © 1996 by NeXT Computer, Inc., 900 Chesapeake Drive, Redwood City, CA 94063.
All rights reserved.
[6770.00]

No part of this publication may be reproduced, stored in a retrieval system, or transmitted, in any form or by any means, electronic, mechanical, photocopying, recording, or otherwise, without the prior written permission of the publisher or copyright owner. Printed in the United States of America. Published simultaneously in Canada.

NeXT, the NeXT logo, NEXTSTEP, the NEXTSTEP logo, OPENSTEP, Application Kit, Enterprise Objects Framework, Interface Builder, Objective-C, Portable Distributed Objects, and Workspace Manager are trademarks of NeXT Computer, Inc. Microsoft and Visual Basic are registered trademarks and Visual C++, Windows, and Windows NT are trademarks of Microsoft Corporation. PostScript is a registered trademark of Adobe Systems, Incorporated. UNIX is a registered trademark in the United States and other countries, licensed exclusively through X/Open Company Limited. ORACLE is a registered trademark of Oracle Corporation, Inc. SYBASE is a registered trademark of Sybase, Inc. All other trademarks mentioned belong to their respective owners.

Restricted Rights Legend: Use, duplication, or disclosure by the Government is subject to restrictions as set forth in subparagraph (c)(1)(ii) of the Rights in Technical Data and Computer Software clause at DFARS 252.227-7013 [or, if applicable, similar clauses at FAR 52.227-19 or NASA FAR Supp. 52.227-86].

This manual describes Enterprise Objects Framework, version 2.0, prerelease 1.

Written by Katie McCormick and Kelly Toshach
Illustrations by Craig Federighi, Katie McCormick, and Kelly Toshach
With help from the EOF team
Technical publications management by Ron Hayden
Cover design: CKS Partners, San Francisco, California This manual was designed, written, and produced on NEXTSTEP. Proofs were printed on a NeXT 400 dpi Laser Printer. Final pages were transferred from NeXT floppy disks to film using NeXT computers and an electronic imagesetter.

CONTENTS

Table of Contents

CONTENTS iii

ARCHITECTURAL OVERVIEW 9

14    How Changes are Managed
       Saving Changes to the Database 15
16    What Is an Enterprise Object?
       Enterprise Objects and Data Transportation 17
19    Enterprise Objects Framework Classes
21    User Interface Objects
21    The Interface Layer
21    The Data Source
22    The Control Layer
       Object Graph Management 23
       Object Storage Abstraction 24
24    The Access Layer
       The Database Level 25
       The Adaptor Level 25
26    Models

USING EOMODELER 29

Models 31
       EOModeler 32
       Creating a New Model 33
       Using the Model Editor in Table Mode 34
       Using the Model Editor in Browser Mode 36
       What a Default Model Includes 37
       Using the Data Browser 38
       Inspecting and Modifying Attributes 39
       Forming a Relationship 41
47    Adding Derived and Flattened Attributes
       Adding a New Attribute 51
       Adding Flattened Relationships 53
55    Working With Entities
       Inspecting an Entity 55
       Specifying an Enterprise Object Class 58

60    Generating Template Source Code Files
63    Setting Other Information for an Entity
       Stored Procedures inspector 63
       Inheritance Inspector 64
       UserInfo Inspector 64
64    Generating Schema
65    Setting Adaptor Information
66    Checking for Consistency

CREATING AN ENTERPRISE OBJECTS FRAMEWORK PROJECT 69

70    Creating a Project
       Adding Frameworks 70
71    Creating the Interface
       Loading EOPalette 71
       EODisplayGroup, Associations, and Class Keys 72
73    Creating a New Application
       Adding an NSTableView 73
       Adding EODisplayGroup and EODatabaseDataSource Objects 74
       Dragging a Model File into the nib File Window 74
       Inspecting an Entity EODisplayGroup 76
       Forming Associations Between an Entity EODisplayGroup and an NSTableView 78
       Fetching Data 82
83    Testing the Interface
83    Creating a Master-Detail Interface
       Creating a Master-Peer Interface 85
86    Using Formatters
89    Using Key Paths

OVERVIEW OF THE EXAMPLES 91

92    Movie Application
       Overview of the Movie Application 92
       What the Enterprise Objects Framework Gives You "For Free" 93
       Building the Movie Application 94

Table of Contents

| | |
|---|---|
| 100 | BusinessLogic |
| 102 | Customers Application |
| 104 | Inventory Application |
| 106 | PointOfSale Application | v

Chapter 1

ARCHITECTURAL OVERVIEW

The Enterprise Objects Framework is a set of tools and resources that helps you create applications that work with most popular relational databases—or with your own custom data store. These tools don't help you build a complete database system from the ground up—the tasks of data storage and retrieval are left to a database server supplied by a third party. Rather, the Enterprise Objects Framework lets you design database applications that are easy to build and maintain, that can communicate with other applications, and that draw upon the standard interface features common to all OpenStep applications.

Assuming your data store is a relational database, creating an Enterprise Objects Framework application usually involves the following:

- *A database server and an adaptor for that server.* An adaptor is a mechanism that connects your application to a particular server. For each type of server you use, you need a separate adaptor. The Enterprise Objects Framework provides adaptors for Oracle, Sybase, and Informix servers.

- *A model.* A model defines the mapping between your enterprise objects and the server's data; models are most often built graphically using the EOModeler application.

- *The EOPalette.* The EOPalette, used by Interface Builder, gives you access to objects you use in building a user interface.

- *The Enterprise Objects Framework frameworks of classes and protocols.* The classes and protocols provided by the Framework let you programmatically manipulate data as it passes between the server, your objects, and the user interface. Although simple applications can be created entirely in Interface Builder, sophisticated applications will require some use of the Enterprise Objects Framework classes in your own code.

Enterprise Objects Framework

The architecture of the Framework is divided into three major layers, the interface layer, the control layer, and the access layer.

The interface layer provides a standard mechanism for displaying data, the control layer manages a graph of enterprise objects, and the access layer creates enterprise objects from a relational database. The interface layer is connected to the control layer by a data source, which supplies the enterprise objects created in the access layer to the interface layer. A data source is an object that has the ability to fetch, insert, update, and delete enterprise objects. It is the means by Chapter 1                    Architectural Overview
--- which the interface layer accesses stored data; from the perspective of the interface layer, how data is stored (whether in a relational database or a flat-file system, for example) is of no consequence. The interface layer interacts with all data sources in the same way.

The Enterprise Objects Framework architecture includes the following components:

- The *adaptor level* receives raw data from the database and packages it in dictionary objects.

- The *database level* creates enterprise objects from dictionaries and registers them with the control layer.

- *Models* are used in the access layer to define the mapping between enterprise objects and database data.

- The *EOEditingContext* in the control layer manages a graph of objects and coordinates change notification.

- A *data source* provides the EODisplayGroup with enterprise objects.

- The *EODisplayGroup* (in cooperation with EOAssociations) coordinates the values displayed in the user interface with its enterprise objects and receives change notification from the EOEditingContext.

- *User interface* objects display data from enterprise objects.

Figure 1 shows the architecture of the Enterprise Objects Framework.

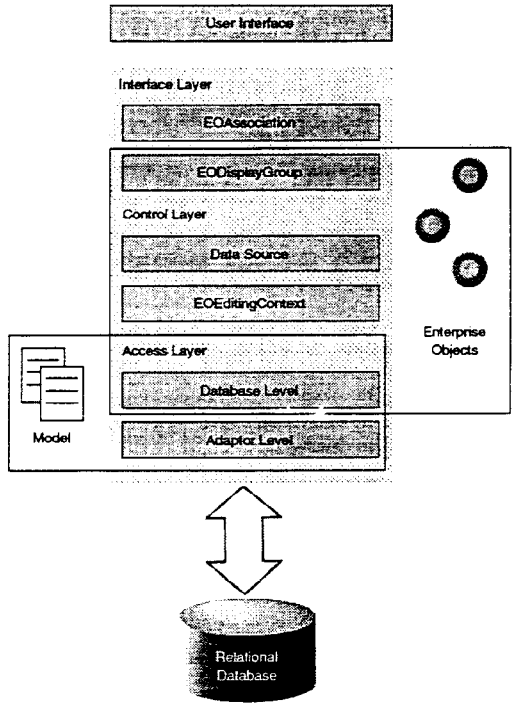

Figure 1. *Enterprise Objects Framework Architecture*

Data flows in an Enterprise Objects Framework application as follows:

- Data comes into the access layer from a relational database in the form of *rows*.

- The adaptor level packages the raw data as NSDictionary objects. *Dictionaries* contain key-value pairs; each key typically represents the name of a column, and the key's value corresponds to the data for the column in that particular row.

Chapter 1  Architectural Overview

- The database level creates *enterprise objects* from the dictionaries. The enterprise objects' properties get their initial values from the corresponding keys in the dictionary. An enterprise object typically adds behavior to the data it receives from a dictionary.

- The database level registers objects with an EOEditingContext in the control layer.

- The enterprise objects pass from the control layer into the interface layer through a data source, which supplies the objects to an EODisplayGroup.

- The EODisplayGroup notifies EOAssociations that the enterprise objects have new *values*. The EOAssociations take the new values from the enterprise objects and use them to refresh the user interface display.

Movement of data in the Framework is bidirectional: for example, at the user interface level you can fetch data from the database, modify the data, and then update the database to reflect your changes. The repackaging of data at various levels of the Framework is accomplished using reference-counted value classes provided by the Foundation Framework, thereby allowing data to be shared with maximum efficiency.

The primary purpose behind the movement that takes place between the layers of the Framework is to bring together your enterprise objects and persistent data. The next section explains what enterprise objects are, and describes in more detail how they collaborate to transport data through the Framework.

How Changes are Managed

The activity in an Enterprise Objects Framework application is centered around enterprise objects, which are managed by an EOEditingContext object in the control layer. This graph of enterprise objects represents the most current view of data in your application. When an enterprise object's value changes, the following sequence of events occurs:

1. The enterprise object notifies the EOEditingContext that it's changed.

2. The EOEditingContext records the object in its change list.

3. The EOEditingContext records undos.

4. The EOEditingContext broadcasts a change notification.

How Changes are Managed

5. EODisplayGroups receive change notification and update the user interface.

For example, suppose a user changes an object's value in the user interface. The object graph changes in response to the user input, the EOEditingContext sends out a change notification, and all views of the data in your application then refresh themselves to reflect the change. This sequence of events is illustrated in Figure 2.

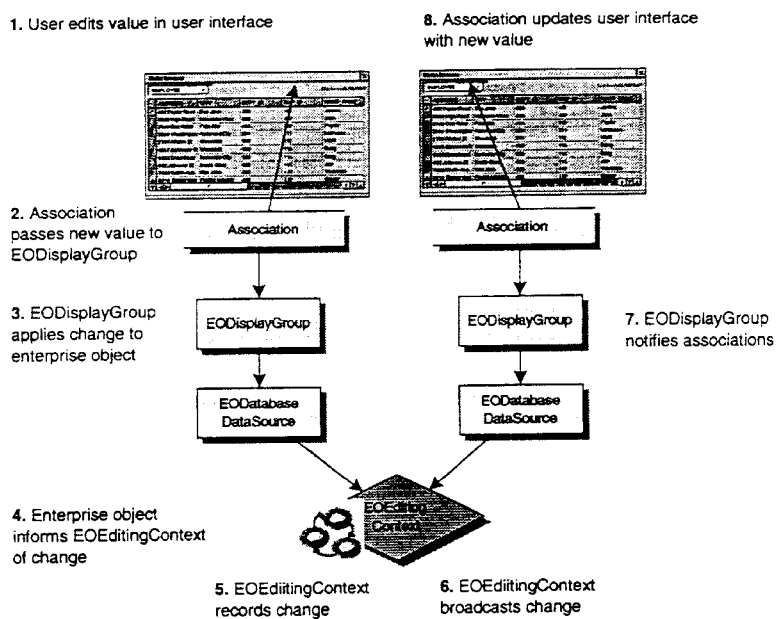

Figure 2. *Flow of Events When a User Edits Data*

Saving Changes to the Database

The EOEditingContext is also involved when changes made to enterprise objects (for example, by a user editing a value in the user interface) are saved to the database. Figure 3 illustrates the sequence of events:

Chapter 1    Architectural Overview

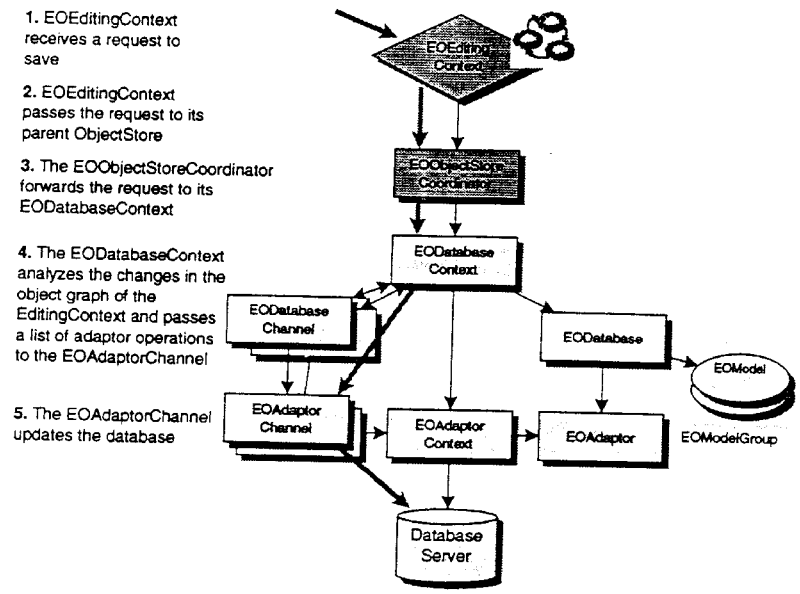

1. EOEditingContext receives a request to save

2. EOEditingContext passes the request to its parent ObjectStore

3. The EOObjectStoreCoordinator forwards the request to its EODatabaseContext

4. The EODatabaseContext analyzes the changes in the object graph of the EditingContext and passes a list of adaptor operations to the EOAdaptorChannel 5. The EOAdaptorChannel updates the database Figure 3. *Saving Changes to the Database*

What Is an Enterprise Object?

An enterprise object is like any other Objective C object, in that it couples data with the methods for operating on that data. However, an enterprise object class has certain characteristics that distinguish it from other Objective C classes:

- It has properties that map to *stored* data; an enterprise object instance typically corresponds to a single row or record in a database.

- It knows how to interact with other parts of the Framework to give and receive values for its properties.

What Is an Enterprise Object?

The ingredients that make up an enterprise object are its class definition and the data values from the database row or record with which the object is instantiated. If the data store is a relational database, a third ingredient in an enterprise object is the model that defines the mapping between the class's object model and the database schema. For more information, see "Models" on page 26.

The mechanism that enables an enterprise object to exchange its values with other parts of the Framework is the EOKeyValueCoding informal protocol, described in the next section.

Enterprise Objects and Data Transportation

The EOKeyValueCoding informal protocol is the means by which data moves through the Framework. Regardless of their other characteristics, objects that conform to the key-value coding protocol (such as enterprise objects) have one thing in common: their data is accessed by other parts of the Framework as *key-value pairs*. Key-value coding methods enable an object to receive values for its keys and to give out its keys' values to other parts of the Framework.

By using key-value coding, different types of objects can pass their values to each other, thereby transporting data through the layers of the Framework. When data comes out of the database into the Framework, for example, it's initially packaged in dictionaries from which newly-instantiated enterprise objects get their values (remember, dictionaries are objects that contain data as key-value pairs). Conversely, when data is transported from enterprise objects back to the database, it's repackaged as dictionaries. Note that an enterprise object can itself carry its properties as an NSDictionary object or as regular instance variables; key-value coding applies in either case.

Figure 4 shows how the properties in an enterprise object correspond to the key-value pairs in a dictionary, and how both in turn correspond to a row in a relational database. Enterprise object properties and dictionary keys (such as firstName and lastName) map to columns in the database; the value for each key (for example, "Lesly" and "Oswald", respectively) matches the column's value for the corresponding row.

Note: An enterprise object class doesn't have to map to a single table in a database; it can contain references to multiple tables and have properties for which there are no corresponding database columns. The mapping described in this section refers to the simplest case.

Chapter 1　　　　　Architectural Overview

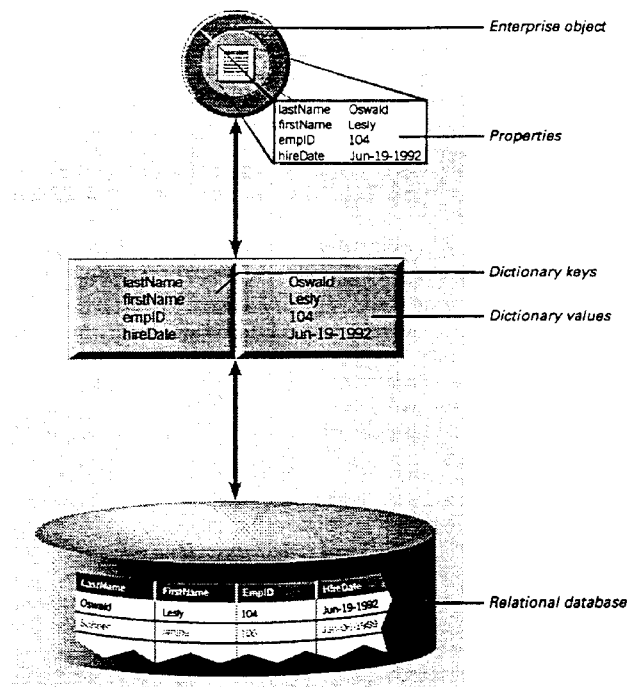

Figure 4.　*Enterprise Objects, Dictionaries, and the Physical Database*

An enterprise object can be an instance of either EOGenericRecord or a custom class. EOGenericRecord is the default enterprise object class; a generic record uses an NSDictionary to store its properties, and like custom enterprise objects, conforms to the key-value coding protocol. You use a generic record when you don't need to define special behavior for an enterprise object. A custom class, on the other hand, can carry its properties as a dictionary or as instance variables, but it adds behavior beyond that supplied by key-value coding.

Enterprise Objects Framework Classes

The Enterprise Objects Framework classes are grouped into the following areas:

- User Interface
- Interface Layer
- Data Source (EODatabaseDataSource)
- Control Layer
- Access Layer
- Modeling Classes Each of these areas and the classes it contains are described in the following sections. Figure 5 shows the classes that play major roles in the Enterprise Objects Framework and their relation to each other.

Chapter 1    Architectural Overview
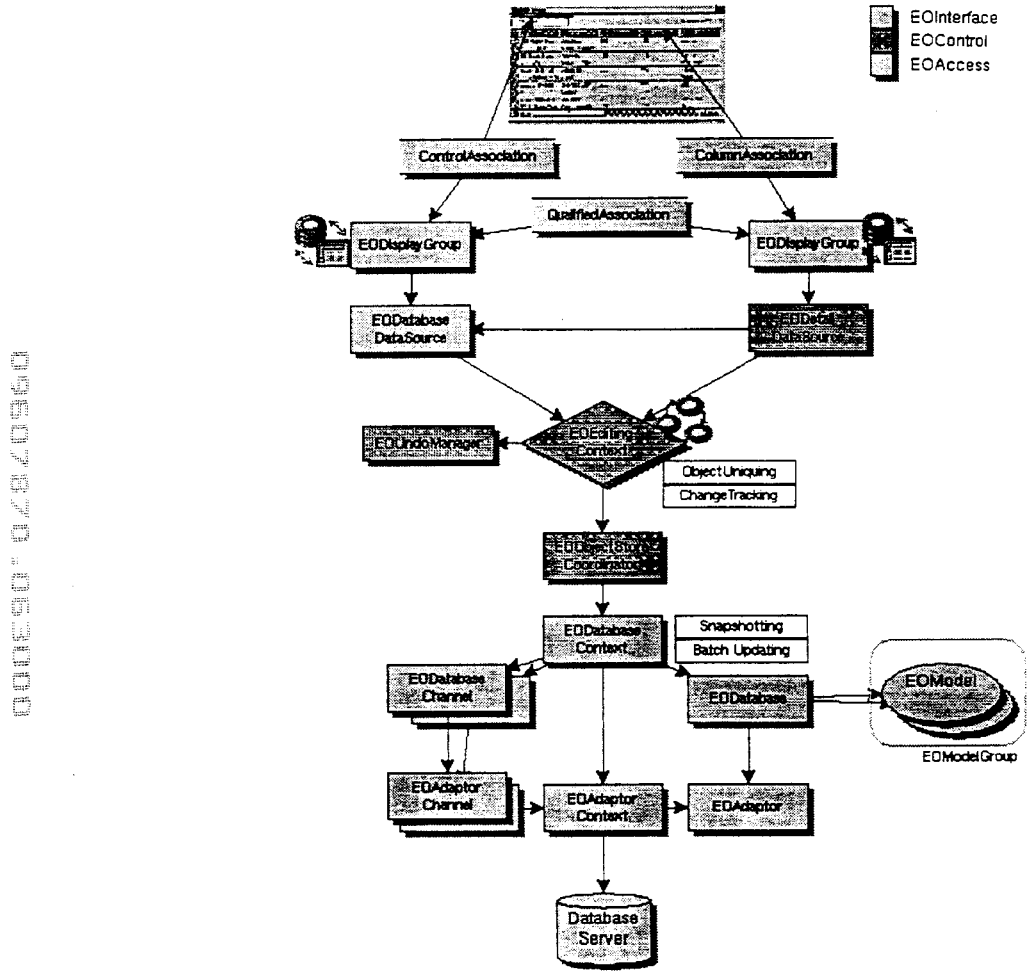
Figure 5.  *Enterprise Objects Framework Detailed Architecture*

User Interface Objects

User Interface Objects

User interface objects such as PopUpLists, Forms, TextFields, and NSTableViews can display the values of enterprise objects, and, if the values are edited in the user interface, communicate the changes back to the enterprise objects.

The relationship between user interface objects and enterprise objects is managed by an instance of the EODisplayGroup class. EODisplayGroup are used by EOAssociation objects to mediate between enterprise objects and the user interface. EOAssociations link a single user interface object to one or more class properties (keys) in an enterprise object or objects managed by the EODisplayGroup. The properties' values are displayed in the association's user interface object.

The Interface Layer

In the Interface layer, EOAssociation objects "observe" EODisplayGroups to make sure that the data displayed in the user interface remains consistent with enterprise object data. EODisplayGroups interact with a data source, which supplies them with enterprise objects.

The Data Source

A data source is an object subclassed from the EODataSource abstract class that presents an EODisplayGroup object with a standard interface to a store of enterprise objects. From the perspective of the EODisplayGroup to which a data source supplies enterprise objects, the actual mechanism used for storing data is of no concern; everything below the data source is effectively a "black box." The interface layer interacts with all data sources in the same way. A data source takes care of communicating with the external data store to fetch, insert, update, and delete objects.

For most database applications, the data source is an instance of the class EODatabaseDataSource or EODetailDataSource (the data source classes supplied with the Framework). EODatabaseDataSource provides an interface to the Framework's access layer and ultimately, to a relational database.

However, the data source can be any object subclassed from EODataSource. Thus, the user interface layer can be used independently from the access layer for other types of data sources, such as an array of objects constructed by an application, or objects fetched from a flat-file database or a newsfeed.

The Control Layer

Within an Enterprise Objects Framework application, enterprise objects are the focal point. They encapsulate the most current data for your application (including data that hasn't been committed to the database yet), and the business logic for operating on that data.

The control layer facilitates the central role of enterprise objects by providing an infrastructure for them that is independent of the user interface and the storage mechanism being used. From a development standpoint, this means that you can use the classes in the control layer to write enterprise objects that have no dependencies on the interface layer or the access layer. The control layer dynamically manages the interaction between these objects and the rest of your application by:

- Tracking changes to enterprise objects
- Updating the user interface when object values change
- Updating the database when changes to objects are committed
- Managing undo in the object graph
- Managing uniquing

*Uniquing* is used in the Framework to uniquely identify enterprise objects and maintain their mapping to stored data. Enterprise objects have a *primary key*, which is defined in the model that maps the object to the database. This primary key is used to maintain the identification between an enterprise object instance and a corresponding database row. For example, an enterprise object class can have as its primary key an instance variable empID. An instance of the class can have a value of 115 for empID; this identifies it with the database row that has the value 115 for the empID column. Uniquing is also used to ensure that if an object already exists in memory, another instance of it isn't created when a row with the same primary key is fetched from the database. So, for example, if two employee objects have the same manager, a single instance of the manager object resides in memory, and both employee objects refer to it.

The control layer's major areas of responsibility and the classes involved are described in the following table:

The Control Layer

| Responsibility | Classes |
|---|---|
| Object Graph Management | EOEditingContext<br>EOUndoManager<br>EOObserver |
| Object Storage Abstraction | EOObjectStore<br>EOGlobalID<br>EOFault |
| Object Query Specification | EOQualifier<br>EOKeySortOrdering<br>EOFetchSpecification |
| Protocols to interface with enterprise objects | Validation (EOClassDescription)<br>EOKeyValueCoding |
| Simple Source of Objects (for EODisplayGroup) | EODataSource<br>EODetailDataSource |

Because they constitute major conceptual pieces of the Enterprise Objects Framework architecture, object graph management and the object store abstraction are discussed in more detail in the following sections.

Object Graph Management

An object graph is a group of related business objects that represent an internally consistent view of one or more external stores. In a running application, the object graph is the central repository for data and business logic. The class that plays the most significant role in object graph management is EOEditingContext.

EOEditingContext

The EOEditingContext, which represents a single "object space" or document in an application, manages a graph of enterprise objects. All objects fetched from an external store are registered in an EOEditingContext along with a global identifier (EOGlobalID) that's used to uniquely identify each object to the external store. The EOEditingContext is responsible for watching for changes in its objects (using the EOObserving protocol) and recording snapshots for object-based undo.

The object graph that an EOEditingContext monitors is created by the EOEditingContext's parent EOObjectStore. The EOEditingContext is itself an EOObjectStore, which gives it the ability to act as an EOObjectStore for another EOEditingContext. In other words, EOEditingContexts can be nested, thereby allowing a user to make edits to an object graph in one editing context and then discard or commit those changes to another object graph (which, in turn, may commit them to an external store). A single enterprise object instance exists in one and only one context, but multiple copies of an object can exist in different EOEditingContexts. Thus object uniquing is scoped to a particular EOEditingContext.

Object Storage Abstraction

The class that plays the most significant role in the Enterprise Objects Framework storage abstraction is EOObjectStore.

EOObjectStore

EOObjectStore defines a abstract class for objects that act as an "intelligent" source and sink of objects for an EOEditingContext. The object store is responsible for constructing and registering objects, servicing object faults, and committing changes made in an EOEditingContext.

Some of the subclasses of EOObjectStore are EOEditingContext (for use in nested EOEditingContexts), EODatabaseContext, and EOObjectStoreCoordinator (for coordinating multiple object stores).

The Access Layer

The access layer allows your application to interact with database servers at a high level of abstraction. The access layer is divided into two parts:

- A *database level* that allows applications to treat records as full-fledged enterprise objects.

- An *adaptor level* for server-independent access to records that don't have custom behavior.

Working with the access layer allows you to have a finer level of control over database operations.

The top row of classes in Figure 6 (EODatabase, EODatabaseContext, and EODatabaseChannel) constitutes the database level. The bottom row of classes (EOAdaptor, EOAdaptorContext, and EOAdaptorChannel) constitutes the adaptor level. EOModel objects are used by the access layer to log into a database server and establish the mapping between an enterprise object and database data. The database level, adaptor level, and models are described in the following sections.

The Access Layer

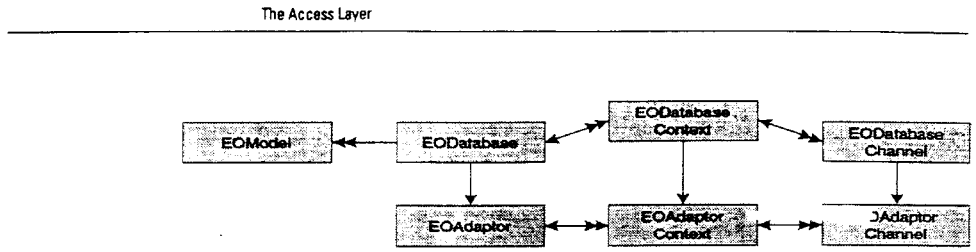

Figure 6. *The Access Layer*

The Database Level

The database level is where enterprise objects are created from the dictionaries retrieved by the adaptor level. It's also where snapshotting is performed. *Snapshotting* is used by Enterprise Objects Framework to manage updates. When an object is fetched from the database, a snapshot is taken of its state. A snapshot is an NSDictionary object; it's consulted when you perform an update to verify that the data in the row to be updated has not changed since you fetched the object.

Figure 7 shows the database level classes and the behaviors associated with each class.

Snapshotting, connection to the database

Manages channels and transactions, handles saving and faulting

Used as a slave to EODatabaseContext for fetching

Figure 7. *Database Level*

The Adaptor Level

While the database level deals with data packaged as enterprise objects, the adaptor level deals with database rows packaged as dictionaries. An adaptor is the mechanism through which your application communicates with a database server.

Figure 8 shows the database level classes and the behaviors associated with each class.

Chapter 1   Architectural Overview

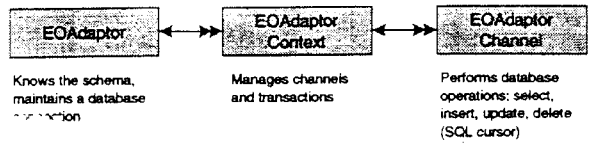

Figure 8.   *Adaptor Level*

The adaptor level classes define a server-independent interface for working with relational database systems. Server-specific subclasses encapsulate the behavior of database servers, thereby offering a uniform way of interacting with servers while still allowing applications to exploit their unique features.

Models

The correspondence between an enterprise object class and stored data is established and maintained by using a *model*. A model defines, in entity-relationship terms, the mapping between enterprise object classes and a physical database. A model maps an enterprise object and its properties to an entity and the entity's attributes and relationships, which in turn map to the tables and columns in a database. Figure 9 shows the modeling classes, including the class EOJoin. Join objects identify the entities and attributes that are linked by a relationship.

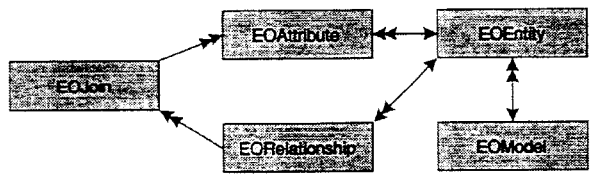

Figure 9.   *Modeling Classes*

The following table describes the database-to-object mapping provided in a model:

Models

| Database Element | Class |
|---|---|
| Data Dictionary | EOModel |
| Table | EOEntity |
| Column | EOAttribute |
| Row | Enterprise object class |

While a model can be generated at run time, the most common approach is to use the EOModeler application to create models that can be stored as files and added to a project. Creating a model is typically the first step in writing an application. You use a model throughout the development and deployment of your application to maintain the mapping between enterprise objects and persistent data.

In addition to storing a mapping between the database schema and enterprise objects, a model file stores information needed to connect to the database server. This connection information includes the name of an adaptor bundle to load so that the Enterprise Objects Framework can communicate with the database.

Alpha Note: For a discussion of entity-relationship modeling and how it relates to Enterprise Objects Framework, see the on-line document "Entity-Relationship Modeling" in NextLibrary/Documentation/NextDev/EnterpriseObjectsFramework1x/Guide.

Chapter 2

USING EOMODELER

You use the EOModeler application to create models. A model defines, in entity-relationship terms, the mapping between a physical database and enterprise object classes.

You use EOModeler to:

- Read the data dictionary from a database to create a default model, which can then be tailored to suit the needs of your application.

- Specify enterprise object classes for the entities in your model.

- Generate template source code files for the enterprise object classes you specify.

- Generate SQL that can then be used to create database tables.

A model enables an enterprise object to remain synchronized with a corresponding database row throughout the execution of your application. Models are fully accessible to your application; at run time you can dynamically generate new models or change the mapping in existing models.

Models

Although a model can be generated dynamically at run time, you typically create models using EOModeler and then add them to your project as model files.

In EOF 2.0, models are designed to be loaded incrementally for improved performance. A model actually consists of one global file, with a separate file for each entity. Entity descriptions are loaded in to an application as needed. Models have an .eomodeld file wrapper (which is actually a directory), and the individual entity files within the model are in ASCII format. If you want to view the ASCII files in a model, open the .eomodeld directory. This displays a window listing the individual entity files in the model. Each of these files has a .plist extension, indicating that the files' contents are in ASCII property list format. You can view the file for a particular entity in a text editor.

The global file has the name eomodel.plist. It contains the connection dictionary, the adaptor name, and a list of all of the entities in the model.

Models describe the database-to-enterprise object mapping by using the modeling classes EOModel, EOEntity, EOAttribute, and EORelationship (EORelationships include additional information in the form of EOJoin objects).

The following table describes the general database-to-object mapping provided in a model:

Chapter 2  Using EOModeler

| Database Element | Class |
|---|---|
| Data Dictionary | EOModel |
| Table | EOEntity |
| Column | EOAttribute |
| Row | Enterprise object class (or EOGenericRecord, if a custom enterprise object class is not specified) |

While the modeling classes correspond to elements in the physical database, a model represents a level of abstraction above the database. Consequently, the mapping between modeling classes and database components doesn't have to be one-to-one. So, for example, while an EOEntity object described in a model file corresponds to a database table, in reality it can contain references to multiple tables. In that sense, it's actually more analogous to a database view. Similarly, an EOAttribute can either correspond directly to a column in the root entity, or it can be derived or flattened. A derived attribute typically has no corresponding database column, while a flattened attribute is added to one entity from another entity. For more information, see "Adding Derived and Flattened Attributes" on page 47.

You can store your model files anywhere, but to use a model in an application you must copy it into your application's project directory.

EOModeler

The EOModeler application is located in the /NextDeveloper/Apps directory and is represented by the icon shown in Figure 10.

Figure 10. *EOModeler's Application Icon*

Launch the application by double-clicking the icon, or by double-clicking an existing model file.

Figure 11. *The Model File Icon*

Creating a New Model

To create a model:

In EOModeler, choose New from the Model menu.

EOModeler displays a panel prompting you to select an adaptor, as shown in Figure 12.

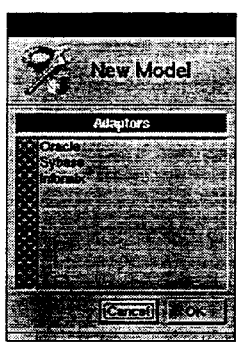

Figure 12. *Selecting an Adaptor*

Select the adaptor you want to use and click OK.

EOModeler displays the login panel for the database that corresponds to the selected adaptor. The examples in this chapter use the Oracle version of the Movie database included with the Enterprise Objects Framework; Figure 13 shows the Oracle login panel.

Chapter 2　　　Using EOModeler

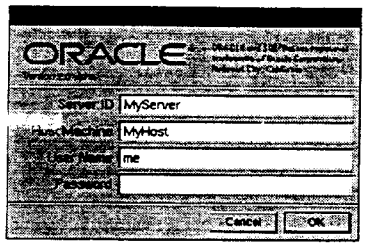

Figure 13. *Oracle Login Panel*

Fill in the login panel and click OK.

Using the Model Editor in Table Mode

When you first log in to a database, EOModeler uses an adaptor to read the data dictionary from the database and create the original model. This model is displayed in the Model Editor, shown in Figure 14, which lists the entities available for the database you specified in the login panel. EOModeler uses the table mode of the Model Editor to display the new model. You can also use Browser Mode in the Model Editor—for more information see "Using the Model Editor in Browser Mode" on page 36.

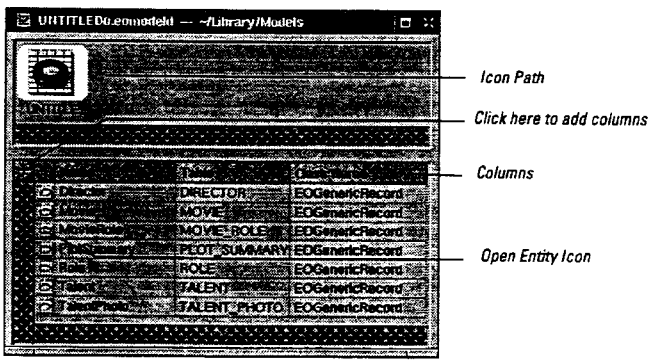

Figure 14. *The Model Editor in Table Mode*

Icon Path

The icon path changes to indicate your current location as you navigate around a model. For example, in Figure 15, the icon path indicates that the current selection is the lastName attribute in the Talent entity, which is part of the Movies model.

Figure 15. *Icon Path*

You can click on any icon in an icon path to navigate to that part of the model. You also use the icons in the icon path in drag and drop operations—for example, to drag an entity into the Data Browser (described below) or Interface Builder (described in the next chapter).

Open Entity Icon 

When you double-click the  icon to the left of an entity, it displays that entity's attributes.

 Menu

You use the ![] menu to add columns for an entity. Each column represents a different characteristic you can set for an entity. By default, when you first run EOModeler the table mode has just three columns: Name, Table, and Class Name. The ![] menu provides these additional items: Open Entity, Parent, and External Query. The following table describes the characteristics you can set for an entity.

Chapter 2  Using EOModeler

| Characteristic | What it is |
|---|---|
| Open Entity | Adds a column with the Open Entity icon, which you can double-click on to display an entity's attributes. |
| Name | The name your application uses for the entity. By default, EOModeler supplies names based on the name of the corresponding table in the database. |
| Table | The name of the database table that corresponds to the entity. |
| Class Name | The name of the class that corresponds to the entity. If you don't define a custom enterprise object class for an entity, by default its class is EOGenericRecord. |
| Parent | Indicates an entity's parent—used to model inheritance. |
| External Query | Any SQL statement that will be executed as is—on Sybase, this can be a stored procedure. |

Using the Model Editor in Browser Mode

To see the Model Editor in browser mode, choose Browser Mode from the Tools menu.

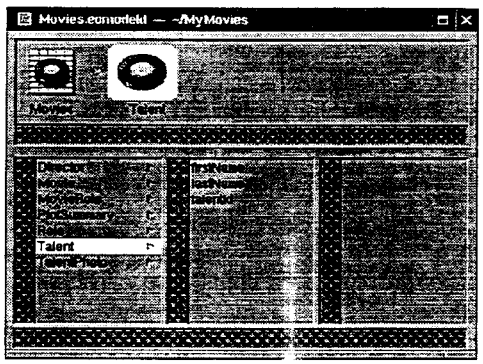

Figure 16. *Model Editor in Browser Mode*

To display the attributes for a particular entity, such as Talent, select the entity. The attributes appear in the column to the right of the entity.

What a Default Model Includes

When you create a new model, the information it includes depends on how completely you've specified the underlying database. EOModeler can read all of the following from a database and include it in a default model:

- Table and column names
- Column data types, including the width constraint of string data types
- Primary keys
- User constraints, such as null constraints and uniqueness
- Foreign key definitions (which are expressed in a model as relationships)
- Stored procedures A model contains not only the information it reads from the database, but values it derives from that information, including:

- Entity and attribute names
- A mapping between the data type of a database column and the corresponding Objective-C type EOModeler derives entity names by taking a database table name and making all of it lowercase everything for the first letter. It then removes underbar (_) characters and capitalizes any characters following underbars. For example:

| Database Table | Entity Name |
| --- | --- |
| EMPLOYEE | Employee |
| EMPLOYEE_PHOTO | EmployeePhoto |
| TEST_OF_SEVERAL_WORDS | TestOfSeveralWords |

Attribute names are based on corresponding database columns. They're derived in the same way as entities, except that EOModeler doesn't capitalize the first character. For example:

| Database Column | Attribute Name |
| --- | --- |
| NAME | name |
| FIRST_NAME | firstName |
| MOVIE_ID | movieId |

PRELIMINARY

Chapter 2  Using EOModeler

Using the Data Browser

You can use the Data Browser to display the database records associated with an entity in the Model Editor.

To display an entity's records in the Data Browser:

1. Choose Data Browser from the Tools menu.

EOModeler displays an empty Data Browser.

To browse the records associated with an entity, select the entity icon in the Model Editor and drag it into the Entity well of the Data Browser, as shown in Figure 17. To view a subset of the attributes for an entity, select one or more attributes and drag the associated icon into the Entity well.

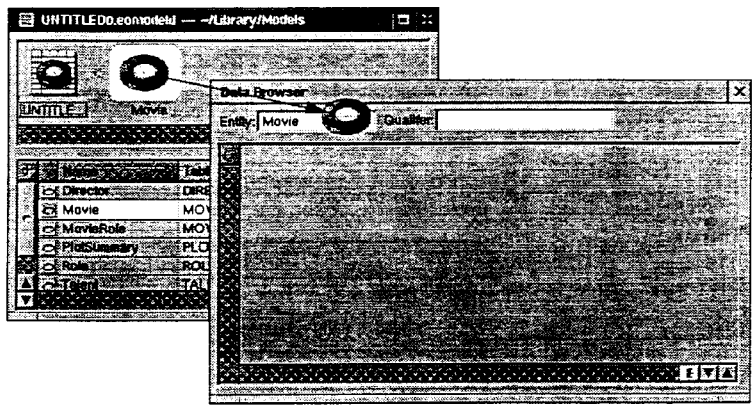

Figure 17. *Dragging an Entity into the Data Browser*

The Data Browser fills with data, as shown in Figure 18.

Figure 18. *The Data Browser Filled with Data*

You can rearrange the columns in the Browser by dragging their title tabs to new positions. You can also resize columns by selecting their title tabs and dragging the tab edges until the column is the desired size.

You can change the sorting order of the Browser by using the buttons in the lower right corner. By default, the data is displayed according to how it was returned from the database. However, you can sort on the first column in either ascending or descending order by clicking the appropriate sort button. So, for example, to sort the records alphabetically by the movie name in the Movie database, drag the title column into the first column of the Browser and click the ascending sort button. To restore the order of the data as it was returned from the database, click the default order button.

Inspecting and Modifying Attributes

EOModeler provides two mechanisms for viewing and modifying your attributes: the table mode of the Model Editor, and the Attribute Inspector.

You can use either mechanism to examine the characteristics of the attributes in your model and make any necessary refinements. You can use the Model Editor for most common operations, but for some more sophisticated changes you need to use the Inspector.

Working with Attributes in Table Mode

To display an entity's attributes in table mode, double-click the icon to the left of an entity:

Chapter 2  Using EOModeler

Double-click here

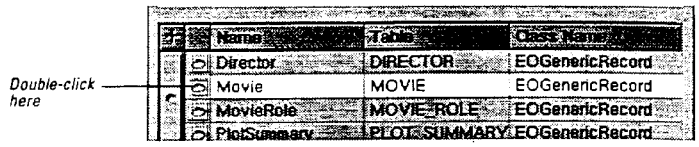

Figure 19. *Double-click an Open Entity Icon to Display Attributes*

The display changes to show all of the entity's attributes, as shown in Figure 20.

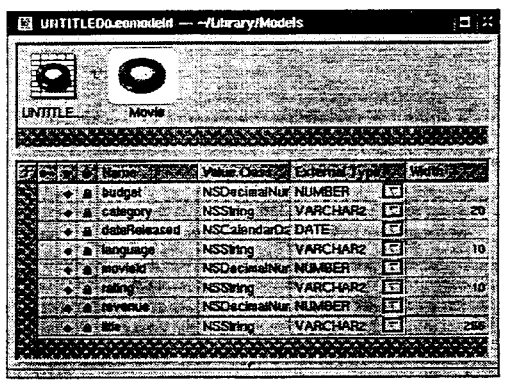

Figure 20. *Displaying an Entity's Attributes*

You can use this view to modify an attribute's characteristics (alternatively, you can use the Attribute Inspector). Each column corresponds to a single characteristic of the attribute, such as its name or its external type (that is, the type by which it's represented in the database). By default, the columns included in this view only represent a subset of the possible characteristics you can set for a given attribute. To add columns for additional characteristics, you use the ▦ menu at the upper left corner of the table. The following table describes all of the characteristics for which you can add columns.

40  PRELIMINARY

| Characteristic | What it is | How you modify it |
|---|---|---|
| Primary Key | Declares whether a property is, or is part of, the primary key for the entity. | Click in the column to toggle primary key off and on. |
| Class Property | Indicates a property that meets both of these criteria: you want to include it in your class definition, and it can be fetched from the database. | Click in the column to toggle class property off and on. |
| Locking | Indicates whether an attribute should be used for locking when an update is performed. | Click in the column to toggle locking off and on. |
| Name | The name your application uses for the attribute. EOModeler supplies default names derived from the name of the corresponding column in the database. You can edit these names if desired. | Edit the table cell. |
| Value Class | The Objective-C type to which the attribute will be coerced in your application. EOModeler supplies a default mapping between an attribute's type in the database and an Objective-C class. | Edit the table cell. |
| External Type | The data type of the attribute as it's understood by the database. | Choose another value from the pull-down list |
| Width | The maximum width (applies to string data only). | Edit the table cell. |
| Column | The database name of the column that corresponds to the attribute. | Edit the table cell. |
| Definition | The definition for a derived attribute. | Edit the table cell. |

Alpha Note: In this prerelease, you may notice that not all of the options on the 
menu are included in this table. The options that are omitted—Calendar Format, Insert Format, Update Format, Select Format, and Value Type—are obsolete.

Forming a Relationship

If the database on which your model is based includes definitions for foreign keys, these definitions will automatically be expressed in your model as ready-made relationships.

You can also explicitly form a relationship between entities if one doesn't already exist. This relationship must reflect an actual relationship between the entities' corresponding tables in the database.

Chapter 2  Using EOModeler

Forming a relationship allows you to access data in a destination table that relates to data in a source table (it's also possible to have a reflexive relationship, in which the source and destination tables are the same). For example, to find all of the roles in a particular movie, you can form a relationship between the Role and Movie entities.

When you fetch an enterprise object, EOFault objects are created for the properties that represent relationships. An EOFault "stands in" for an enterprise object (or an array of enterprise objects) that hasn't yet been fetched from the database. The real objects are only fetched when you explicitly access them.

To form a relationship:

1. Select a source entity in the Model Editor, such as Movie, and navigate to its attributes by double-clicking its  icon.

2. Choose Add Relationship from the EOModeler Property menu.

3. Drag the "splitter" in the attributes window up until you can see the new relationship, as shown in Figure 21.

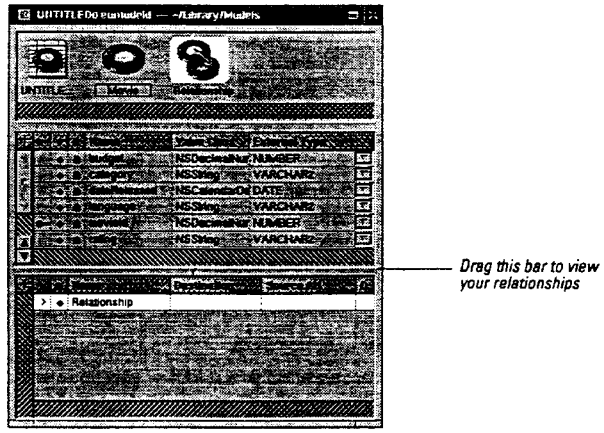

Drag this bar to view your relationships

Figure 21. *Adding a Relationship*

The text "Relationship" appears in the relationship table view at the bottom of the window. A single arrow denotes a to-one relationship. This is the default notation; you need to change it if the two entities have a to-many relationship (for example, a movie has many roles). When you define a relationship between two entities, make sure it reflects the actual relationship as defined in the database.

A to-one relationship from one primary key to another primary key must always have exactly one row in the destination entity—if this isn't guaranteed to be the case, use a to-many relationship. This rule doesn't apply to a foreign key to primary key relationship, where a NULL value for the foreign key in the source row indicates that no row exists in the destination. You specify the cardinality of a relationship (that is, whether it is to-many or to-one) in the Relationship Inspector.

4. Choose Inspector from the Tools menu to display the Relationship Inspector, as shown in Figure 22.

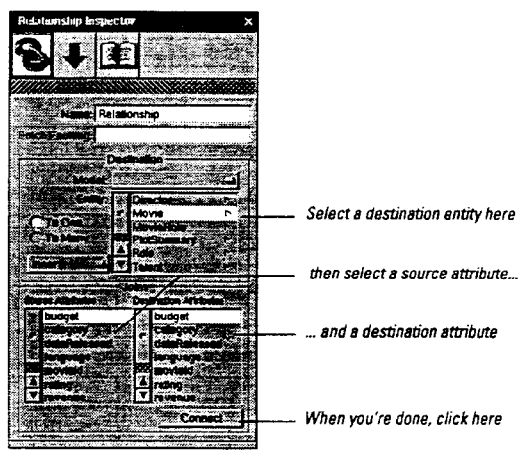

Figure 22. *The Relationship Inspector*

A relationship can be compound, meaning that it can consist of multiple pairs of connected attributes.

Chapter 2  Using EOModeler

You use the Relationship Inspector to specify information about the relationship, such as whether it's to-one or to-many, its semantics (that is, the type of join represented by the relationship), and the name of the destination model (if the destination isn't in the current model).

When you use the Relationship Inspector, remember that the settings you define must reflect the corresponding implementation in the database, as well as the features supported by your adaptor. EOModeler doesn't know, for example, if a relationship is to-one or to-many, or if your adaptor supports left outer joins. You need to know your database and your adaptor, and specify relationships accordingly. In addition, to-one relationships must join on the complete primary key of the destination entity as the join component.

5. In the Inspector, select the destination entity (Role) in the Destination browser.

Typically, you form a relationship by connecting a primary key in one entity and a corresponding foreign key in another entity. In a to-one relationship, the source entity usually holds the foreign key, while the destination entity holds the primary key. For example, movieId is a foreign key for Role, while it's the primary key for Movie.

6. Select the source attribute (movieId) in the Source Attributes browser.

7. Select the destination attribute (movieId) in the Destination Attributes browser, and click Connect.

8. Make sure the relationship has the proper cardinality (in this example it should be set to To Many since a movie has many roles).

9. By editing in either the Inspector or the relationship table view, give the relationship a name, such as "roles."

Figure 23 shows what the Model Editor and the Relationship Inspector look like when you get done specifying the relationship.

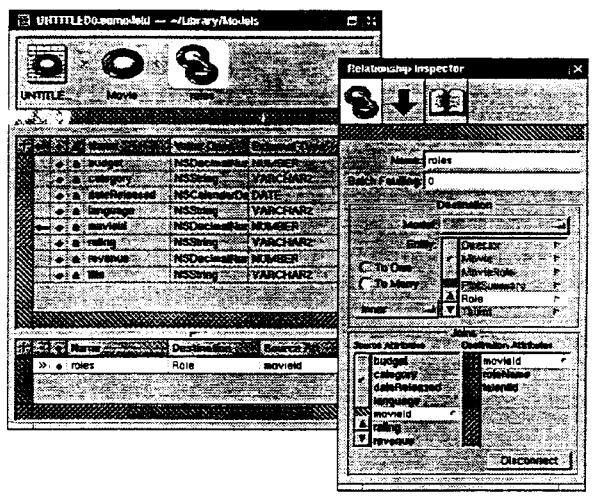

Figure 23. *Specifying the Relationship*

Adding Referential Integrity Rules

You can use the Relationship Inspector to add referential integrity rules for a relationship.

To add referential integrity rules:

1. Select the relationship for which you want to add rules.

2. In the Relationship Inspector, click the down-arrow icon at the top of the Inspector. This displays the Referential Integrity Inspector.

Chapter 2       Using EOModeler

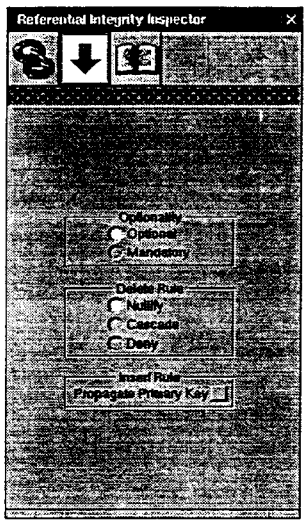

Figure 24. *Referential Integrity Inspector*

You can use the fields in the Referential Integrity Inspector to further specify a relationship.

Optionality
This field lets you specify whether a relationship is optional or mandatory. For example, you could require all departments to have a location (mandatory), but not require that every employee have a manager (optional).

Delete Rule
This field lets you specify the delete rules that should be applied to an entity that's involved in a relationship. For example, you could have a department with multiple employees. When a user tried to delete the department, you could:

- Delete the department without regard to its relationship (nullify)
- Delete the department and all of the employees it contains (cascade)
- Refuse the deletion if the department contains employees (deny)

Insert Rule

The Insert Rule field lets you specify that the primary key of the source entity should be propagated to newly inserted objects in the destination of the relationship.

Adding Derived and Flattened Attributes

The Enterprise Objects Framework supports three different kinds of attributes: simple, derived, and flattened. A simple attribute corresponds to a single column in the root table of the entity, and may be read or updated directly from or to the database.

A derived attribute doesn't map directly to a single column in the root table of the entity. For example, a derived attribute can be based on another attribute that's modified in some way, such as an attribute bonus that's the result of a calculation performed on a salary attribute. A derived attribute can also be an aggregate consisting of more than one attribute; for example, you can create a derived attribute fullName that is an aggregate of lastName and firstName.

Derived attributes, since they don't correspond to real values in the database, are read-only; it makes no sense to write a derived value.

A flattened attribute is a special kind of derived attribute that you effectively add from one entity to another by traversing a relationship. For example, when you form a to-one relationship between two tables (such as Role and Talent), you can add attributes from the destination entity to the source entity—for example, you could add a lastName attribute to Role to identify the actor who played a particular role. This is called "flattening" an attribute. Flattening an attribute is equivalent to creating a joined column; it allows you to create objects that extend across tables.

When Should You Use Flattened Attributes?

Flattening attributes is just one way to conceptually "add" an attribute from one entity to another. Another approach is to define key paths in Interface Builder, as described in the chapter "Creating an Enterprise Objects Framework Project." Key paths allow you to use pointers to traverse the object graph directly, where the most current values of your enterprise objects are maintained.

The difference between flattening attributes and using key paths is that the values of flattened attributes are tied to the database rather than the object graph. If an enterprise object in the object graph changes (for example, because a user changed a value in another part of the application), a flattened attribute can quickly get out of sync. For example, suppose that you flatten a deptName attribute into an Employee object. If a user then changes the employee's department pointer to a different department or changes the name of the department itself, the flattened attribute won't reflect the change until the changes in the object graph are committed to the database and the data is refetched. However, if you use a key path in this scenario, a user of your application sees changes to data as soon as they happen in the object graph. Using key paths ensures that your application's view of the data remains internally consistent.

Therefore, you should only use flattened attributes in the following cases:

- If you want to combine multiple tables to form a logical unit. For example, you might have employee data that's spread across multiple tables such as Address, Benefits, and so on. If you have no need to access these tables individually (that is, if you'd never need to create an Address object since the address data is always subsumed in Employee), then it makes sense to flatten attributes from those entities into Employee.

- If your application is read-only.

To flatten an attribute, the relationship you traverse must be a to-one relationship.

To flatten an attribute:

1. In the browser mode of the Model Editor, select the relationship that gives you access to the attribute you want to add to your entity.

For example, to add the name of an actor to Role, you can add and traverse a talent relationship and add the actor's last name (lastName) to Role as a flattened attribute. Note that this is a contrived example, because in this case it would be better to use a key path than to flatten an attribute.

2. Select the attribute you want to add (lastName), and choose Flatten Property from the Property menu.

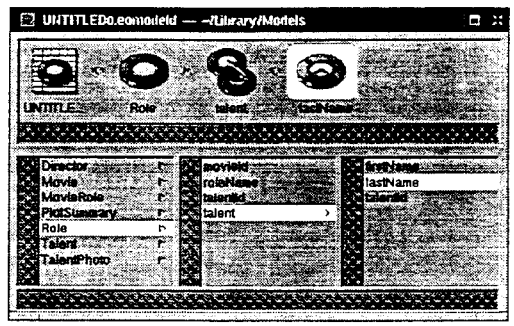

Figure 25. *Adding a Flattened Attribute*

The derived attribute (in this example, talent_lastName) appears in the list of properties for Role. The format of the name reflects the traversal path: the attribute lastName is added to Role by traversing the talent relationship.

Choose Inspector from the Tools menu to examine the derived attribute (talent_lastName) in the Inspector.

Chapter 2        Using EOModeler

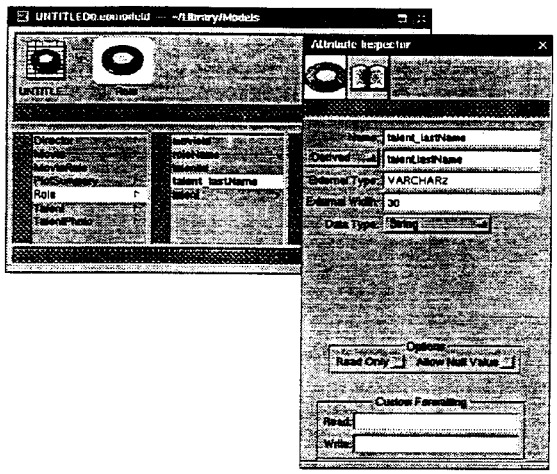

Figure 26. *Examining a Flattened Attribute in the Attribute Inspector*

In the Attribute Inspector, the pop-up list to the left of the Definition field identifies the attribute as "Derived".

Edit the Name text field to simplify the attribute name (for example, to "lastName").

The Definition field (the second text field from the top of the Attribute Inspector) must accurately reflect the attribute's external name and the table in which it resides. For example, if you edit its text to be "Name" and change its mode to "Column," it no longer maps to an existing attribute. In other words, only edit this field if you are sure you can predict the outcome.

To display the result of creating this flattened attribute, drag a selection of the Role entity's attributes into the Data Browser, as shown in Figure 27. Notice that the Browser includes a column for the flattened attribute lastName.

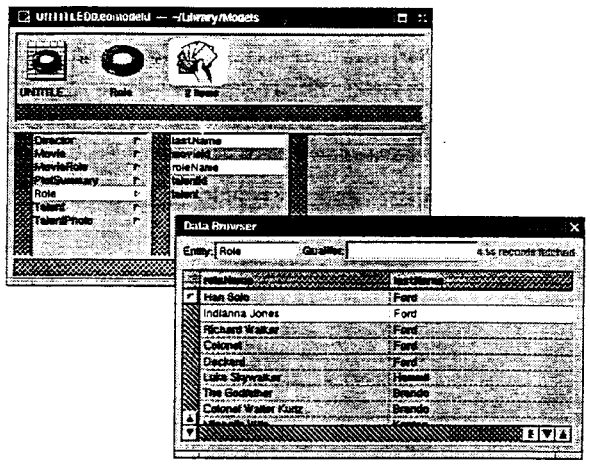

Figure 27. *Using the Data Browser to Check Your Model*

Displaying data associated with your model in the Browser is a good way to check that the model is synchronized with the database. If your model is out of sync with the database (for example, if you try to implement a relationship for which there is no corresponding relationship in the database), attempting to display data in the Browser will fail.

Adding a New Attribute

You can use the concept of derived attributes to add to an entity a new attribute that doesn't correspond to any database column. This attribute can contain a computed value, for example, or an aggregate of multiple attributes.

To add a new attribute to your entity:

1. In the Model Editor, select the entity (such as Talent) to which you want to add an attribute.

2. Choose Add Attribute from the Property menu.

A new attribute with the default name "Attribute" appears in the entity's list of attributes.

Chapter 2  Using EOModeler

3. In the Attribute Inspector, edit the Name field to supply a new name for the attribute.

For example, you can create an attribute called fullName that combines the firstName and lastName attributes. A safer way to achieve the same end would be to implement a method on your enterprise object—this would ensure that if the firstName or lastName attribute is modified, the derived attribute fullName will immediately reflect the change.

4. Use the pop-up list to the left of the Definition field to change the attribute type from Column to Derived.

5. Edit the Definition field to supply the SQL needed to specify the derived attribute.

For example, to concatenate the firstName and lastName attributes in Oracle, type the text FIRST_NAME||' '||LAST_NAME (the Sybase equivalent is FirstName+' '+LastName).

6. In the External Type field, add the attribute's data type (VARCHAR2). This should be the data type as it is in the database.

7. In the External Width field, type the width constraint for the attribute (this only applies to string values).

Figure 28 shows the Attribute Inspector with the new attribute fullName specified.

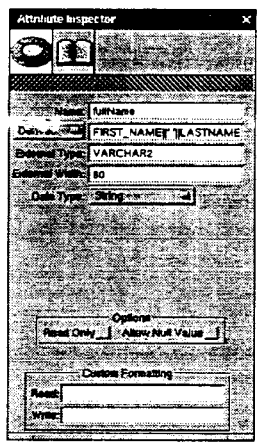

Figure 28. *Adding an Attribute*

The text you supply in the Definition field must be valid SQL for your database. While you can use either the internal or external names for simple attributes in this field, for derived and flattened attributes you have to use the internal names (flattened and derived attributes have no external names). For consistency's sake, you may want to use only internal names in this field.

Adding Flattened Relationships

In addition to flattening attributes, you can also flatten relationships. Flattening a relationship gives a source entity access to relationships that a destination entity has with other entities. It's equivalent to performing a multi-table join. Note that flattening either an attribute or a relationship can result in degraded performance when the destination objects are accessed, since traversing multiple tables makes fetches slower.

When Should You Use Flattened Relationships?

As discussed in "When Should You Use Flattened Attributes?" on page 47, flattening is a technique you should only use under certain conditions. Instead of flattening an attribute or a relationship, you can instead define key paths in Interface Builder, as described in the chapter "Creating an Enterprise Objects Framework Project." The advantage of using key paths is that they allow you to use pointers to traverse the object graph, thereby ensuring that your application has an internally consistent view of the data.

There is one scenario in which you might want to use a flattened relationship: if you're modeling a many-to-many relationship and you want to perform a multi-table hop to access a table that lies on the other side of an intermediate table. For example, in the Movie database, the Director table acts as an intermediate table between Movie and Talent. It's highly unlikely that you would ever need to fetch instances of Director into your application. In this situation, it makes sense to specify a relationship between Movie and Director, and flatten that relationship to give Movie access to the Talent table.

To flatten a relationship:

1. Add a relationship from one entity (*entity_1*) to a second entity (*entity_2*).

For example, you can add a to-many relationship from Movie to Director since a movie can have more than one director.

2. Add a relationship from *entity_2* to a third entity (*entity_3*).

For example, you can add a to-one relationship from Director to Talent. For each director a movie has, there is a corresponding single entry in the Talent table.

3. From *entity_1*, select the relationship to *entity_2* to display its properties.

In this example, from Movie select the relationship directors to display the properties of Director.

4. In the list of properties for *entity_2*, select the relationship (directors) you want to flatten and choose Flatten Property from the Property menu.

The flattened relationship (in this example, directors_talent) appears in the list of properties for Movie. The format of the name reflects the traversal path: The relationship talent is added to Movie by traversing the directors relationship.

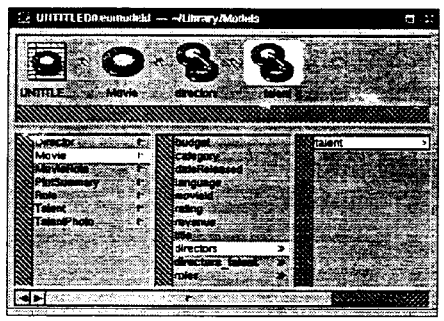

Figure 29. *Flattening a Relationship*

Working With Entities

Once you've refined your model, you're ready to specify enterprise object classes for the entities in the model. There are two stages to specifying an enterprise object class in EOModeler:

- Using the Model Editor or the Entity Inspector to set the characteristics of an entity and define the mapping between the entity and your enterprise object class.

- Optionally, generating template source files for the enterprise object class you specified in the Inspector.

Inspecting an Entity

You use the Entity Inspector to set an entity's characteristics and specify a mapping between the entity and an enterprise object class. You can also accomplish a lot of the same tasks using the table mode of the Model Editor, but this section just focuses on the Entity Inspector.

To inspect an entity, select the entity choose Inspector from the Tools menu.

Figure 30 shows the Entity Inspector for the Movie entity.

Chapter 2          Using EOModeler

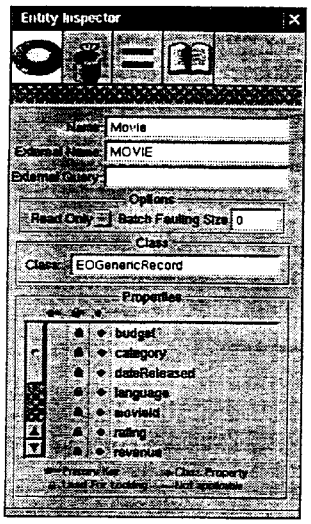

Figure 30. *The Entity Inspector*

Entity Names

The Name field lists the name your application uses for the entity. The External Name field contains the name of the root table in the database. You can change the internal name (that is, the name as it appears in the application), but you shouldn't change the external name unless you are sure you can predict the result.

The External Query field allows you to specify any SQL statement that will be executed as is (that is, you can't perform any substitutions). This can be a stored procedure. The columns selected by this SQL statement must be in alphabetical order by internal name, and must match in number and type with the class properties specified for the entity.

Options

The Options area contains the Read Only checkbox, which indicates whether the data that's represented by the entity can be altered by your application.

It also contains the Batch Faulting Size field, which lets you set the number of EOFaults that should be triggered when you first access an object of this type. By default, only one object is fetched from the database when you trigger an EOFault. By providing a number $N$ in this field, you specify that $N$ other EOFaults of the same entity should be fetched from the database along with the first one.

Class

The Class field initially contains the text "EOGenericRecord". This is because the default enterprise object class is an EOGenericRecord.

An EOGenericRecord:

- Knows the entity on which it is based.
- Carries its properties as a dictionary.
- Implements the EOKeyValueCoding protocol.

To specify a custom class, type the name of the class in this field. For more information on EOKeyValueCoding and creating custom classes, see "Specifying an Enterprise Object Class" on page 58.

Properties

The Properties area lets you specify the properties you want to include in your enterprise object class and set characteristics for them.

There are three columns in this area. Each column displays the status of a particular setting: Primary Key, Used For Locking, and Class Property. Icons are used to indicate that a setting is enabled for a particular property; the dash icon indicates that a setting is not applicable to a property. You add and delete icons by clicking the appropriate column next to the property.

The Primary Key column is used to declare whether a property is, or is part of, the primary key for the enterprise object class. To create a compound primary key, you simply add a Primary Key icon to the column for each property you want to include in the primary key.

Adding a primary key to your enterprise object class is mandatory; the primary key is the means by which an enterprise object is uniquely identified within your application and mapped to the appropriate database row.

The Used For Locking column indicates whether an attribute should be checked for changes before an update is allowed. This setting applies when you're using Enterprise Object Framework's default update strategy, optimistic locking. Under optimistic locking, the state of a row is saved as a *snapshot* when you fetch it from the database. When you perform an update, the snapshot is checked against the row to make sure the row hasn't changed. Note that if you set Used For Locking for an attribute whose data is a BLOB type, it can have an adverse effect on system performance. By default, the Entity Inspector sets all of an entity's attributes to be used for locking.

The Class Property column is used to indicate properties that meet both of these criteria: You want to include them in your class definition, and they can be fetched from the database. By default, the Entity Inspector sets all of an entity's properties as belonging to your class; you can remove a property by clicking its Class Property icon. If you define an attribute that doesn't exist in the database but is used by your application (such as a status flag), you should remove its Class Property icon; note that generated template source files won't include instance variable declarations for these attributes—you'll have to type those in by hand. If you don't remove the Class Property icon for an attribute that has no corresponding database value, it will result in a server error when your application attempts to fetch the property from the database.

The only properties an enterprise object must include to be viable are those properties (or property) that define a primary key. Only properties you include in the class will be sent to the enterprise object through key-value coding. Relationships you include as class properties will have EOFaults created for them.

Specifying an Enterprise Object Class

Specifying an enterprise object class for an entity applies the mapping defined in your model to your custom class, thereby enabling objects of the class to be created from corresponding database rows.

To specify the enterprise object class for an entity:

1. Determine the properties from the entity that you want to include in your enterprise object class; every property you want to include should have a corresponding Class Property icon set for it.

2. If the entity does not already have a primary key specified, add a Primary Key icon for the property or properties that constitute the entity's primary key.

Remember that the primary key or keys you set for your enterprise object class must mirror the primary key or keys defined for the corresponding table in the database.

What you do after this point depends on how you plan to implement your enterprise object class. Note that in all cases, an enterprise object class must conform to the informal protocol EOKeyValueCoding, which specifies methods for accessing values associated with keys ("keys" in this context relates to key-value pairs, not to primary keys). But this can be accomplished very differently, depending on the approach you use.

You can do any one of the following, depending on the needs of your application:

- Use EOGenericRecord.

If you don't edit the Class field to specify a name for a custom class, the Framework uses EOGenericRecord as an enterprise object class by default. A generic record uses a dictionary to store key-value pairs that correspond to an entity's properties and the data associated with each property. Generic records implement the key-value coding methods takeValue:ForKey: and valueForKey:. Use EOGenericRecord when you don't need to define special behavior for your class.

To use EOGenericRecord, simply leave the text "EOGenericRecord" in the Class field in the Entity Inspector.

- Create a custom class that uses the default implementation of key-value coding. If you plan to create a custom class, you must type its name in the Class field.

In accessing an object's class property, the default implementations of the key-value coding methods use the class definition as follows:

1. The key-value coding method looks for an accessor method based on the property name. For example, with a property named lastName, takeValue:ForKey: looks for a method of the form setLastName: (note that the first letter of the property name is made uppercase), and valueForKey: looks for a method of the form lastName.

2. If the key-value coding method doesn't find an accessor method, it looks for an instance variable whose name is the same as the property's and sets or retrieves its value directly. In setting an instance variable, takeValue:ForKey: autoreleases the old value and retains the new one.

If you generate template source files for your class, the resulting header and implementation files include definitions of instance variables and accessor methods that can be used by key-value coding. See "Generating Template Source Code Files" on page 60.

Figure 31 shows the Model Editor and the Entity Inspector after the primary key and properties have been set.

Chapter 2     Using EOModeler

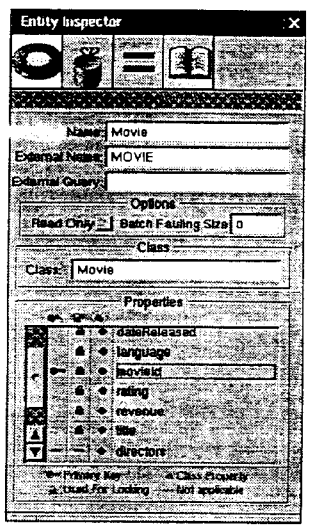

Figure 31. *Specifying a Class for an Entity*

In Figure 31, note that:

- In the Inspector, the property movieId has been designated as the enterprise object class's primary key. It's also set to be a class property, but as a general rule, you shouldn't set a primary key to be a class property unless the key has meaning in your enterprise object or it needs to be displayed in the user interface.

- For the relationship directors, the Inspector automatically displays the Not applicable icons in the Primary Key and Used For Locking columns.

Generating Template Source Code Files

Once you finish specifying an enterprise object class, you can generate template source code files for it. However, at this stage of the development process, you may want to first create your project and design your application's user interface in Interface Builder. Once you've created a project using Project Builder and included a model file in it, you can generate your template source files and include them directly into the project. For more information on using Project Builder and Interface Builder, see the chapter "Creating an Enterprise Objects Framework Project."

Generating template files produces:

- A header (.h) file that declares instance variables for all of the class properties you specified in the Inspector, and accessor methods for those instance variables.

In the header file, instance variables that correspond to attributes are declared with the type that was specified for them in the Attribute Inspector. This can be an NSString, an NSCalendarDate, an NSDecimalNumber, or a custom data type. Instance variables that represent relationships are declared to be of type NSArray.

- An implementation (.m) file that provides basic implementations for the accessor methods.

To generate template source code files for your enterprise object class:

1. In the Model Editor, select the entity for which you have specified a class in the Entity Inspector.

EOModeler only permits you to create template source files for entities for which you have specified a custom enterprise object class. In other words, you can't generate template files for EOGenericRecord.

2. Choose Create Template from the Property menu.

EOModeler displays a Choose Directory panel. If you opened the model file from Project Builder, the Choose Directory panel displays the project as the default destination.

3. Choose a destination, supply a name for the files if you want, and click OK.

If you don't supply a name, the template files are named after the enterprise object class for which they are being generated and are given the appropriate extensions.

If you opened the model file from a project, an additional panel appears, confirming that you want to insert the files in your project.

The files are generated in the specified location.

Chapter 2  Using EOModeler

For example, suppose you define an enterprise object class Movie. The header file generated for this class would resemble the following:

```
// Movie.h
//
// Created on Wed Feb 07 19:21:52 PST 1996 by NeXT EOModeler Version 252 import <EOControl/EOControl.h>

@interface Movie : NSObject
{
    NSDecimalNumber *budget;
    NSString *category;
    NSCalendarDate *dateReleased;
    NSString *language;
    NSDecimalNumber *movieId;
    NSString *rating;
    NSDecimalNumber *revenue;
    NSString *title;
    NSArray *directors;
    NSArray *directors_talent;
} ifdef ACCESSOR_METHODS
- (void)setBudget:(NSDecimalNumber *)value;
- (NSDecimalNumber *)budget;
- (void)setCategory:(NSString *)value;
- (NSString *)category;
- (void)setDateReleased:(NSCalendarDate *)value;
- (NSCalendarDate *)dateReleased;
- (void)setLanguage:(NSString *)value;
- (NSString *)language;
- (void)setMovieId:(NSDecimalNumber *)value;
- (NSDecimalNumber *)movieId;
- (void)setRating:(NSString *)value;
- (NSString *)rating;
- (void)setRevenue:(NSDecimalNumber *)value;
- (NSDecimalNumber *)revenue;
- (void)setTitle:(NSString *)value;
- (NSString *)title;
- (void)setDirectors:(NSArray *)value;
- (NSArray *)directors;
- (void)setDirectors_talent:(NSArray *)value;
- (NSArray *)directors_talent;
endif @end
```

Note that:

- Instance variables are declared to be of the type specified in the model. For example, budget is declared as an NSDecimalNumber and dateReleased is declared as an NSCalendarDate. Instance variables that represent relationships (such as directors) are NSArrays.

Accessor methods are conditionally included in both the header (.h) and implementation (.m) files using an #ifdef statement.

The implementation (.m) file includes an implementation for each of the accessor methods. For example, the methods for setting and returning the value of the instance variable title are:

```
- (void)setTitle:(NSString *)value
{
    [self willChange];
    [title autorelease];
    title = [value retain];
}
- (NSString *)title { return title; }
```

Setting Other Information for an Entity

From the Entity Inspector you can navigate to other Inspectors to specify additional information for your entity.

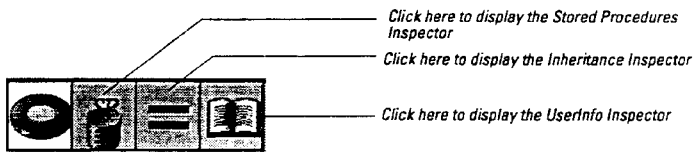

Figure 32. *Icons for Navigating to Other Inspectors*

Stored Procedures Inspector

You use the Stored Procedures Inspector to specify stored procedures that should be executed when a particular database operation (such as insert or delete) occurs. You type the name of the stored procedure in the field associated with the database operation. Stored procedures are read from the database when you create a new model and included in its .eomodeld file.

Chapter 2    Using EOModeler

Alpha Note: For this prerelease, you can only specify stored procedures for insert and delete operations.

Inheritance Inspector

You use the Inheritance Inspector to specify a parent entity for the current entity.

UserInfo Inspector

You use the UserInfo Inspector to add key-value pairs to the UserInfo NSDictionary. The UserInfo dictionary provides a mechanism for extending your model. You can use it to define custom behavior for an entity. For example, you could put information in the UserInfo dictionary to be used by delegate methods that perform operations on the entity.

Generating Schema

You can use EOModeler to create a model from scratch (that is, to create a model that's not initialized from an existing database), and then use that model to generate the SQL necessary to create a database. You can also edit a model for an existing database and generate SQL statements from the model that can be used to regenerate the database with the new settings.

To generate SQL for one or more entities, select the entities and choose Generate SQL from the Property menu. The SQL Generation panel appears, as shown in Figure 33.

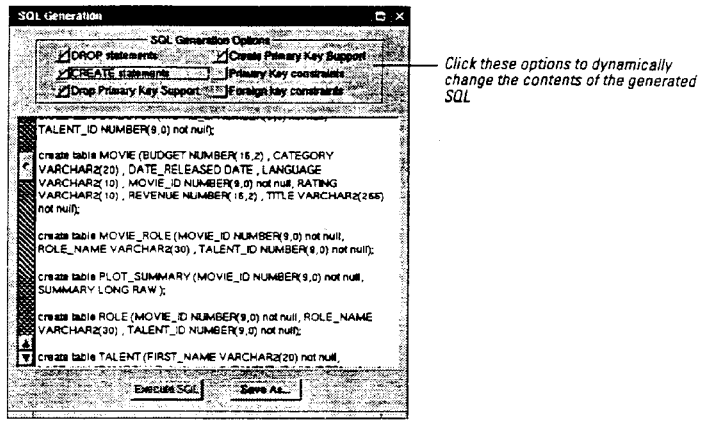

Figure 33. *Generating SQL*

Alpha Note: The SQL generated from this command has some problems for this prerelease—not all statements are properly terminated. You may have to do some hand-editing of the SQL after you generate it. Also, because the Execute SQL button is disabled in this prerelease, you have to manually submit the SQL to a vendor-specific command line SQL execution tool.

Setting Adaptor Information

In addition to describing modeling objects, a model includes a connection dictionary, which contains the information needed to connect to a database server. The keys of the connection dictionary identify the information the server expects, and the values associated with those keys are the values that the adaptor tries when logging into the database.

When you initialize an adaptor from a model, any connection information stored with the model is copied into the adaptor object.

The connection dictionary contains the last values you entered in the login panel and saved as a part of your model (so long as you haven't manually edited Chapter 2　　　　Using EOModeler the connection dictionary in your model file). You can change the connection dictionary's values from EOModeler; this is called setting adaptor information.

To set adaptor information:

1. Choose Set Adaptor Info from the Model menu.

EOModeler displays a login panel that contains values taken from the model's connection dictionary.

2. In the login panel, make the edits you want reflected in your connection dictionary, and click OK.

For example, if you specified a user name and password to log into a database and create your model, you can remove that information from the connection dictionary by clearing those fields in the login panel. Then, in your application, you can prompt the user for a user name and password by sending a runLoginPanelAndValidateConnectionDictionary message to your adaptor object.

Checking for Consistency

EOModeler provides consistency checking to confirm that your model is valid. A valid model is one in which there are no entities without primary keys, and no relationships without join components. Further, consistency checking is invoked when you attempt to make a change in one part of the model that would invalidate another part of the model (for example, if you try to delete an element that's referenced elsewhere).

You can explicitly check your model at any point by choosing Check Consistency from the Model menu. If no inconsistencies are found in your model, the Consistency Check panel is not displayed. Consistency checking is also invoked automatically whenever you perform certain operations. These operations and the associated checks that EOModeler performs are described in the following table:

| When you attempt to... | EOModeler checks for... |
|---|---|
| Save the model | Entities without primary keys<br>Relationships without join components |
| Delete an entity | References other entities may have to any aspect of this entity (for example, to its attributes) |
| Delete an attribute | References to this attribute anywhere else in the model |
| Delete a relationship | References to this relationship anywhere else in the model |
| Change relationship cardinality from to-one to to-many | References to this relationship anywhere else in the model (for example, in flattened attributes or flattened relationships) |

When a consistency check occurs and inconsistencies are found, the Consistency Check panel appears with a list of diagnostic messages, as shown in Figure 34.

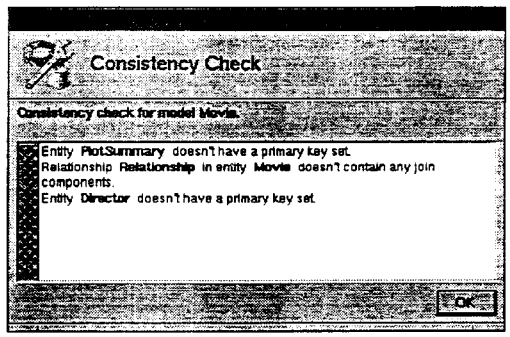

Figure 34. *Checking for Consistency*

By default, consistency checking is performed whenever you save a model file. You can change this behavior with the Preferences panel.

Chapter 3

CREATING AN ENTERPRISE OBJECTS FRAMEWORK PROJECT

Chapter 3  Creating an Enterprise Objects Framework Project

Organizing an Enterprise Objects Framework application, as with all applications in OpenStep, starts in Project Builder.

After you use Project Builder to prepare your project for the needs of an Enterprise Objects Framework application, you design the application's user interface with Interface Builder and write its code.

This chapter describes the things you do in Project Builder and Interface Builder to create an Enterprise Objects Framework application. The majority of the material presented here describes how to use Interface Builder to manipulate the objects in the EOPalette. The fundamentals of Project Builder and Interface Builder are presented in *NEXTSTEP Development Tools and Techniques*; it's assumed that you have some familiarity with these applications. For more information about Interface Builder, see *Working With Interface Builder*.

The interface layer of the Enterprise Objects Framework allows you to create user interfaces for any enterprise object class. The examples in this chapter are based on creating user interfaces for enterprise object classes specified in EOModeler. Using EOModeler and Interface Builder together automates the development process significantly, because you can rely on the default behaviors of the Framework. You can drag a model file or entity into Interface Builder to create a EODisplayGroup that includes an EODatabaseDataSource, and use the class properties you specified in EOModeler as the class keys ("keys" in this context refers to the key-value coding protocol used to access the data of an enterprise object). For more information on creating a model, see Chapter 2, "Using EOModeler."

Creating a Project

To create your project, launch Project Builder and choose New from the Project menu. In the New Project panel, give your project the name you want to use for your application and click OK. The new project is displayed.

Adding Frameworks

The Enterprise Objects Framework frameworks contain the code you need to make your application work. To include the frameworks in your project:

1. Open your project, and double click Frameworks in the project window.

Alternatively, you can choose Add Files from the Project menu.

2. In the Add Frameworks panel, select EOAccess.framework, EOControl.framework, and EOInterface.framework, and click OK.

Creating the Interface

To begin creating a user interface for your application, open your project and select Interfaces in the project window. Double click on your project's nib file to open it in Interface Builder. From there you can start creating the user interface for your application.

The interface objects that are provided by the Enterprise Objects Framework for use in Interface Builder are manipulated in the same manner as standard Application Kit objects such as Buttons and Sliders: You drag an object into a window and drop it on or connect it to some other object.

Loading EOPalette

The palette provided for use in the Enterprise Objects Framework is the EOPalette. To load the EOPalette, choose Open from the Interface Builder Palettes submenu of the Tools menu. The Open Palette panel appears.

In the Open Palette panel, select EOPalette.palette in /NextDeveloper/Palettes and click OK. On Windows NT, select the file Objects.nib inside EOPalette.palette.

The EOPalette includes four objects: EODisplayGroup, EOEditingContext, the currency formatter, and the date formatter.

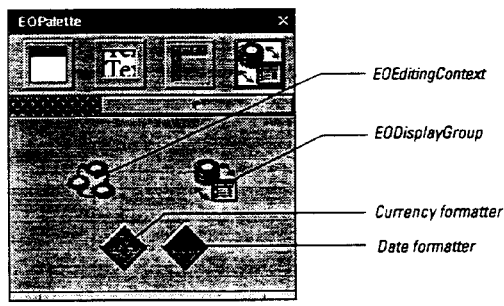

Figure 35. *The EOPalette*

An EODisplayGroup object maintains associations between values in enterprise objects and user interface controls. It manages a group of enterprise objects and provides in-memory sorting.

An EOEditingContext object is automatically added to your application when you drag an entity into the nib file window, as described in "Dragging a Model File into the nib File Window" on page 74. Consequently, you normally don't need to drag this object off the palette.

The formatter objects are used to provide custom formatting for currency and dates. This is discussed in more detail in "Using Formatters" on page 86.

Alpha Note: If you're familiar with Enterprise Objects Framework 1.0, EODisplayGroup is the replacement for what used to be EOController. Buffering and undo are no longer managed by this object—these functions have been moved to the EOEditingContext in the control layer. For more information, see the "Architectural Overview."

EODisplayGroup, Associations, and Class Keys

EODisplayGroups synchronize the data displayed in the user interface with the corresponding data in an enterprise object. An EODisplayGroup:

- Tracks the selection as the user changes it.
- Applies updates from user interface objects to enterprise objects.
- Applies changes in enterprise objects back to user interface objects.

EODisplayGroups use EOAssociations to mediate between enterprise objects and the user interface. An association ties a single user interface object to a value corresponding to a key (named property) in an enterprise object or objects managed by the EODisplayGroup.

The term *class keys* in this context refers to the EOKeyValueCoding informal protocol, in which the properties in an enterprise object are accessed as key-value pairs. An enterprise object class can carry its properties either as instance variables or as an NSDictionary object. In a specific instance of an enterprise object, each key has a corresponding value. For example, an instance of the Movie class has the key title, which might have the value "Citizen Kane." An association can access the value "Citizen Kane" through the key title. So, for example, if you change the value "Citizen Kane" to "Malcolm X" in a TextField for the key title, the association communicates the change back to the enterprise object through the EODisplayGroup.

Creating a New Application

The following sections describe how to use the EOPalette objects, as well as the standard control objects, to create a user interface for an application.

When you open a nib file from your project to start designing your user interface, Interface Builder displays the nib file window.

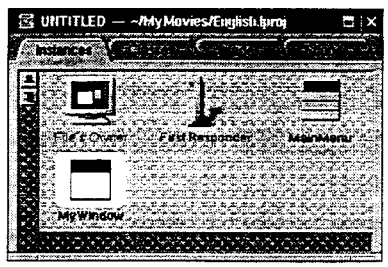

Figure 36. *The Interface Builder nib File Window*

Adding an NSTableView

You can use an NSTableView object to display rows of data in your user interface. A new NSTableView that you drag into a window has two columns with enough room for about six records. You can add columns by cutting and pasting an existing column. Figure 37 shows an NSTableView.

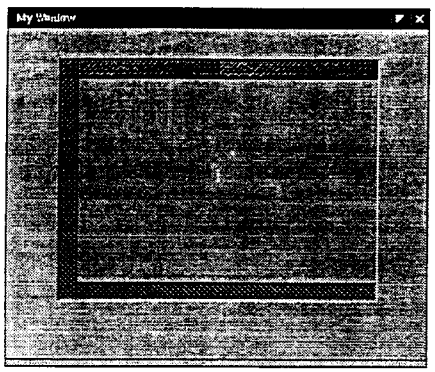

Figure 37. An NSTableView in a Window

Adding EODisplayGroup and EODatabaseDataSource Objects

To display data in your user interface, you need an EODisplayGroup object. EODisplayGroups manage associations between the values of class keys and objects (typically, user interface objects). You also need an EODatabaseDataSource, which acts on behalf of the EODisplayGroup to fetch enterprise objects from the database. In combination, EODisplayGroup and EODatabaseDataSource coordinate the flow of data between the user interface and the database.

To produce an *entity EODisplayGroup* (which consists of an EODisplayGroup pre-connected to an EODatabaseDataSource), you drag an entity from EOModeler into the nib file window.

The EOPalette provides a plain EODisplayGroup object that can be used to create a detail EODisplayGroup; it can also be used if you want to programmatically set a data source. For more information on using detail EODisplayGroups, see "Creating a Master-Detail Interface" on page 83.

Dragging a Model File into the nib File Window

You use EOModeler to display the entities available for a particular database, and to define the mapping between an entity and an enterprise object class. Once you've defined a model, you can use it to create an entity EODisplayGroup in Interface Builder by dragging in either the model file itself or a single entity.

Alpha Note: For this prerelease, you can only drag entities from EOModeler into Interface Builder—not a model files.

For more information on using EOModeler to create model files, see Chapter 2, "Using EOModeler."

To create an entity EODisplayGroup from a model file:

1. Drag an entity from EOModeler into the Interface Builder nib file window.

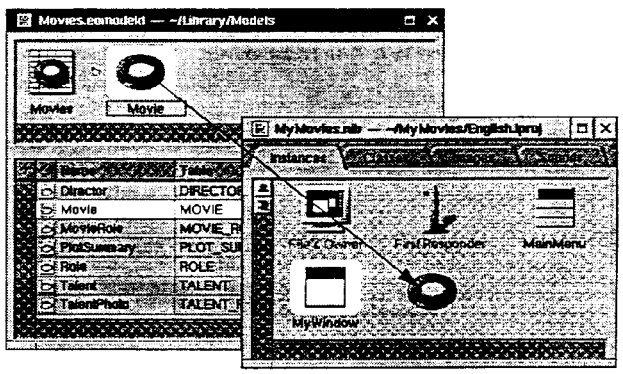

Figure 38. *Dragging an Entity from EOModeler to Interface Builder*

Interface Builder displays a panel, asking if you want to add the model file to your project. Adding a model file to your project places it in the project's Other Resources directory. Click Yes to add the model file to your project. To use a model in your application, you must add it to the project.

Note that the entity you add should have had a primary key specified for it in EOModeler; this is essential for your application to work properly.

Figure 39 shows the nib file window after the entity has been dragged into it. The resulting entity EODisplayGroup that's created has the same name as the corresponding entity. Note that the nib file window also includes an EOEditingContext object. An EOEditingContext object is added to your application along with the first entity you drag into Interface Builder. Because an application typically only needs one EOEditingContext, this object is only added once.

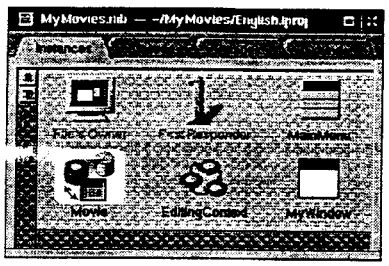

Figure 39. *An Entity EODisplayGroup*

Double-clicking an entity EODisplayGroup in the nib file window launches EOModeler, where you can edit the model that includes the entity. Any edits you make and save to a model file after you drag it into Interface Builder are reflected in the entity EODisplayGroup created from the model.

By clicking the Outline mode button in the nib file window and clicking the ● button to the left of EODisplayGroup, you can see that the entity EODisplayGroup actually includes both an EODisplayGroup and an EODatabaseDataSource object, as shown in Figure 40. Clicking the button expands and contracts the outline.

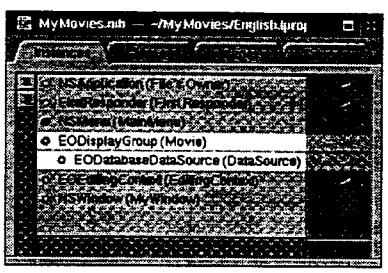

Figure 40. *Examining an Entity EODisplayGroup in Outline Mode*

Inspecting an Entity EODisplayGroup

An entity EODisplayGroup has access to the keys of its associated enterprise object class. These keys correspond to the properties you supplied for the class in EOModeler. For more information on class keys, see "EODisplayGroup, Associations, and Class Keys" on page 72.

The EODisplayGroup Inspector lets you examine class keys and set options used by the entity EODisplayGroup. To display the EODisplayGroup Inspector, select the entity EODisplayGroup in the nib file window and choose I... ctor from the Tools menu.

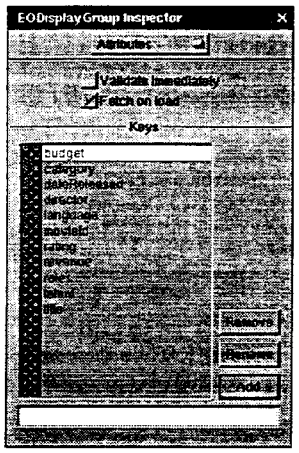

Figure 41. *Inspecting an Entity EODisplayGroup*

Validate Immediately
The Validate Immediately checkbox lets you specify that validating should occur at the user interface level, as soon as a user enters a value.

Fetch on load
The Fetch on load checkbox lets you specify that a fetch should automatically be performed for the EODisplayGroup when the nib file is loaded.

Keys
The Keys area lists the keys for the enterprise object class associated with the entity; keys correspond to the properties you specified for the class in EOModeler. For more information on class keys, see "EODisplayGroup, Associations, and Class Keys" on page 72.

The Keys area provides buttons for adding, renaming, and deleting keys. You can't rename the keys that an entity EODisplayGroup derived from a model. You can use the Add and Rename buttons to add the keys to a non-entity EODisplayGroup for which you have programmatically supplied a data source, or you can add a key that doesn't correspond to a class property to an entity EODisplayGroup. This field is also useful for adding key paths—for more information, see "Using Key Paths" on page 89. To add a new key, type the name in the text field below the list of keys.

Forming Associations Between an Entity EODisplayGroup and an NSTableView

Forming an association from an entity EODisplayGroup to columns in an NSTableView enables those columns to display data for the keys of an enterprise object managed by the EODisplayGroup.

To form an association:

1. In the NSTableView, select the column for which you want to make an association.

2. Display the Inspector for the column and choose Connections from the pop-up list.

3. Choose EOColumnAssoc from the pop-up list at the top of the left column.

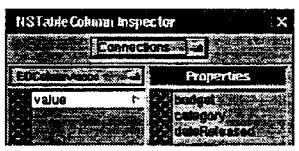

Figure 42. *The NSTableColumn Inspector*

4. Control-drag from the column to a EODisplayGroup object in the nib file window.

Alpha Note: If you're familiar with Enterprise Objects Framework 1.0, note that in release 2.0 you form associations by dragging in the opposite direction—that is, from the user interface element to the EODisplayGroup.

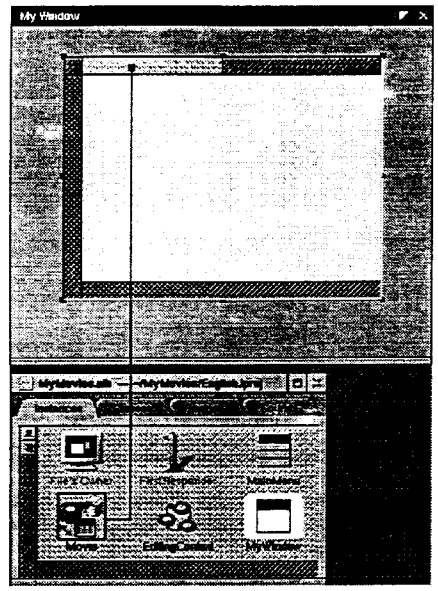

Figure 43. *Connecting a table column to an EODisplayGroup object*

As you can see in Figure 44, the Inspector lists the keys available for the destination EODisplayGroup. When you form an association between a user interface object and an EODisplayGroup, you're associating the value of a particular key of an enterprise object class managed by the EODisplayGroup with that user interface object. For more information on class keys, see "EODisplayGroup, Associations, and Class Keys" on page 72.

Chapter 3      Creating an Enterprise Objects Framework Project

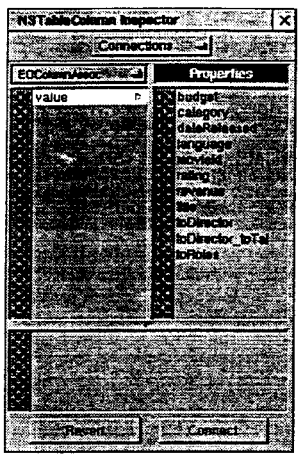

Figure 44. *Displaying Keys in the NSTableColumn Inspector*

5. In the Inspector, select the key whose value you want to display in the first column and click Connect (alternatively, you can double-click the key to make the connection).

For example, using the key title in an association to a column causes that column to display the value associated with title.

6. Control-drag to connect the remaining keys to columns in the NSTableView.

You don't need to make associations for every key in your EODisplayGroup; there are no restrictions on what you choose to display in the user interface or the order in which you display it. In addition, a single key may participate in multiple associations.

More on Associations

When you formed the association from the table column to your EODisplayGroup object in the previous section, the options you had in the Inspector were relatively simple—you could set the pop-up list at the top of the left column to either Outlet (an outlet is an instance variable that points at another object) or to EOColumnAssoc. EOColumnAssoc had one possible binding, value, which you used to associate a value with the table column.

When you make connections to Enterprise Objects Framework objects in Interface Builder, you always have these two options—to either set an outlet, or to form an association. However, while the choices available for the table column were simple (one possible association, EOColumnAssoc, with one possible binding, value), several objects offer more than one possible association, and those associations in turn can have multiple *aspects*.

*Multi-aspect associations* are a feature introduced in Enterprise Objects Framework 2.0. For example, the associations for user interface controls such as text fields, buttons, and radio buttons have the aspects value and enabled. You can associate value with a key in an enterprise object and enabled with a method in an enterprise object whose return value determines whether or not that control should be enabled.

The association for a pop-up list, EOPopupAssociation, has a more extensive set of aspects: titles, selectedTitle, selectedObject, and enabled. For example, imagine that you have two entities: Employee and Department. You could use the Department entity to populate the pop-up list with the names of all of the departments, then use the selectedObject aspect to reflect the department of the currently selected employee. In your application, the pop-up list could be used to change the employee's department.

When you make a connection between any two objects in Interface Builder, the Inspector displays all of the possible options. For example, suppose you make a connection from a text field to an EODisplayGroup. In addition to Outlet, you can also set three different types of associations for the connection: EOControlAssoc, EOActionInsertion, and EOActionAssociation.

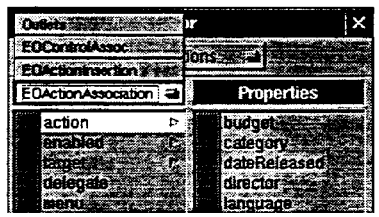

Figure 45. *Associations Available for an NSTextField*

Alpha Note: For a description of the different types of associations and their supported bindings, see the appropriate header file in the EOInterface framework.

Note that for each unique connection between one object and another, you can only specify a single association. For example, you can't specify multiple associations for the connection between a single table column and an EODisplayGroup—associations on a single connection are mutually exclusive. However, an object can be the destination of multiple associations. For example, you can connect different user interface controls to an EODisplayGroup object.

Fetching Data

In the Attributes view of the EODisplayGroup Inspector, you can use the "Fetch on load" checkbox to tell your application to fetch the data associated with the EODisplayGroup object when the nib file is loaded. Alternatively, you can associate a control object such as a button with a fetch: action so that users can fetch the data explicitly.

In Figure 46, a button titled "Fetch" has been added to the window. You connect the button to the entity EODisplayGroup through the usual methodology for connecting a control: Control-drag from the control object to the entity EODisplayGroup, select the fetch: action method in the Inspector, and click Connect.

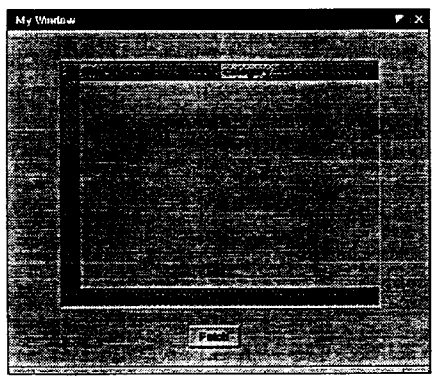

Figure 46. *Adding a Fetch Button to the Interface*

Testing the Interface

To test your interface, choose Test Interface from the Document menu. Interface Builder enters test mode, enabling you to fetch the data and display it in the NSTableView. Figure 47 shows the interface in test mode.

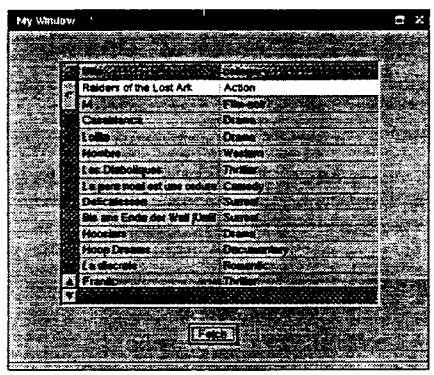

Figure 47. *Testing the Interface*

Creating a Master-Detail Interface

A master-detail presentation is a way of displaying a to-many or a to-one relationship. In this configuration, the master table holds records for the source of the relationship; the detail table contains records for the destination. As individual records in the master table are selected, the contents of the detail table change to show the records that correspond to the selection in the master.

To create a master-detail interface:

1. In EOModeler, create a model that includes the relationship you want to display in a master-detail interface.

For example, in a model based on the Movie database, you can add a to-many relationship from Movie to Role; one movie has many roles. For more Chapter 3      Creating an Enterprise Objects Framework Project information on adding relationships to a model, see Chapter 2, "Using EOModeler."

2. Drag the master entity containing the relationship into the Interface Builder nib file window and select the entity you want to use for your master.

In this example, Movie is specified as the master EODisplayGroup.

3. From the EOPalette, drag an EODisplayGroup object into the nib file window.

4. Control-drag from the detail EODisplayGroup to the Movie entity EODisplayGroup, and in the Inspector choose the relationship (in this example, roles) you want to represent in the master-detail interface.

The pop-up list at the top of the left column in the Inspector should be set to EOQualifiedAssoc. Select parent in the left column to display the values you can associate with the detail EODisplayGroup.

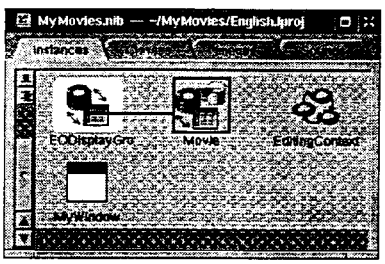

Figure 48. *Making a Master-Detail Association*

5. Drag two NSTableViews into a window; movie information will be displayed in one table (the master), while role information will be displayed in the other (the detail).

6. Control-drag to make associations from columns in the master table to the Movie entity EODisplayGroup.

7. Control-drag to make associations from columns in the detail table the EODisplayGroup object.

The keys available for the detail EODisplayGroup object correspond to the properties of the Role entity that's the destination of the roles relationship.

Figure 49 shows the resulting master-detail interface. When you select a movie in the left (master) table, the display in the right (detail) table changes to display the roles in that movie.

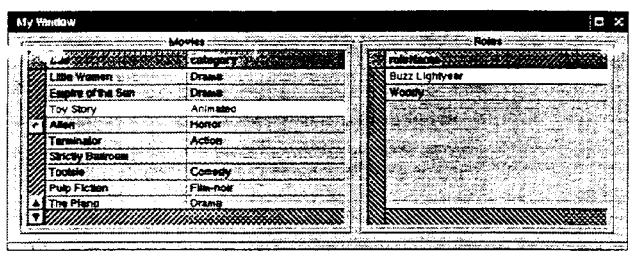

Figure 49. *Master-Detail in Action*

Note that this user interface does not include a fetch button. That's because the Movie EODisplayGroup was set in the Inspector to "Fetch on load." You don't need to set this for the detail EODisplayGroup Role, since the master fetching causes the detail to fetch also.

Creating a Master-Peer Interface

You can also create a master-peer interface. In a master-peer configuration, instead of using an entity EODisplayGroup and a plain EODisplayGroup object as you do in a master-detail interface, you drag two entities or models into Interface Builder. Each of the resulting entity EODisplayGroups has its own data source. You then connect the two entity EODisplayGroups in the same manner that you connect an entity EODisplayGroup and a plain EODisplayGroup in a master-detail interface.

Because the peer EODisplayGroup has its own data source, it does its own fetching and inserting. This means that you can put more restrictive qualifiers on its data source than its relationship to the master EODisplayGroup specifies. For example, instead of displaying all employees that work in a certain department, you can use a master-peer configuration to display employees in the selected department who earn more than $5000 a month, sorted by last name. To qualify the peer data source, you use the EODatabaseDataSource setAuxiliaryQualifier: method.

If you use a master-peer configuration, you should note that insertions and deletions in the peer EODisplayGroup aren't reflected in the master object. For Chapter 3    Creating an Enterprise Objects Framework Project example, if the master-peer configuration is based on a to-many relationship that's a class property (and therefore an NSArray) in the master object, insertions and deletions of records in the peer will update the database, but not the array in the master object.

Using Formatters

The EOPalette includes two formatter objects: one for currency, and one for dates. You can use these formatters to specify how a user interface control such as a text field or table view column formats the data it displays.

For example, suppose you add fields to a Movie application to display a movie's revenue, budget, and release dates:

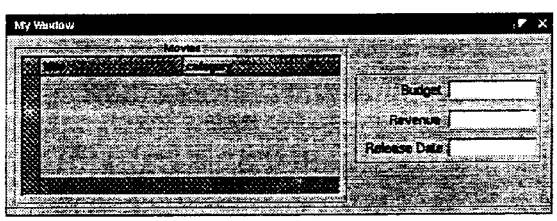

Figure 50. *Adding Fields*

To connect these fields to your Movie entity EODisplayGroup, select each field, control-drag to the EODisplayGroup in the nib file window, and click on the appropriate key in the Inspector (the pop-up list at the top of the left column should be set to EOControlAssociation).

Alpha Note: This example uses NSTextFields. You can't currently drag formatters onto form cells, but this will be fixed in later releases.

To add custom formatting to these fields:

1. Select the field to which you want to apply formatting.

2. From EOPalette, drag the appropriate formatting object into the field you want to format.

For example, you can drag the currency formatter into the Budget text field.

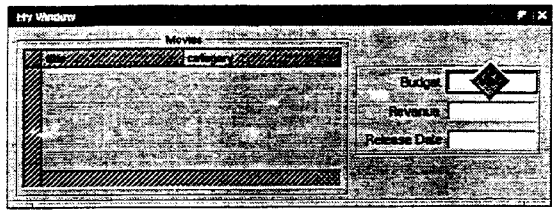

Figure 51. *Dragging the Currency Formatter into a Text Field*

You can then drag the currency formatter into the Revenue field, and the date formatter into the Release Date field. After you drag formatters into the fields, the fields change to display the current formatting.

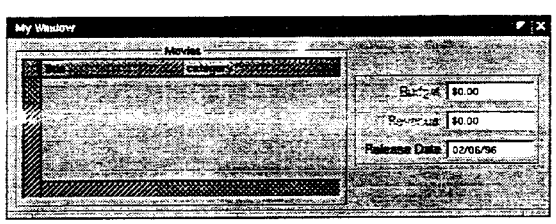

Figure 52. *Formatters: Afterwards*

You then select a text field and use the Formatter view of the Inspector to change the format for that field, as shown in Figure 53. For example, you can specify that negative values be in red, or enclosed in parentheses. You can either use one of the existing formats or specify your own.

Chapter 3  Creating an Enterprise Objects Framework Project
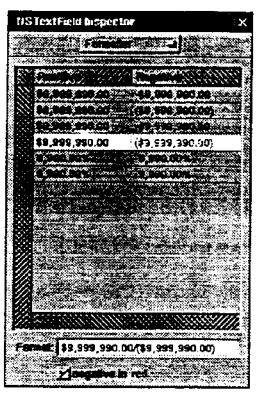
Figure 53. *Specifying a Currency Format*
Likewise, you can change the format of the Release Date field by using the Inspector.
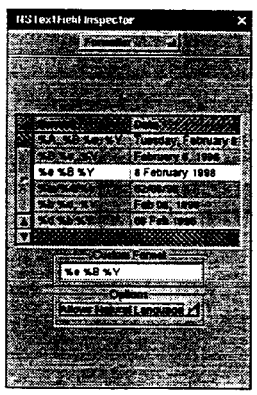
Figure 54. *Formatting a Date*

When you enable "Allows Natural Language" for dates in the Inspector, it means that users can change the value of that date field using natural language expressions such as "today," "yesterday," "tomorrow," and so on.

Using Key Paths

The EOModeler chapter discussed flattening attributes and relationships. An alternative approach to displaying information from one entity in another is to specify a key path in Interface Builder. For example, suppose you want to display the name of the actor who played each role in a movie. You could flatten the actor's name from the Talent entity into the Role entity in EOModeler. Alternatively, you could specify a key path in Interface Builder. The advantage of using a key path is that unlike flattened properties, which are tied to the database, key paths allow you to traverse the object graph. Because the object graph represents the most current view of data in your application, using key paths is the best way to ensure that your display is always in sync with the data.

To specify a key path:

1. In the nib file window, select the EODisplayGroup object for which you want to specify a key path.

For example, you can select the "roles" detail EODisplayGroup that represents a relationship between the Movie and Role entities.

2. Display the Attributes view of the EODisplayGroup Inspector.

3. Specify a key path that includes the name of the relationship with the destination table, Talent, and the attribute in that table you want to "add" to roles, and click Add.

For example, in Figure 56, you can see that the key paths talent.firstName and talent.lastName have been added to the EODisplayGroup roles. Note that these key paths are both based on a relationship that was defined in EOModeler: talent, which is listed among the attributes.

Chapter 3  Creating an Enterprise Objects Framework Project

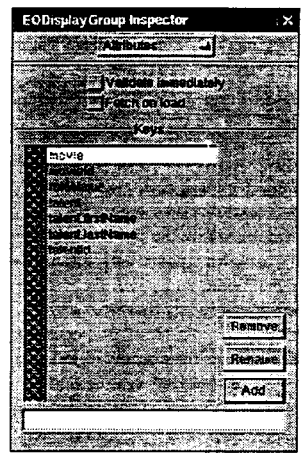

Figure 55. *Specifying a Key Path*

Once you add these keys to your EODisplayGroup object, you can use them in associations just as you would any other key. For example, in the following example application, you can see that the name of the actor is listed alongside the role he or she played in the selected movie.

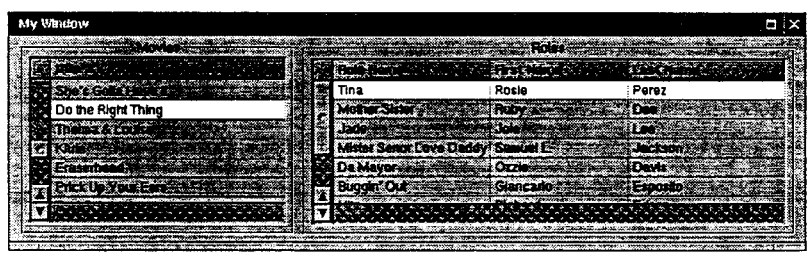

Figure 56. *Using Key Paths in an Application*

Chapter 4

OVERVIEW OF THE EXAMPLES

Chapter 4    Examples Overview

This chapter describes features introduced in Enterprise Objects Framework release 2.0 by analyzing the example applications provided with this prerelease. For instructions on installing and running the examples, see the release notes.

Movie Application

This section describes the Movie application. The Movie application is simple and virtually codeless (except for modest sorting support). This application introduces the following concepts:

- Using formatters—see the chapter "Creating an Enterprise Objects Framework Application" for more information.

- Using key paths

- Building a master-detail display—see the chapter "Creating an Enterprise Objects Framework Application" for more information.

- Using the basic associations: EOControlAssociation, EOColumnAssociation—see the chapter "Creating an Enterprise Objects Framework Application" for more information.

- Adding items from an EODisplayGroup to a relationship property (EOActionInsertionAssociation).

- Sorting, Insert, Update, Delete, Undo, Save

- Referential integrity rules—see the chapter "Using EOModeler" for more information.

- Free undo and redo

The concepts that don't have chapter references after them are discussed in more detail below.

Overview of the Movie Application

This application displays a list of movie titles, including the names of the director and actors in each movie. You can use this application to examine movie data and to insert, update, and delete records in the database. It includes a single window:

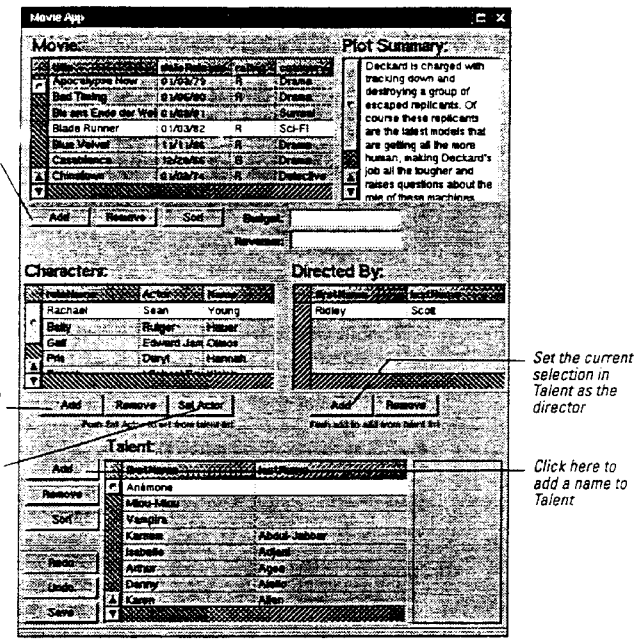

Figure 57. *The Movie Application*

What the Enterprise Objects Framework Gives You "For Free"

This is a very simple application with almost no custom code. Nonetheless, because of Enterprise Objects Framework's built-in features, all of the following are taken care of:

- Formatting of money and dates

- Referential integrity (that is, the rules you've specified in your model are enforced by Enterprise Objects Framework)

- Coordinating the user interface with your data

Chapter 4  Examples Overview

Building the Movie Application

This section gives an overview of the steps entailed in building the Movie application. Its emphasis is on special Enterprise Objects Framework features, not on the basic mechanics of creating a model, project, and interface. For a detailed discussion of these subjects, see the chapters "Using EOModeler" and "Creating an Enterprise Objects Framework Project."

Building the Movie application entails these basic steps:

1. Creating a new model based on the Movie database.

2. Creating a new project.

3. Editing your project's nib file in Interface Builder.

4. Building your project in Project Builder.

The significant things that happen during each of these steps are discussed in the following sections.

Creating a Model Based on the Movie Database

The first step in writing the Movie application is creating a model based on the Movie database. For a detailed discussion of working with models, see the chapter "Using EOModeler."

Some of the things you need to do in EOModeler to create the Movie model are as follows:

- Add primary keys for all of the entities
- Add relationships between entities

Note that for this application, you don't have to specify custom classes or generate custom source code for your entities—you can just use the "default" enterprise objects class, EOGenericRecord. This is because none of the enterprise objects in this application need to have custom behavior.

Creating a New Project

To create a project for the Movie application, just follow the steps described in the chapter "Creating an Enterprise Objects Framework Project."

Editing Your Project's nib File in Interface Builder

Up to this point, you've done very little to specify any special behavior for the Movie application. Interface Builder is where the bulk of the work happens.

The things you need to do in Interface Builder are:

- Drag the entities you want to use in the application from EOModeler into Interface Builder

- Drag user interface elements off of the palettes to create the user interface

- Form associations between EODisplayGroup objects and interface objects

- Subclass NSObject to create a class to handle the application-specific behavior For basic information on dragging entities into Interface Builder from EOModeler, see the chapter "Creating an Enterprise Objects Framework Project." This section focuses on the features that are specific to this application—making associations and adding key paths.

Making Connections

There are a few different connections in the Movies nib file that are noteworthy. For a general discussion of associations, see the chapter "Creating an Enterprise Objects Framework Application."

First of all, notice that the Add button for the Movie table view inserts a new record into the database, yet you don't have to write code for generating primary keys. Enterprise Objects Framework now handles this for you.

Secondly, see the Set Actor button under the Characters table view. You use it to add the currently selected name in the Talent table view to the Characters view. This is how you specify the name of the actor who played a particular role in a movie. This is accomplished by using a EOActionInsertionAssociation. An EOActionInsertionAssociation lets you add objects from one EODisplayGroup to a relationship property in another (remember, a relationship in an enterprise object is programmatically expressed as an NSArray).

When an EOActionInsertionAssociation receives an action from its object (such as a button), it takes the object or objects selected in the EODisplayGroup bound to its source aspect and adds them to the relationship property of the selected object of the destination aspect. The object (usually a button) is disabled when no objects are selected in the source and destination EODisplayGroups.

This is how the EOActionInsertionAssociation is formed in this example:

1. First, the nib needs to include a Movie master EODisplayGroup as well as a detail movieRoles EODisplayGroup that represents the to-many roles relationship defined in the Movie model. It should also include a Talent EODisplayGroup.

2. Control-drag from the Set Actor button to the Talent EODisplayGroup.

3. In the Inspector, make sure that the pop-up list in the upper left column is set to EOActionInsertion.

4. Select source in the left column of the Inspector, select talentID in the right column, and click Connect.

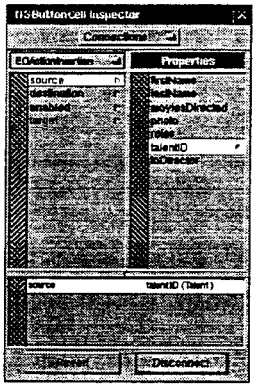

Figure 58. *Setting the Source*

5. Control-drag from the Set Actor button to the detail movieRoles EODisplayGroup.

6. Select destination in the left column of the Inspector, select any property in the right column, and click Connect. It doesn't matter which of the properties you connect to; the property's value is not used. In the model talent is a relationship between the MovieRoles entity and the Talent entity.

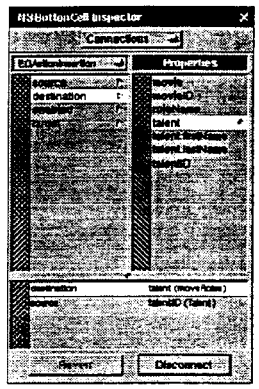

Figure 59. *Setting the Destination*

Pressing the Set Actor button will add the selectedTalent enterprise objects to the talent relationship property of the selected MovieRole. This association is also used for the Add button that adds a director to a movie.

Key Paths

The previous section discussed using an EOActionInsertionAssociation to add a Talent enterprise object to the talent relationship property of a selected MovieRole. But how are the values of this object displayed in the user interface? The mechanism used is a key path. A key path is a key you manually add to an EODisplayGroup object in the Inspector, and it's used to traverse the graph of enterprise objects in your running application. In this way one enterprise object is able to access values in another enterprise object that is the destination of a relationship property.

The detail movieRoles EODisplayGroup that represents the to-many roles relationship defined in the Movie model includes two key paths: talent.firstName and talent.lastName. The relationship property talent is used to access the firstName and lastName values in the Talent entity.

Chapter 4    Examples Overview

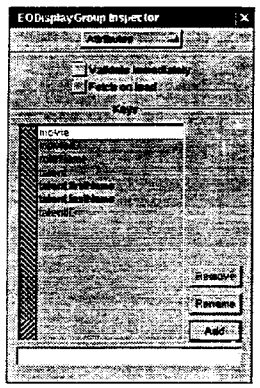

Figure 60. *Key Paths*

Once you add keys paths to an EODisplayGroup object, you can use them in associations just as you would any other key. The talent.firstName and talent.lastName keys are used to display an actor's first and last names in the Characters table view:

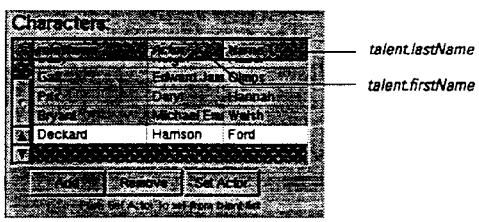
— *talent.lastName*
— *talent.firstName*

Figure 61. *Using Key Paths to Display Values*

Sorting

The Movie application includes a small class (AppController) subclassed from NSObject that includes application-specific code for sorting.

The entire contents of AppController.h and AppController.m are as follows:

AppController.h
```
#import <AppKit/AppKit.h>
#import <EOInterface/EOInterface.h>

@interface AppController : NSObject
{
    EODisplayGroup *movieController;
    EODisplayGroup *talentController;
}

- (id)resortMovieController:sender;
- (id)resortTalentController:sender;
@end
```

AppController.m sets a default sort ordering for movieController and talentController (which are the names used for the Movie and Talent EODisplayGroup objects in the application). The two action methods resortMovieController: and resortTalentController: resort the objects in the respective EODisplayGroups according to the default ordering set in awakeFromNib.

AppController.m
```
#import "AppController.h"

@implementation AppController

- (void)awakeFromNib
{
   [movieController setSortOrdering:
        [NSArray arrayWithObjects:
        [EOSortOrdering keyOrderingWithKey:@"title"
        selector:EOCompareCaseInsensitiveAscending],
        [EOSortOrdering keyOrderingWithKey:@"dateRelease"
        selector:EOCompareCaseInsensitiveAscending], nil]];

[talentController setSortOrdering:
        [NSArray arrayWithObjects:
        [EOSortOrdering keyOrderingWithKey:@"lastName"
        selector:EOCompareCaseInsensitiveAscending],
        [EOSortOrdering keyOrderingWithKey:@"firstName"
        selector:EOCompareCaseInsensitiveAscending], nil]];
}

- (id)resortMovieController:sender
{
    [movieController resort];
    return self;
}

- (id)resortTalentController:sender
{
    [talentController resort];
    return self;
```

| Chapter 4 | Examples Overview |

```
}
@end
```

The following sections highlight key features of the additional example applications without going through all of the steps required to build them. For an overview of the basic steps required to build an Enterprise Objects Framework application, see Chapter 2, "Using EOModeler," and Chapter 3, "Creating an Enterprise Objects Framework Project."

BusinessLogic

The BusinessLogic project is a framework of enterprise objects and EOModels that is used by the Customers, Inventory, and PointOfSale example applications. A *framework* is a project type that bundles a shared dynamic library with its headers, documentation, and resources. For more information on creating and using frameworks, see *OPENSTEP Development: Tools and Techniques* (on-line in
NextLibrary/Documentation/NextDev/TasksAndConcepts/DevEnvGuide).

The enterprise objects in the BusinessLogic framework contain no user interface or database-specific code, which allows them to be reused in a variety of different applications. For example, you could use them in OpenStep graphical applications, PDO server applications, WebObjects applications, Windows applications with D'OLE, and so on. You can also use them with any database server (or with no database server at all).

The following features are worth noting in the BusinessLogic framework:

- Every enterprise object fetched from the database is registered in an EOEditingContext. The EOEditingContext watches for changes in its objects, which it responds to by sending out notifications. Objects publicize their changes by implementing [self willChange] in methods that change the object's value. Several of the classes in BusinessLogic use [self willChange]—for example, the Fee class includes the following method:

```
- (void)pay
{
    [self willChange];
    datePaid = [[NSCalendarDate calendarDate] retain];
    [rental feePaid];
}
```

- Validation logic

Several of the classes (Member, Fee, and Unit) include validation methods that are invoked when a particular operation is about to occur. Validation is achieved through the EOClassDescription class, which effectively extends the behavior of enterprise objects. EOClassDescription usually derives information (such as NULL constraints and referential integrity rules) from a model file. However, an enterprise object class that has no model can explicitly provide the same information by implementing its own methods, such as attributeKeys and relationshipKeys. When you perform a particular operation on an enterprise object (such as attempting to delete it), the EOEditingContext invokes EOClassDescription's validation methods to determine if the operation should proceed. For example, referential integrity constraints in your model might state that you can't delete an department object that has employees. If a user attempts to delete a department that has employees, an exception will be returned and the deletion will be refused.

Often an enterprise object will implement its own validate method to provide custom behavior and then forward the message to super to perform any additional validation specified by the super class or the eomodel. For example, the Member class includes this method:

```
    - (NSException *)validate
    {
        // this method is called before an object is inserted
        // or updated in the database
        if ([[self restrictionPool] doubleValue] < 0)
            return [NSException validationExceptionWithFormat:@"The cost
                    restrictions on the guests exceed the credit limit"];
        return [super validate];  // pass the check on to the EOClassDescription
    }
    ```

- Computing derived values and lists

For example, [Member allRentals] returns the rentals for a Member and all of his or her guests. [Customer unpaidFees] filters the list of all fees for a Customer and returns the unpaid subset. [Member totalRestrictions] returns the total of the cost restriction for all of a member's guests.

- Initialization logic

The EOClassDescription method awakeFromInsertionInEditingContext is invoked on newly created enterprise objects (that is, objects that aren't being initialized from persistent state). You can use this method to initialize your enterprise objects. awakeFromInsertionInEditingContext is used in several of the classes in BusinessLogic.

Chapter 4    Examples Overview

- Use of NSDecimalNumber

The NSDecimalNumber class provides a lossless representation of decimal numbers. NSDecimalNumber is an immutable subclass of NSNumber that gives you an object-oriented wrapper for performing large precision base-10 arithmetic. It has high precision (38 decimal digits), and it uses memory efficiently (that is, its memory usage is dependent on the number's size). Some of the features NSDecimalNumber provides are as follows:

- Simple operations

- Extensibility

- A C interface (defined in NSDecimal.h)

If you need mutability, you can use C operations and then convert the result back to an NSDecimalNumber. Using the C interface also provides superior performance.

- Detection and warning on underflow, overflow, or loss of precision.

You can respond to these conditions however you want.

- Efficiency. Everything is performed on the stack; there are no malloc() operations.

- Smooth conversions from NSStrings to NSDecimalNumber to money formats.

Customers Application

The Customers application lets you manage the video store's customers and their guests. You use it to add and modify information for customers, such as their names, addresses, credit card data, and their list of guests.

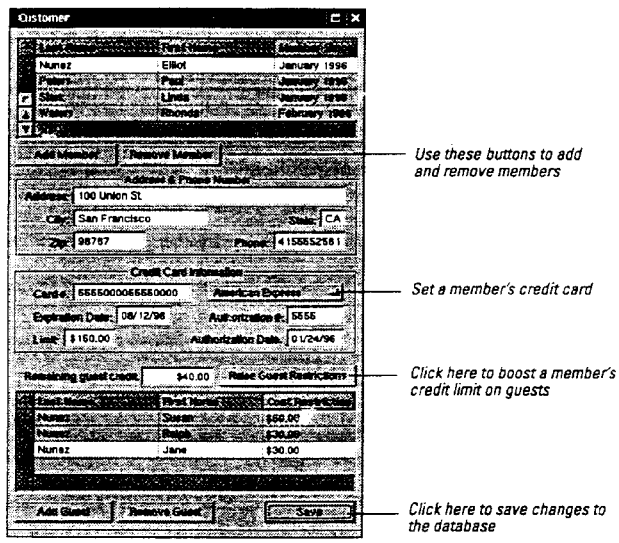

Figure 62. *Customer Application*

This application includes the following features:

- Simple business logic.

For example, each member has a cost restriction for guests. When you add a guest, you also add a cost restriction that is subtracted from the member's total. If you exceed the member's total, you get a panel saying that the cost restrictions on the guest exceed the member's credit limit.

- A custom association, PopupInsertionAssociation.

This association inserts a new value on demand. In the Customer application, for instance, the Member object has an optional to-one relationship to the CreditCard object. The PopupInsertionAssociation in this example is connected to the cardType attribute of the detail CreditCard EODisplayGroup. If the Member has no credit card (and therefore the detail EODisplayGroup has no objects) then the association displays "None." If Chapter 4   Examples Overview the user then selects a creditType from the popup, the association automatically inserts a new creditCard object in the CreditCard EODisplayGroup and sets its creditType to the selected one. This is essentially a standard EOPopUpAssociation enhanced to insert an object in its destination on demand.

- Use of the EOActionAssociation to invoke a business action

The "Raise Guest Restriction" button, which is used to raise a member's rental limit, has an EOActionAssociation to the boostRestrictions property of the Member EODisplayGroup. The boostRestrictions method is implemented in the Member class in the BusinessLogic framework:

```
    // Give guests a 20% increase in rental limits
    - (void)boostRestrictions
    {
        NSDecimalNumber *rate = [NSDecimalNumber
            decimalNumberWithString:@"1.50"];  // 50% boost
        int i;

for (i = [guests count] - 1; i >= 0; i--) {
            Guest *guest = [guests objectAtIndex:i];
            [guest setCostRestriction:[[guest costRestriction]
                    decimalNumberByMultiplyingBy:rate]];
        }
    }
    ```

- Validation rule on Member are automatically invoked for a save operation to verify that the guest cost restrictions don't exceed the credit limit.

Inventory Application

The Inventory application lets you manage the video store's inventory, including video tapes, video discs, games, and game players. You can insert and delete these items and set characteristics for them.

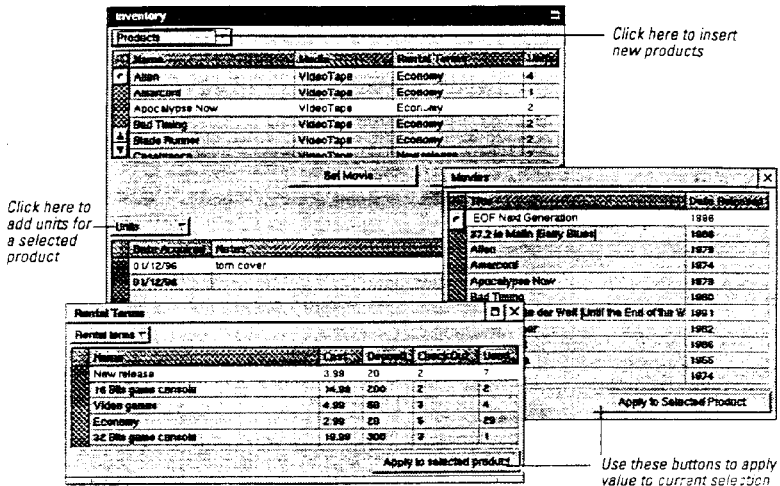

Figure 63. *Inventory Application*

This application includes the following features:

- Inheritance in the database.

The Inventory application takes advantage of inheritance expressed in the Rentals.eomodeld file in the BusinessLogic framework. The Rentals model includes these inheritance relationships:

- Horizontal mapping. That is, MovieMedia, GamePlayer and GameMedia use separate tables but inherit from Product.

- Single table mapping. That is, VideoTape and LaserDisk inherit from MovieMedia, but they're both mapped to a single table (MOVIE_MEDIA).

To view inheritance information for an entity in EOModeler, select the entity, display the Inspector, and click on the icon at the top of the Inspector to switch to the Inheritance Inspector. Alternatively, you can add the "Parent" column to the entity table view in EOModeler by using the menu.

Chapter 4   Examples Overview

- Switching the user interface based on the subclass.

When you select an item in the Products table view, the user interface displays the appropriate controls for setting characteristics for that item. For example, when you select a video tape, the user interface includes buttons for displaying the Movies and Rental Terms windows, where you can set values for the video tape. When you select a game, the user interface displays text fields for entering the game's name and its platform.

- Conditional enabling of menu items for Save, Revert, Undo, and Redo.

This is achieved through a category on EOEditingContext—see the file InventoryEntry.m.

- Multi-database support (data from both the Movie and Rental are accessed transparently).

PointOfSale Application

The PointOfSale application is used to manage the rentals of members and their guests.

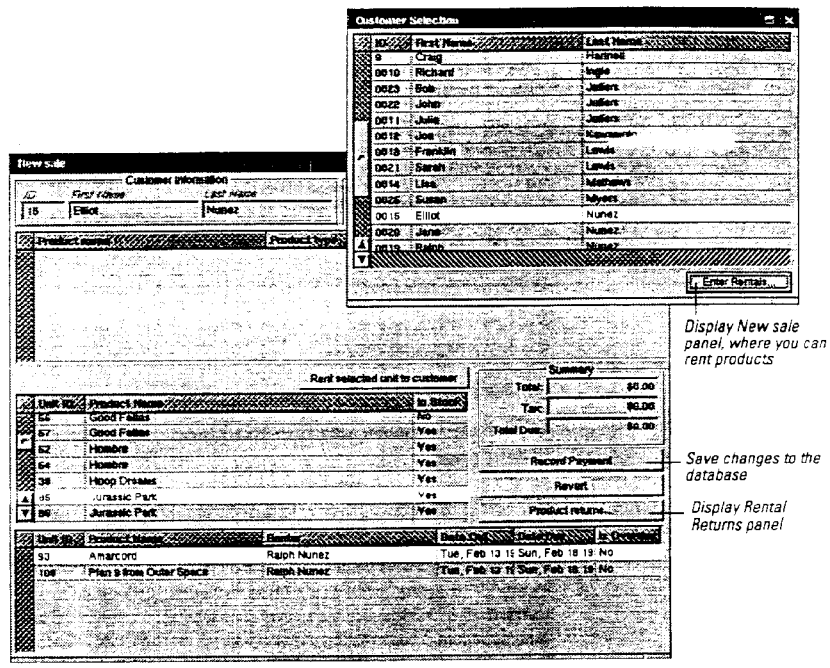

Figure 64. *PointOfSale Application*

This application includes the following features:

- A custom EOAssociation (ActionArgumentAssociation)

This association is used to control the behavior of the "Rent selected unit to customer" button. The association includes the aspects action, enabled, and argument. When a selected item is available for rental, the button is enabled. Otherwise, it's disabled. Its state is based on the isAvailableForRent method in the Unit class. When the button is pushed, the selected customer is passed the rentUnit method with the selected unit as an argument. The association is created in the Transaction.m file as follows:

```
ActionWithArgumentAssociation *association;
```

Chapter 4    Examples Overview

```
association = [[[ActionWithArgumentAssociation alloc]
    initWithObject:insertButton] autorelease];
[association bindAspect:@"action"
  displayGroup:customerDisplayGroup
  key:@"rentUnit:"];

[association bindAspect:@"argument"
  displayGroup:unitDisplayGroup
  key:@"self"];

[association bindAspect:@"enabled"
  displayGroup:unitDisplayGroup
  key:@"isAvailableForRent"];

[association establishConnection];
```

Note that this association could have been established in Interface Builder if the ActionArgumentAssociation had been loaded using a custom palette.

- Advanced business logic

- Multi-database support (data from both Movie and Rental are accessed transparently)

- Nested EOEditingContext

This example includes a nested EOEditingContext. In a nested EOEditingContext, one editing context acts as an object store for another. Nested EOEditingContexts are often used in a "drill down" style of user interface, where changes in a nested dialog can be approved (committed) or canceled (rolled back) to the previous panel. In the PointOfSale application, for example, the changes you make in the Rental Returns "child" panel are reflected in the New sale "parent" panel. You use the Rental Returns panel as follows:

1. In the New sale panel (which lists a customer's current rentals), click the "Product returns" button to display the Rental Returns panel.

2. In the Rental Returns panel, select the items you want to return and click "Return the product". Click "Save" to save your changes and exit the panel.

3. In the New sale panel, click "Record Payment" to save the changes to the database.

When an object is fetched into a nested EOEditingContext, it automatically picks up any uncommitted changes made to that object in its parent EOEditingContext. For example, in one panel you might have a list of employees that allows you to edit salaries, and a button to bring up a nested panel to view and edit detail information. If you had edited the salary in the parent panel, you would expect to see the modified salary in the nested panel, not the old (committed) salary from the database. Thus, conceptually, nested EOEditingContexts fetch through their parents.

Index

A access layer 11, 24
accessor methods 59
adaptor level 24, 25
adaptors
   selecting in EOModeler 33
   setting information for in EOModeler 65
associations 21, 72
   class keys and 72
   forming in Interface Builder 78
   multi-aspect 80
attributes
   adding new 51
   derived 47, 51
   flattened 47
   inspecting 39

C class keys 72
control layer 22
   uniquing at 22
currency formatter 86

D data sources 11, 74
   defined 21
   peer 85
database data sources
   characteristics of 21
database level 24, 25
   snapshots at 25
databases
   mapping to modeling objects 26
date formatter 87
delete rules
   setting for a relationship in EOModeler 46
detail EODisplayGroups 84
dictionaries 13, 18

E enterprise objects
   accessor methods in 59
   defined 16
   generating template source code for in EOModeler 60
   specifying classes for in EOModeler 58
Enterprise Objects Framework architecture 11
Enterprise Objects Framework project
   creating 70
entities
   inspecting 55
   modifying 35, 55
EODisplayGroup 21
   creating 74
   detail 74, 84
   in a master-detail interface 84
   in a master-peer interface 85
   in EOPalette 71
   inspecting 76
   master 84
   peer 85
EOEditingContext 23
EOFault 42
EOGlobalID 23
EOModeler
   browser mode 36
   browsing data 38
   forming relationships in 41
   launching 32
   table mode 34, 39
EOObjectStore 24
EOObjectStoreCoordinator 24
EOObserving 23
EOPalette 71

F

– fetch 82
fetching
   in Interface Builder 82
formatters 86

G generic records 18

I inheritance specifying for an entity in EOModeler 64
insert rules
   setting for a relationship in EOModeler 47
Interface Builder 70
   dragging a model file into 74
   EODisplayGroup Inspector 76
   using EOPalette in 71
interface layer 11, 21

K key paths 47, 53, 89
keys
   specifying in associations 79
key-value coding 17, 59, 72

M master EODisplayGroups 84
master-detail
   creating an interface for 83
master-peer
   creating an interface for 85
modeling objects
   relationship to database components 26
models 26
   checking for consistency 66
   creating a new 33
   dragging into Interface Builder 74
   eomodeld file 31
   structure of 31

N

NSTableView
   adding 73

O optionality
   setting for a relationship in EOModeler 46

P peer data sources 85
peer EODisplayGroups 85
Project Builder 70

Index

R
referential integrity rules
  adding to a model 45
relationships
  adding referential integrity rules
    for 45
  flattened 53
  forming in EOModeler 41
  inspecting in EOModeler 44

S
schema
  generating in EOModeler 64
snapshots 25
SQL
  generating in EOModeler 64
stored procedures
  specifying for an entity in
    EOModeler 63

U
uniquing 22
user interface
  creating 71
  testing in Interface Builder 83
user interface objects 21
UserInfo dictionary 64

**Differences Between Enterprise Objects
Framework 1x and 2.0**

A New Control Layer

The basic architecture of Enterprise Objects Framework 1x includes the interface layer, the access layer, and an underlying database. Enterprise Objects Framework 2.0 keeps these layers, but it also introduces a new *control* layer between the interface and access layers as illustrated in Figure 1.

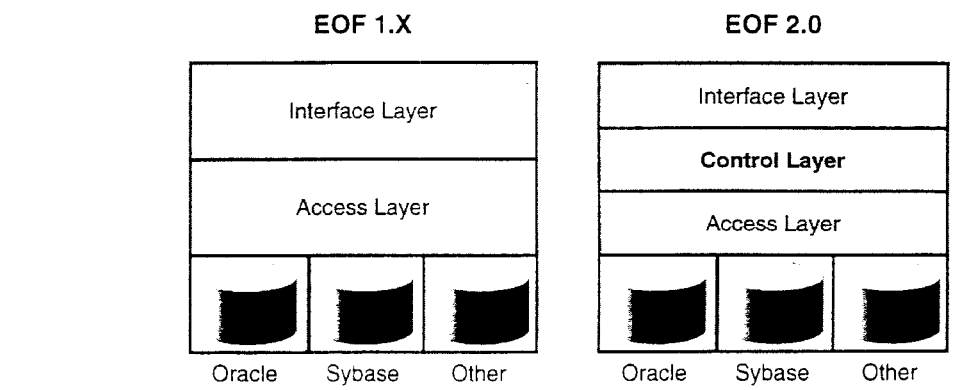

Figure 1. *Control Layer*

Motivation for the Control Layer

In Enterprise Objects Framework 1x, it is the responsibility of the EOController class to keep enterprise objects in sync with the user interface. To do so, EOControllers require you to make changes to enterprise objects by editing values in the user interface (using EOAssociations) or using the EOController method setValues:forObject. If you change an enterprise object by sending it a message, the EOController won't update the user interface or save the change in the database. As a result, it's difficult to invoke an enterprise object's business logic in Enterprise Objects Framework 1x. To make it simpler, the control layer incorporates the concept of change notification.

In Enterprise Objects Framework 2.0, objects that need to know about changes to an enterprise object register as observers for change notifications. When an enterprise object changes, it posts a change notification, and registered observers are notified.

Differences Between Enterprise Objects Framework 1x and 2.0

Another limitation of Enterprise Objects Framework 1x is that EOController is not available on PDO platforms. Because the controller is so tightly coupled with user interface, it can't be used in non-UI applications. Because operation buffering and undo are implemented in EOController, these features are unavailable on server platforms.

Enterprise Objects Framework 2.0 divides the functionality of the Enterprise Objects Framework 1x EOController between the interface layer and the control layer. While UI-related functionality remains the responsibility of the interface layer, non-UI functionality is provided by the control layer. As a result, server platforms have access to the non-UI functionality.

EOController does not exist in Enterprise Objects Framework 2.0. The interface layer class EODisplayGroup provides UI-related EOController functionality such as transporting values between enterprise objects and the user interface, and the control layer class EOEditingContext provides the non-UI functionality.

See Figures 11 and 12 to see how changes in Enterprise Objects Framework 2.0 have altered the architecture of database applications.

Change Notification

The change notification introduced by the control layer has the following effects on code you write.

- Enterprise objects should invoke the method willChange prior to altering their state. For example, set methods should invoke willChange before assigning new values.

```
    - (void)setColor:(NSString *)aColor
    {
        [self willChange];
        [color autorelease];
        color = [aColor retain];
    }
    ```

- You can make changes to enterprise objects by sending messages to them directly.

For more information on change notification, see the chapter "Architectural Overview" in the Enterprise Objects Framework Developer's Guide and the comments in the header file EOObserver.h.

A New Control Layer

EOEditingContext and EOObjectStore Classes

An EOEditingContext object manages a graph of objects fetched from an external store. EOEditingContexts watch for changes to their objects using change notification, and they record snapshots for object-based undo.

EOObjectStore is an abstract class whose subclasses act as a stores of objects for EOEditingContexts. Object stores are responsible for constructing and registering objects, servicing object faults, and committing changes made in an editing context. The basic relationship between the classes is depicted in Figure 2.

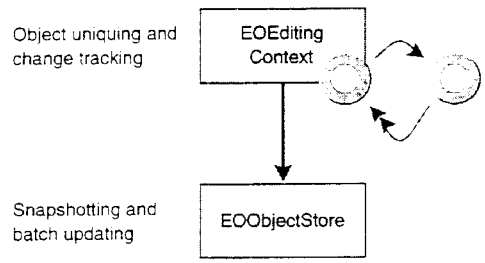

Figure 2. *Relationship Between EOEditingContexts and EOObjectStores*

In database applications, the relationship between the classes is a little more complex. The following scenarios are often combined:

- One or more "peer" EOEditingContexts can share a single object store.
- EOEditingContexts can be nested such that one EOEditingContext acts as an object store for another.
- Using an EOObjectStoreCoordinator, an EOEditingContext can maintain a single object graph consisting of objects from more than one object store.

Figure 3 illustrates the general case.

Differences Between Enterprise Objects Framework 1x and 2.0

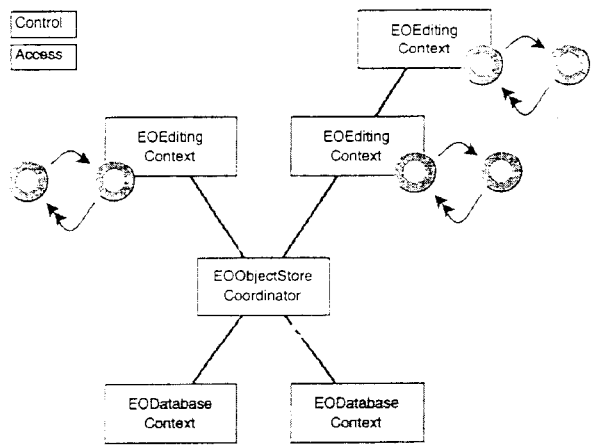

Figure 3. *Combined EOEditingContext Scenarios*

Note: EOObjectStoreCoordinator and EOCooperatingObjectStore are subclasses of EOObjectStore. EODatabaseContext, an access layer class, is a subclass of EOCooperatingObjectStore. As such, instances of all three classes can perform as object stores for EOEditingContexts.

EOQualifier

In Enterprise Objects Framework 1.1, qualifiers were based on SQL. As a result, qualifiers frequently introduced database dependence into application code and their use was restricted to fetching records from an SQL database. In Enterprise Objects Framework 2.0, qualifiers aren't based on SQL and they don't rely upon an EOModel. Thus, the same qualifier can be used to perform in-memory searches and to fetch from the database.

There are several EOQualifier classes, each representing a different semantic. What you think of as a logical qualifier (for example, name = "fred" and age < 20) is represented by a tree of EOQualifier nodes. These trees can be combined using EOAndQualifiers and EOOrQualifiers as illustrated in Figure 4. EOQualifier has a method to parse a textual representation of a qualifier into a tree of EOQualifier nodes.

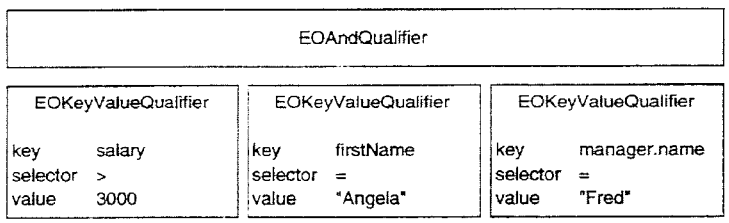

Figure 4. *EOQualifier tree for* salary > 300 and firstName = "Angela" and manager.name = "Fred"

All qualifier classes are public and can be extended with categories and subclasses. For more information on qualifiers, see the comments in the header files for the following qualifier classes:

- EOQualifier
- EOAndQualifier
- EOKeyComparisonQualifier
- EOKeyValueQualifier
- EONotQualifier
- EOOrQualifier Differences Between Enterprise Objects Framework 1x and 2.0

Summary of Control Layer Classes

Classes from the 1x Access Layer
EOFault
EONull
EOQualifier                Redesigned in 2.0. The 1x EOQualifier is
                           functionally equivalent to the 2.0
                           EOSQLQualifier.

New Classes in the Control Layer
EOAndQualifier
EOClassDescription
EOCooperatingObjectStore
EODataSource
EODelayedObserver
EODelayedObserverQueue
EODetailDataSource         Replaces the 1x EODetailDatabaseDataSource
EOEditingContext
EOFaultHandler
EOFetchSpecification
EOGlobalID
EOKeyComparisonQualifier
EOKeyValueQualifier
EONotQualifier
EOObjectStore
EOObjectStoreCoordinator
EOObserverCenter
EOObserverProxy
EOOrQualifier
EOSortOrdering             Replaces the 1x EOAttributeOrdering
EOTemporaryGlobalID
EOUndoManager

PRELIMINARY

Access Layer Enhancements

Access Layer Enhancements

Database Level

The Enterprise Objects Framework 2.0 database level architecture has the same basic design as it does in version 1x. As illustrated in Figure 10, the database level is comprised of three classes: EODatabase, EODatabaseContext, and EODatabaseChannel. However, each of these classes has somewhat different responsibilities and behavior than it does in Enterprise Objects Framework 1x.

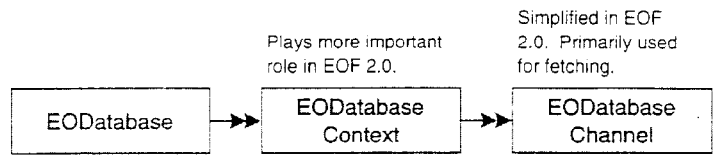

Figure 5. *Database Level Architecture*

EODatabase plays a role very similar to the one it plays in 1x. The most significant difference is that EODatabase objects now manage a list of models. In Enterprise Objects Framework 2.0, you access models through EODatabase objects instead of through EOAdaptors.

On the other hand, EODatabaseContext plays a much different role in 2.0 than it does in 1x: its role is much more important. EODatabaseContext objects are responsible for analyzing graphs of enterprise objects and recording changes in the database. EODatabaseContext objects save changes by translating changes in the object graph to database operations. It then uses an EOAdaptorChannel to perform the operations.

Accordingly, the role of EODatabaseChannel is smaller in Enterprise Objects Framework 2.0. It no longer provides the methods such as insertObject, updateObject, and deleteObject. Rather, EODatabaseChannel objects are primarily used by an EODatabaseContext for fetching enterprise objects. In fact, EODatabaseContexts maintain a list of EODatabaseChannels for fetching. Consequently, fetching conflicts due to "busy channels" are more easily avoided in Enterprise Objects Framework 2.0.

The following sections describe the impact database level enhancements have on development tasks.

Differences Between Enterprise Objects Framework 1x and 2.0

Relationship Updating

In Enterprise Objects Framework 1.1, relationships are essentially read only. To update a relationship between two rows in the database in Enterprise Objects Framework 1x, developers must write code to track and update foreign keys. In Enterprise Objects Framework 2.0, EODatabaseContext objects recognize changes to relationships and automatically update foreign keys.

For example, assume that a new employee—Jane—is added to the engineering department. As illustrated in Figure 6, an Employee object for Jane is added to the employees array in the Department object representing engineering. Similarly, Jane's department variable is assigned to the engineering Department object. When an EODabaseContext analyzes the Department-Employees object graph, it detects the new relationships, translates the changes to database operations, and performs the database operations using an EOAdaptorChannel. As a result, the DeptID foreign key in the Employee row for Jane is updated with the DeptID value for the engineering department.

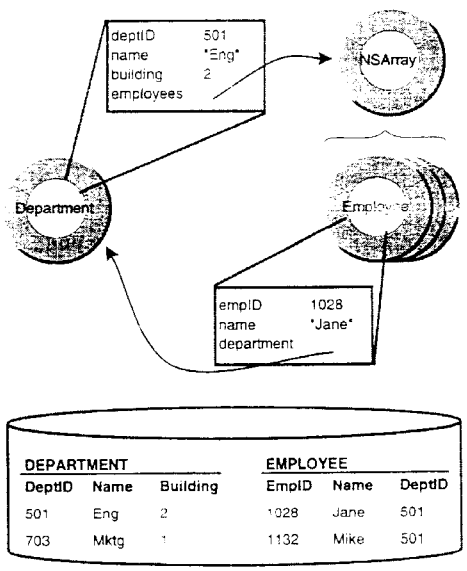

| DEPARTMENT | | | EMPLOYEE | | |
|---|---|---|---|---|---|
| DeptID | Name | Building | EmpID | Name | DeptID |
| 501 | Eng | 2 | 1028 | Jane | 501 |
| 703 | Mktg | 1 | 1132 | Mike | 501 |

Figure 6. *Pointer-Based Relationship Manipulation.*

Access Layer Enhancements

Updating Flattened Attributes

Using flattened attributes, an enterprise object can contain values from more than one table in a database. In Enterprise Objects Framework 1x, flattened attributes are read only. In Enterprise Objects Framework 2.0, flattened attributes can be modified, and changes to them are automatically updated in the database.

For example, the aCustomer object in Figure 7 contains flattened attributes from the Address table. Changing aCustomer's street attribute has the effect of updating the corresponding database row in the Address table.

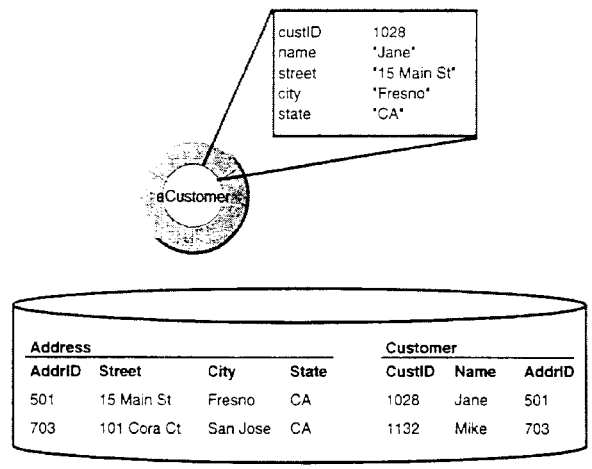

Figure 7. *Updating Flattened Attributes.*

Enterprise Object Inheritance

To improve support for inheritance, Enterprise Objects Framework 2.0 will allow the object hierarchy to be captured in the model. Developers can specify how class hierarchies are mapped to entities and how entities are mapped to tables in the database. Enterprise Objects Framework 2.0 automatically manages the selection, insertion, updating, and deletion of objects.

Note: The support for inheritance in this alpha release is incomplete, and the API is very likely to change.

Differences Between Enterprise Objects Framework 1x and 2.0

Accessing Multiple Databases

In Enterprise Objects Framework 2.0, you can create relationships that span multiple databases. For example, you can define a relationship from an entity in a Sybase database to an entity in an Oracle database. The database level in Enterprise Objects Framework 2.0 automatically assembles an object graph with enterprise objects fetched from multiple databases. In addition, the ... vel saves subsequent changes to the appropriate databases.

Note: You can't flatten attributes across databases.

The ability to mix objects from multiple databases in a single object graph is enabled by the control layer architecture. The EOObjectStoreCoordinator and EOCooperatingObjectStore classes in the control layer specify the way objects from different object stores can be mixed in the same object graph. As a subclass of EOCooperatingObjectStore, EODatabaseContext provides the ability to mix objects from multiple databases.

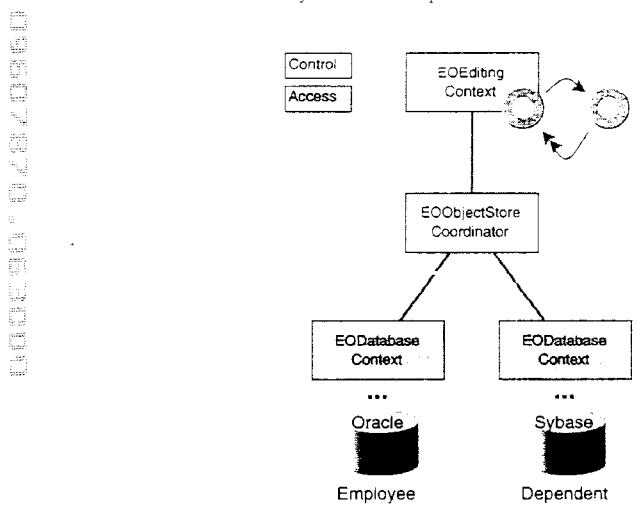

Figure 8. *Accessing Multiple Databases*

EOModeler and the modeling classes have also been updated to support multiple database access. See the chapter "Using EOModeler" in the Enterprise Objects Framework Developer's Guide for more information about creating relationships between entities in different databases.

Access Layer Enhancements

Referential Integrity

Enterprise Objects Framework 2.0 extends support for relational integrity rules from the database to the object graph. In EOModeler, you can specify optionality and delete rules for relationships. Optionality rules can be enforced when an object graph is validated and/or saved. See the chapter "Using EOModeler" in the Enterprise Objects Framework Developer's Guide for re information.

Stored Procedures

Enterprise Objects Framework 2.0 includes the following enhancements to stored procedure support:

- A new EOStoredProcedure class defines a general API for encapsulating vendor specific stored procedures. It provides a mechanism for mapping keys to input and output parameters.

- In EOModeler, you can assign stored procedures to entities for insert, delete, and "fetch all" operations.

Number Conversion

In Enterprise Objects Framework 1x, numeric database values are stored in NSNumber objects. As a result, values are limited to double precision and operations are inexact. With Enterprise Objects Framework 2.0, you can use the Foundation class NSDecimalNumber to avoid the problem illustrated in Figure 9.

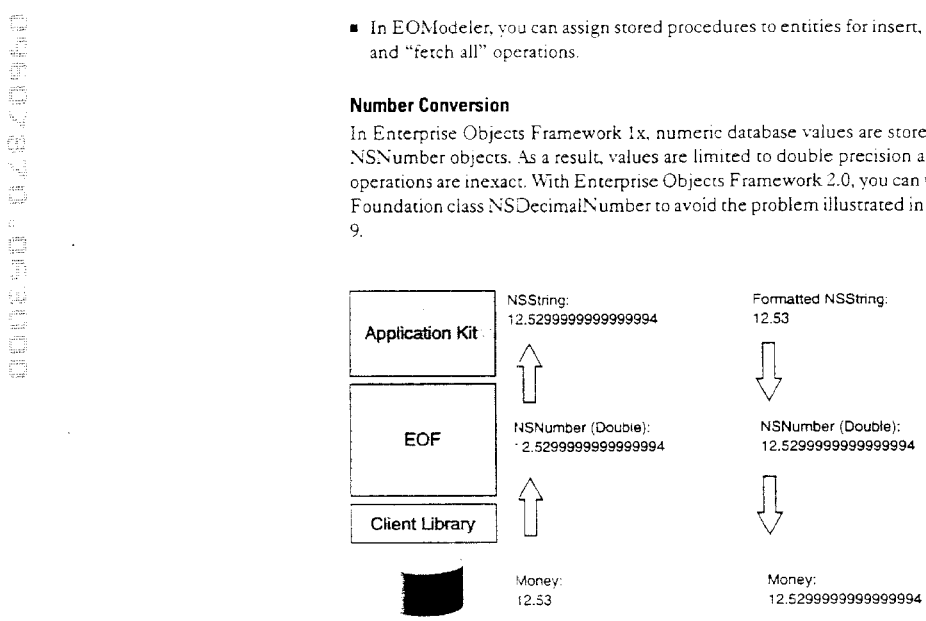

Figure 9. *Using NSNumber*

Differences Between Enterprise Objects Framework 1x and 2.0

Adaptor Level

Enterprise Objects Framework 2.0 provides three adaptors: updated Oracle and Sybase adaptors and a new Informix adaptor. The Oracle adaptor includes the following enhancements:

- Based on the most recent production version of the Oracle client libraries.
- Provides shared pool support.
- It constructs relationships from metadata in the database server.
- Supports stored procedure result sets and parameters.

The Sybase adaptor includes the following enhancements:

- Based on CT-Lib client libraries for System 10 servers.
- Uses array fetching for faster access times.

In addition to improved support for specific database servers, Enterprise Objects Framework 2.0 makes significant improvements to the adaptor level by enhancing the abstract classes that implement the bulk of adaptor functionality. The Enterprise Objects Framework 2.0 adaptor architecture has the same basic design as it does in version 1x. As illustrated in Figure 10, an adaptor is comprised of three classes: EOAdaptor, EOAdaptorContext, and EOAdaptorChannel. Each of these classes has essentially the same responsibilities and behavior as it does in Enterprise Objects Framework 1x.

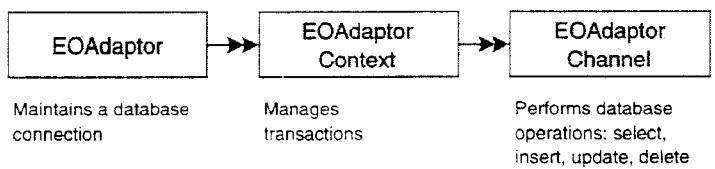

| EOAdaptor | EOAdaptorContext | EOAdaptorChannel |
|---|---|---|
| Maintains a database connection | Manages transactions | Performs database operations: select, insert, update, delete |

Figure 10. *Adaptor Architecture*

The following sections describe the impact adaptor level enhancements have on development tasks.

Access Layer Enhancements

Writing Custom Adaptors

Although the adaptor architecture is relatively unchanged, the adaptor level classes take advantage of enhancements in other areas of the framework that make writing custom adaptors easier in Enterprise Objects Framework 2.0.

- The EOSQLExpression class has been simplified: it's more heavily based on SQL syntax and the responsibilities of subclassers are more straightforward.

- Abstract adaptor classes use new API in the EOAttribute class for specifying custom values so it's easier to support custom values in custom adaptors.

- The adaptor API uses the new EOQualifier class (now in the Control layer). As a result, it is much easier to write adaptors for non-SQL data sources.

Accessing Database Metadata

Enterprise Objects Framework 2.0 provides the following enhancements for accessing database metadata:

- The EOSQLExpression class contains new API that supports schema generation.

- The EOAdaptor class provides API for mapping internal (Objective-C) names and types to external (database) names and types.

- The EOAdaptorChannel class provides API for constructing stored procedure objects from metadata in the database server.

These enhancements are particularly useful for extending EOModeler. See the EOModeler Enhancements section for more information.

Differences Between Enterprise Objects Framework 1x and 2.0

Modeling Classes

Enterprise Objects Framework 2.0 provides the following enhancements to the modeling classes:

- The custom value support in EOAttribute has been extended so you can specify a factory (creation) method, a conversion method, and an intermediate type (NSData, NSString, or bytes). For more information, see the chapter "Using EOModeler" in the Enterprise Objects Framework Developer's Guide.

- The new EOStoredProcedure class extends model support for stored procedures.

- Model files are incrementally loaded.

- The new EOModelGroup class manages all the models used by an application or framework to support cross-database relationships.

Access Layer Gotchas

If you are used to developing applications with Enterprise Objects Framework 1x, watch out for the following gotchas when you begin developing in Enterprise Objects Framework 2.0.

- EOGenericRecord no longer provides the methods objectForKey: and setObject:forKey:. Use valueForKey: and takeValue:forKey: instead.

- Model lookup is now project and framework-based. The search path ~/Library/Models, /LocalLibrary/Models, /NextLibrary/Models is no longer used. Instead, add all relevant model files to application and framework projects.

- EOAdaptor no longer provides the method model for accessing an EOModel. Instead, use the EODatabase method models to return a list EOModel objects.

- Many of the 1x methods that return BOOL values have been modified to return void. Instead of indicating failure by returning NO, 2.0 methods often raise exceptions to communicate information about the type of failure.

Access Layer Enhancements

Summary of Access Layer Additions and Deletions

Updated Access Layer Classes
EOAdaptor
EOAdaptorChannel
EOAdaptorContext
EOAttribute
EODatabase
EODatabaseChannel
EODatabaseContext
EODatabaseDataSource
EOEntity
EOGenericRecord
EOJoin
EOModel
EORelationship
EOSQLExpression

Removed Access Layer Classes

| | |
|---|---|
| EODetailDatabaseDataSource | Replaced with control layer's EODetailDataSource. |
| EOFault | Moved to control layer. |
| EOFormatExpression | Removed from 2.0. Superseded by EOSQLExpression. |
| EOKeySortOrdering | Replaced with control layer's EOSortOrdering. |
| EONull | Moved to control layer. |
| EOQualifier | Moved to control layer. |
| EOQuotedExpression | Removed from 2.0. Superseded by EOSQLExpression. |

New Access Layer Classes

| | |
|---|---|
| EOAdaptorOperation | |
| EODatabaseOperation | |
| EOEntityClassDescription | |
| EOModelGroup | |
| EOSQLQualifier | Functionally equivalent to the 1x EOQualifier. |
| EOStoredProcedure | |

Differences Between Enterprise Objects Framework 1x and 2.0

Interface Layer Enhancements

In Enterprise Objects Framework 2.0, the interface layer plays a reduced role. The control layer provides much of the functionality formerly provided by EOController. To reflect its new role, the EOController class has been renamed to EODisplayGroup.

EODisplayGroup

EODisplayGroup provides the following UI-related functionality:

- Maintain a collection of enterprise objects and a selection of zero, one, or more of those objects.
- Notify associations of changes to enterprise objects.
- Invoke validation methods.
- Perform object sorting using the new EOSortOrdering class.

EOAssociation

In Enterprise Objects Framework 2.0, EOAssociations incorporate the following enhancements:

- *Support for validation.* An association notifies its EODisplayGroup when a user begins editing, only permits a user to leave an edited field if its EODisplayGroup approves the change, and passes formatter validation errors to its EODisplayGroup so the EODisplayGroup can handle the error.

- *Support for multi-aspect associations.* For example, EOPopUpAssociation has a values aspect and a selectedValue aspect. You can bind the values aspect to one enterprise object key and the selectedValue aspect to a different enterprise object key.

PRELIMINARY

Interface Layer Enhancements

For more information on associations, see the chapters "Creating an Enterprise Objects Framework Project" and "Overview of the Examples" in the Enterprise Objects Framework Developer's Guide. You can also refer to the comments in the header files for the following classes:

- EOAssociation
- EOActionAssociation
- EOActionCellAssociation
- EOActionInsertionAssociation
- EOColumnAssociation
- EOControlAssociation
- EODetailSelectionAssociation
- EOGenericControlAssociation
- EOPopUpAssociation
- EOQualifiedAssociation
- EOTextAssociation

Formatters

The interface layer of Enterprise Objects Framework 2.0 takes advantage of formatter objects provided by the Application Kit. You can assign formatters to any NSCell. Cells use formatters to do the following:

- Format object values for display.
- Parse strings into object values.

NSTableView

The interface layer of Enterprise Objects Framework 2.0 also takes advantage of a redesigned table view. The table view class, renamed NSTableView, is now provided by the Application Kit.

- It is implemented in four public classes: NSTableView, NSTableColumn, NSTableHeaderView, and NSTableHeaderCell.

- NSTableView uses cells to perform drawing. You can use any cell class—NSTextCell, NSImageCell, and so on—in a table view.

- The interface between NSTableView and its data source has been simplified.

Differences Between Enterprise Objects Framework 1x and 2.0

Interface Layer Gotchas

If you are used to developing applications with Enterprise Objects Framework 1x, watch out for the following gotchas when you begin developing in Enterprise Objects Framework 2.0.

- The saveToObjects:, saveToDataSource methods provided by EOController aren't provided by EODisplayGroup. The EODisplayGroup class doesn't provide buffering of edits or operations. You can use nested EOEditingContexts to get the effect of buffering edits, and operation buffering is handled automatically by an EOEditingContext.

- EODisplayGroup instances don't maintain an array of associations. To access the associations for a particular EODisplayGroup, use the EOObserverCenter method observersForObject.

- When you create an association in Interface Builder in Enterprise Objects Framework 2.0, you drag a connection from the association's "destination" to the EODisplayGroup.

- The EOAssociation API has changed considerably. Communication between an EODisplayGroup and its EOAssociations is much different than that between an EOController and its EOAssociations. EOAssociations observe their EODisplayGroups using the EOObserver protocol. As a result, associations are updated asynchronously.

Interface Layer Enhancements

Summary of Interface Layer Additions and Deletions

Updated Interface Layer Classes
EOActionCellAssociation
EOAssociation
EOColumnAssociation
EOControlAssociation
EOPopUpAssociation
EOQualifiedAssociation
EOTextAssociation

Removed Interface Layer Classes

| | |
|---|---|
| EOBrowserAssociation | Not completed for this alpha release. |
| EOButtonAssociation | Replaced with EOActionAssociation. |
| EOImageAssociation | Use the EOControlAssociation instead. |
| EOMatrixAssociation | Not completed for this alpha release. |
| EOController | Replaced with EODisplayGroup and EOEditingContext. |

New Interface Classes
EOActionAssociation
EOActionInsertionAssociation
EODetailSelectionAssociation
EODisplayGroup
EOGenericControlAssociation

PRELIMINARY

Differences Between Enterprise Objects Framework 1x and 2.0

Enterprise Object Enhancements

EOKeyValueCoding and EOKeyRelationshipManipulation

Enterprise Objects Framework 2.0 includes the following enhancements to the informal EOKeyValueCoding protocol:

- The primitive methods—valueForKey: and takeValue:forKey:—are single-key. The multi-key versions, valuesForKeys: and takeValues:fromDictionary:, still exist, but their default implementation invokes the single-key methods.

- Two new methods, valueForKeyPath: and takeValue:forKeyPath:, have been added for accessing variables using a key path. For example, suppose an employee entity has a relationship to its department. Assuming employees have a department instance variable that points to a department object and department objects have a departmentName instance variable, you can get and set the name of the employee's department using the following statements:

```
[employee valueForKeyPath:@"department.departmentName"];
[employee takeValue:newDepartmentName
    forKeyPath:@"department.departmentName"];
```

- The default implementations of valueForKey: and takeValue:forKey: raise exceptions when you provide a key that doesn't correspond to a method or instance variable in the receiver. To implement a more permissive policy, you can override the methods handleQueryWithUnboundKey: and handleTakeValue:forUnboundKey:.

- The method unableToSetNilForKey: is provided to set policy for an attempt to assign nil to an instance variable that requires a C scalar type.

In addition to the EOKeyValueCoding protocol, the new informal protocol EOKeyRelationshipManipulation has been introduced in Enterprise Objects Framework 2.0. As with EOKeyValueCoding, a category of NSObject defines a default implementation of EOKeyRelationshipManipulation. EOKeyRelationshipManipulation defines the following methods for manipulating relationship values:

- addObject:toPropertyWithKey:
- removeObject:fromPropertyWithKey:
- addObject:toBothSidesOfRelationshipWithKey:
- removeObject:fromBothSidesOfRelationshipWithKey:

For more information on EOKeyValueCoding and EOKeyRelationshipManipulation, see the comments in the header files EOKeyValueCoding.h and EOClassDescription.h

PRELIMINARY

Enterprise Object Enhancements

Validation

EOF 2.0 incorporates a validation mechanism for enterprise objects. A category of NSObject uses the EOClassDescription class to provide default implementations of the following validation methods. The following enterprise object methods are invoked automatically by framework components such as EODisplayGroup and EOEditingContext.

- validateValue:forKey:
- validate
- validateDelete
- validateInsert
- validateUpdate For more information on these methods, see the comments in the header file for EOClassDescription. For more information on the process of validating enterprise objects, see the chapter "Overview Of The Examples" in the Enterprise Objects Framework Developer's Guide and the comments in the header file EOClassDescription.h.

Enterprise Object Initialization

Enterprise Objects Framework 2.0 replaces the optional initialization methods defined in Enterprise Objects Framework 1x

- Enterprise Objects Framework 2.0 replaces initWithPrimaryKey:entity: with initWithEditingContext:classDescription:globalID:. Like initWithPrimaryKey:entity:, initWithEditingContext:classDescription:globalID: is used to initialize enterprise objects created by the framework. If the enterprise object class doesn't implement this method, init is used instead.

- Enterprise Objects Framework 2.0 replaces awakeFromDatabaseChannel: with awakeFromFetchInEditingContext. This method is sent to an enterprise object immediately after the object has been created from a database row. awakeFromFetchInEditingContext is called after the object has been initialized with database values.

Enterprise Objects Framework 2.0 includes a new initialization method as well.

- awakeFromInsertionInEditingContext is an optional method sent to newly created enterprise objects. This method isn't invoked in objects that aren't being initialized with data from an object store. This method provides an opportunity to assign default values.

For more information about these methods, see the comments in the header files EOClassDescription.h.

PRELIMINARY

Differences Between Enterprise Objects Framework 1x and 2.0

Enterprise Object Gotchas

If you are used to developing applications with Enterprise Objects Framework 1x, watch out for the following gotchas when you begin developing in Enterprise Objects Framework 2.0.

- The optional enterprise object method prepareForDataSource is not supported in Enterprise Objects Framework 2.0. It's replaced by the validation mechanism described above.

- Enterprise objects should invoke their willChange method in set methods before making changes.

- When enterprise object values are null in the database, nil is passed as an argument to set methods instead of EONull.

- Enterprise objects don't have to declare instance variables for primary key and foreign key values. The framework manages primary and foreign keys automatically. The default mechanism for assigning unique primary keys is provided with the EOAdaptorChannel's primaryKeyForNewRowWithEntity:. If you need to provide a custom mechanism for assigning primary keys, you can implement the EODatabaseContext delegate method databaseContext:newPrimaryKeyForObject:entity:. Using these two mechanisms, you don't need to store the primary key in your enterprise object.

PRELIMINARY

EOModeler Enhancements

The new version of EOModeler features several user interface improvements.

- *New table mode.* In addition to the browser mode, EOModeler 2.0 provides a table mode for displaying models. The table mode is capable of displaying more information than the browser mode, and it is editable. For more information, see the chapter "Using EOModeler" in the Enterprise Objects Framework Developer's Guide.

- *Model inspector.* In EOModeler 2.0, the model itself has an inspector for editing characteristics specific to the model.

- *Multi-pane inspectors.* The inspectors in EOModeler 2.0 have multiple panes. For example, the Entity Inspector has four panes in which to display entity characteristics: Entity, Stored Procedure, Inheritance, and UserInfo.

- *UserInfo inspectors.* EOModeler 2.0 provides user info inspectors for models, entities, attributes, and relationships.

In addition, EOModeler incorporates the following extensions to support Enterprise Objects Framework 2.0 features:

- Simple database creation
- Support for inheritance
- Specification of stored procedures for accessing entities

Extensibility

In the final version of Enterprise Objects Framework 2.0, EOModeler will be extensible. You will be able to add custom inspectors, consistency checking, and menu items. The relevant API isn't available in this alpha release.

Differences Between Enterprise Objects Framework 1x and 2.0
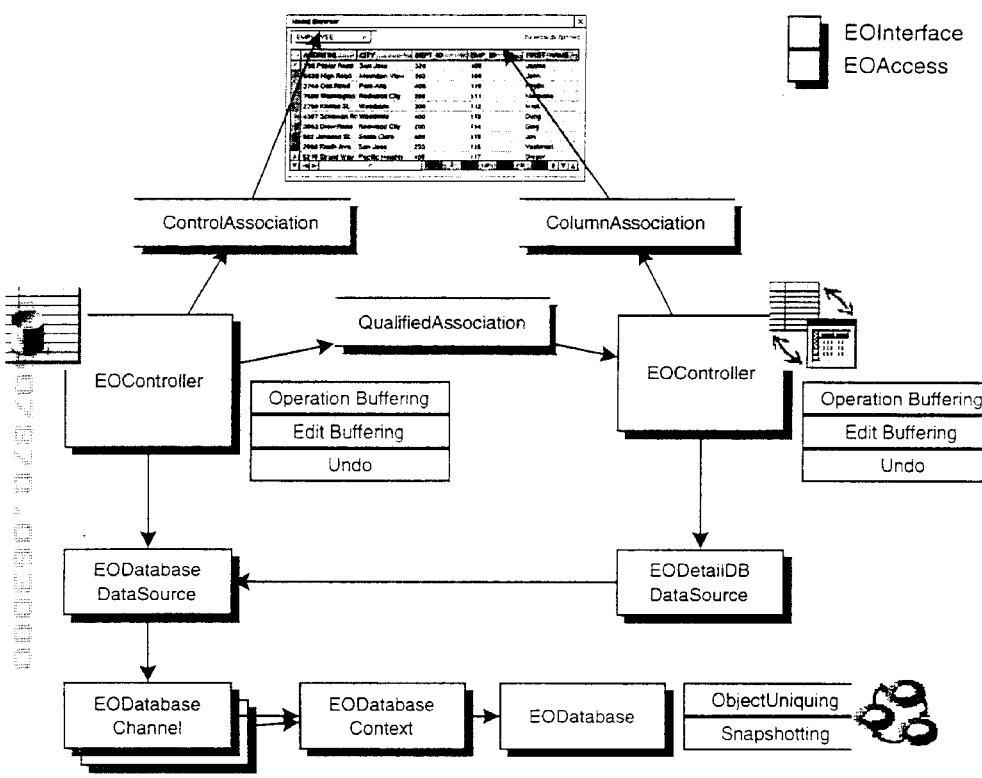
Figure 11. *Architecture of an Enterprise Objects Framework 1x Application*

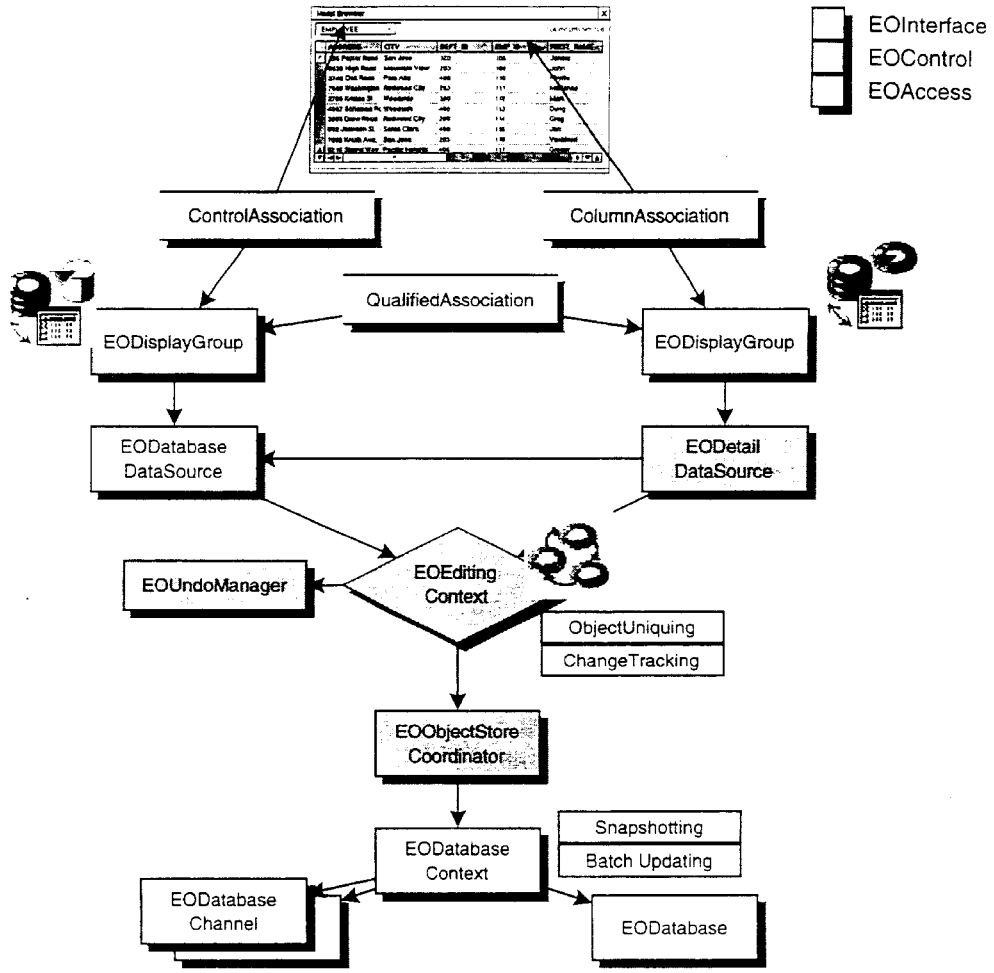
Figure 12. Architecture of an Enterprise Objects Framework 2.0 Application Differences Between Enterprise Objects Framework 1x and 2.0

Enterprise Objects Framework Release 1.2 Prerelease 2 Copyright ©1995 by NeXT Computer, Inc. All Rights Reserved.

Supplemental Release Notes: Enterprise Objects Framework

This file contains additional release notes for the second prerelease (PR2) of the Enterprise Objects Framework.

Known Problems in Release 1.2

Enterprise Objects Framework

These problems exist in this release of the Enterprise Objects Framework:

Reference: 47196

Problem: Enterprise Objects Framework does not perform character set conversion automatically.

Description: Enterprise Objects Framework sends data to the database in the default character encoding. This can be a problem when the following is true:

- Non-ASCII characters are being stored in the database
- The data is accessed by machines using a different character encoding than the default NEXTSTEP encoding
- The database server does not provide character conversion from the default NEXTSTEP encoding to the character encoding used by the database This situation may commonly exist in Europe, where accented characters are used which need to be stored in the ISO_8859_1 encoding.

Workaround: In order to implement the necessary conversion from NextStep to ISO_8859_1 encoding, developers need to implement a subclass of NSString which will perform the necessary conversion to and from the NEXTSTEP encoding, and specify it as a custom class on any attributes which contain character data that may need to be converted.

Reference: 49659

Problem: It can be difficult to use dates in qualifiers.

Description: The following qualifier:

```
startDate = [NSCalendarDate dateWithYear:1994 month:11 day:27
    hour:0 minute:0 second:0 timeZone:[NSTimeZone
    timeZoneWithAbbreviation:@"PST"]];

qualifier = [[EOQualifier alloc] initWithEntity:[ds entity]
    qualifierFormat:@"%A < %@", @"DATE", startDate];
```

Generates this (bad) SQL:

`"... where DATE <"`

(The date is dropped from the SQL). The problem is that expressionValueForContext: is not (and cannot be) implemented for NSDate.

Workaround: Use formatValue:forAttribute: as follows:

```
EOAdaptor *adaptor = [[[[ds databaseChannel] adaptorChannel]
    adaptorContext] adaptor];
qualifier = [[EOQualifier alloc] initWithEntity:[ds entity]
    qualifierFormat:@"%A < %@", @"NAME", [adaptor
    formatValue:startDate forAttribute:dateAttr]];
```

Reference: 51338

Problem: runLoginPanel doesn't return nil as it's supposed to when you Cancel the login panel.

Workaround: None.

Reference: 60284

Problem: SQL generation uses format string in optimistic locking.

Description: When an attribute that has a format string is used for locking, the formatted value is included in the "for update" clause of the select statement.

Workaround: Have an additional attribute that is not formatted that is used for locking.

Reference: 62586

Problem: EODatabaseDataSource initializes without setting database channel.

Description: The EODatabaseDataSource finish instantiating itself until awakeFromNib is called. This means that other objects are unable to rely on the EODatabaseDataSource being fully instantiated and having an database channel available in their own awakeFromNib methods.

Workaround: Objects can enqueue a notification so that they will get called back after all of the awakeFromNib methods have been called.

Reference: 63719

Problem: From the shell, "open myModel.eomodel" starts EOModeler1x, but doesn't open the file.

Workaround: If EOModeler is already running, then everything works fine.

Reference: 64027

Problem: The TextAssociation has an incompatible change from the 1.1 behavior

Description: The EOTextAssociation in Enterprise Objects Framework 1.1 would read RTF, RTFD, and plain test from either an NSString or an NSData. The 1x association will read only RTF and RTFD from and NSData, and only plain text from an NSString.

Workaround: If EOAttribute has a value class of NSData, set the text edit to Rich Text and Accepts graphics.

Reference: 64273

Problem: Join semantic popup in EOModeler Relationship inspector broken

Description: The PopUp control in the EOModeler Relationship inspector for picking setting the join semantic that is used for a relationship does not work.

Workaround: Use a text editor to edit the .eomodel file and enter the desired semantic.

Enterprise Objects Framework Release 2.0 Prerelease 1 Copyright ©1995 by NeXT Computer, Inc. All Rights Reserved.

Release Notes:
Enterprise Objects Framework 2.0

This file contains release notes for the first prerelease of the Enterprise Objects Framework. This prerelease is intended to be of Alpha quality.

The MachOS version of this prerelease is 3-way fat; it can be used to develop software for NeXT, Intel, and SPARC. The OpenStep for Windows version of this prerelease can be used to develop software for Intel machines running Windows NT.

Notes Specific to Windows NT Developers

In order to use the Enterprise Objects Framework on Windows NT, you must purchase appropriate client libraries from your database vendor.

Here is what you need:

Oracle
   Phone: (800) 542-1170
   Ask for:
      SQL NET V2.1 for PC/Windows NT

Sybase
   Phone: (800) 685-8225
   Ask for:
      Open Client Runtime for PC/Windows NT

Informix
   Phone: (800) (800)331-1763
   Ask for:
      ESQL/C for Win32

Installing the Examples

This prerelease provides on-line examples to help familiarize you with Enterprise Objects Framework 2.0. These examples are located in
/NextDeveloper/Examples/EnterpriseObjects. Installing the examples involves these
steps:

- Setting up users/databases on your database server for the example databases
- Installing the example directory
- Populating your database server with example data

Setting up Database Accounts

The Enterprise Objects Framework 2.0 examples use two sets of tables: Movies, and
Rentals. Some examples use just one of the these databases, while others use both. The
multi-database support in Enterprise Objects Framework 2.0 makes it possible for you to
install these databases in three different configurations:

- Both sets of tables together in a single user/database
- Each set of tables in its own user/database on the same database server
- Each set of tables on its own database server (e.g. Movies on Informix, Rentals on Oracle).

Depending on your desired set up, you use the tools available with your database server to
set up one or two new user/databases. For example, on Sybase you might create a new
database on your server called "Movies" and login with the user "sa". On Oracle you might
create a new user with the name "Movies". Once you have set up these accounts, you are
ready to install the examples.

Installing the Example Projects

To install the example projects, you must have already set up your database accounts,
described above.

To install the Enterprise Objects Framework examples, follow these steps:

1. In a command shell, cd to /NextDeveloper/Examples/EnterpriseObjects.

2. Type install_examples.

This script prompts you to enter connection information for the Movie and Rental
   databases. It also asks you to enter the path of the directory in which you want to put
   the examples. The directory you specify need not already exist, but it must be in
   a writable directory (such as your home directory). You can't use "~" in your path for
   this step-- you must specify a complete path (for example, use
   /Net/users/joe/eoexamples, not ~joe/eoexamples or ~/eoexamples)

3. cd to the new examples directory you just installed, and type make all.

This performs a "make install" on the BusinessLogic.framework that's used by several of the examples, and puts it in the /LocalDeveloper/Frameworks directory. Note that if you already have this directory, you must make sure that it's writable--otherwise, this step will fail.

Populating the Databases
Once the examples are installed, you can fill your example databases with sample data. The load_databases tool in the DatabaseSetUp directory will connect to your databases, add the example tables, and fill them with data. If you later wish to remove the data, simple run the drop_databases tool.

New Features for 2.0

- A new class, EOEditingContext, that manages an object graph and coordinates change notification. This class is also responsible for change tracking and undo. One EOEditingContext can also be nested inside another, thereby supporting a kind of nested in-memory transaction.

- Support for multiple databases.

- NSDecimalNumber, a class that provides a lossless representation of decimal numbers.

- User interface formatting and validation.

- Updatable relationships: your business logic may now update relationship pointers in the object graph and the framework will automatically generate the appropriate foreign keys changes to affect the change in the database.

- Referential integrity rules. You can explicitly add referential integrity rules in EOModeler. They will be enforced by Enterprise Objects Framework in your running application.

- Improved support for modeling inheritance.

- Enterprise object-based validation.

- Update support for flattened attributes.

- Schema creation. You can use the Generate SQL command in EOModeler to generate SQL for a selected entity or entities.

- Automatic primary key generation: the framework can now automatically assign primary keys for newly inserted objects.

- Structured qualifiers-- that is, qualifiers are now database and SQL independent.

- Incremental model loading for improved performance. Models now consist of an .eomodeld directory in which each entity has its own file. Entity descriptions are loaded into your application only as needed.

- Support for Informix servers.

- Improved support for Oracle stored procedures.

- Reverse engineering of primary keys and relationships on all supported databases (Informix, Oracle, and Sybase). Enterprise Objects Framework can now read this information from the database and incorporate it into a model.

- Sybase adaptor based on CT-Lib.

- The ability to edit the UserInfo dictionary in EOModeler.

For more discussion of these features, see the document *Differences Between Enterprise Objects Framework 1x and 2.0*.

New Features Shared with Enterprise Objects Framework 1.2

- An Informix adaptor is included in this release.

- The adaptors have become frameworks. Just as with the old bundle-based adaptors, the framework adaptors can be dynamically or statically linked. If you need to reference a class defined in a particular adaptor from your application code (for example, the InformixChannel class), you have to add the adaptor to the Frameworks list for your project.

If you have custom adaptors that you're converting to 2.0, you need to convert them into frameworks. If you do this, note that you may encounter problems linking to the client libraries that weren't present when you were loading your adaptor as a bundle. For example, you can't use common symbols. If you use undefined symbols, you need to set a flag in the linker to tell it to ignore those symbols.

- EOAdaptor's use of adaptor.info has been removed. Instead, the Info.plist file from the adaptor's bundle is consulted for the adaptor class name, login panel nib name, and adaptor major version number. The key names are as follows:

EOAdaptorMajorVersion
EOLoginPanelNibFile
EOAdaptorClassName

To add key-value pairs to the infoDictionary, add an ASCII property list file named CustomInfo.plist to the supporting files category of your project. The project makefiles will automatically merge this into the Info.plist that is derived from your project.

- The following Enterprise Objects Framework 1.1 classes have been renamed and moved into the AppKit: NXTableView (renamed to NSTableView), and NXImageView (renamed to NSImageView).

- EOApplication is obsolete. NSApplication now manages the autorelease pool.

New Methods and Behavior

For a description of how Enterprise Objects Framework 2.0 differs from the preceding releases, see the document *Differences Between Enterprise Objects Framework 1x and 2.0*.

Locating the Documentation for this Release

The Enterprise Objects Framework documentation for this prerelease is being provided in hard copy only. It includes a partial developer's guide. There is no reference documentation provided in this prerelease, but there are fairly substantial comments in the header files.

Other Documentation

There are other documents that may provide useful information to you, depending upon your application:

- The *OpenStep Conversion Guide* discusses how to use the automated conversion process to convert applications to OpenStep. See /NextLibrary/Documentation/NextDev/Conversion/ConversionGuide.

- *Using Distributed Objects with the Enterprise Objects Framework* discusses how you can work with Enterprise Objects in a distributed environment. See UsingDistributedObjects.rtf in the /NextLibrary/Documentation/NextDev/EnterpriseObjects1x directory.

Documentation Feedback

Your comments on our documentation are especially valuable. Please send electronic mail with your comments and suggestions to techpubs_feedback@next.com. (If you include EODoc: as the first part of your message's subject, we'll be able to identify it more quickly.)

Known Problems in Release 2.0

Enterprise Objects Framework

These problems exist in this release of the Enterprise Objects Framework:

Reference: 47202

Problem: Conversion from money to double doesn't always work.

Description: Database number types are sometimes more precise than a C float or double. Consequently when these numbers are read in from the database, stored in a double, and then written back out to the database, rounding errors may appear. For instance, the value '2078927178.0000' is converted as '2078927178.0000002384185791'.

Workaround: Use the NSDecimalNumber class for money.

Reference: 46967

Problem: Using delete propagation triggers in database can cause Enterprise Objects Framework to become out of sync.

Description: The use of delete propagation triggers in the database instead of the model may cause the Enterprise Objects Framework to become out of sync. This becomes a bigger problem if the Framework is executing several operations as part of a transaction and the transaction is rolled back by a trigger rule.

Workaround: None.

Reference: 47832

Problem: Do not mark as "used for locking" those attributes in the model with a custom data type unless the custom value class implements a value-based isEqual: method.

Workaround: Implement isEqual: on the custom datatype are do not mark it used for locking.

Reference: 50097

Problem: Master-peer with flattened relationship generates invalid ORDER BY clause if you set the peer's fetch.

Description: Master-peer configurations with flattened relationships will not work correctly. Invalid SQL is generated when the peer is asked to fetch.

Workaround: None.

Reference: 51250

Problem: You can't join on derived attributes.

Description: Invalid SQL is generated whenever an derived attribute is designated as a join attribute in a relationship.

Workaround: None.

Reference: 51768

Problem: Unarchiving EONulls produces distinct instances.

Description: EONull may have multiple instances after unarchiving. If the EONull object is archived, then unarchiving the file will create a new instance of EONull, one that is not returned by the [EONull null] method.

Workaround: This problem can be resolved by implementing the following category on EONull:

```
@implementation EONull (Unarchiving)
- (id) awakeAfterUsingCoder:(NSCoder *)coder
{
    EONull *oneTrueNull = [EONull null];

if (self == oneTrueNull)
    return self;

[self autorelease];
return oneTrueNull;
}
@end
```

Reference: 52557

Problem: Enterprise Objects Framework wrongly generates t0.nil

Description: Enterprise Objects Framework sometimes inappropriately generates SELECT statements that include text like "t0.*nil*". For example, this can happen when you make a column with no column name, a column with a column name like "convert(varchar(12), 'Default')", or with derived attributes with no column name.

Workaround: None.

Reference: 60212

Problem: Batch faulting needs to be fully implemented.

Description: Batch faulting is used for performance reasons. At the moment, it doesn't work in all cases (manyToMany and cross-database relationships).

Workaround: None.

Reference: 60227

Problem: Not all common widgets have corresponding multi-aspect associations.

Description: EOF ? ° is current missing associations for: sets of radio buttons, NSMatrix, and NSBrowser. These will be offered in future releases.

Workaround: Implement a custom association subclass.

Reference: 61475

Problem: Fetches to the top of an inheritance tree execute too many selectes.

Description: Fetches to the top of an inheritance tree does too many fetches (currently always one fetch is performed for each concrete subclass). When fetching a hierarchy mapped to in a single table, only one fetch should be performed.

Workaround: None.

Reference: 62543

Problem: EOLikeQualifier not implemented.

Description: The specification of EOQualifier textual descriptions include the following selectors: "=", "<", ">", "<=", ">=", "!=", and "like". The "like" functionality has not yet been implemented and use of the "like" keywork will cause an exception to be raised.

Workaround: Implement a method with this functionality and specify the method directly in the Qualifier language.

Reference: 62748

Problem: Optimistic locking is not performed correctly on objects that span more than one database table.

Description: Optimistic locking is only performed on rows in the database that are either in the root table, are are from another table and are being updated. Flattened attributes that correspond to the updated object that aren't being updated are not checked to verify that they haven't changed.

Workaround: None.

Reference: 63069

Problem: Changing a primary key value may cause inconsistencies when using multiple editing contexts.

Description: Objects are uniqued by their primary keys. When an enterprise object exists in more than one editing context and its primary key changes in one of the editing contexts, other editing contexts containing that object may get out of sync.

Workaround: None.

Reference:

Problem: eoutil exits when error occurs while trying to drop a database.

Description: The eoutil data installation tool exits whenever an error occurs as SQL is sent to the database. This may block the user from having eoutil perform additional SQL that would have been executed had the error not occurred.

Workaround: Use eoutil to output a script performing the database operations and run that script through isql, sqlplus, or dbaccess.

Reference: 64278

Problem: You can't run the install_examples script by double-clicking it.

Workaround: In a shell, cd to /NextDeveloper/Examples/EnterpriseObjects, and run it from the command line.

Reference: 64283

Problem: Enterprise Objects Framework 2.0 examples merge with obsolete Enterprise Objects Framework 1.1 examples.

Description: If a system has Enterprise Objects Framework 1.1 Developer installed on it (EODeveloper.pkg) and then upgrades to 4.0, the EODeveloper package (incorrectly) stays installed, and the examples stay in /NextDeveloper/Examples/EnterpriseObjects.

When the user later installs EO2Developer, the Enterprise Objects Framework 2.0 examples are merged with the Enterprise Objects Framework 1.1 example files already in /NextDeveloper/Examples/EnterpriseObjects.

Workaround: Uninstall 1.1 EODeveloper.pkg before installing EO2Developer.pkg.

Reference: 63433

Problem: Need hook for determining sub-class/entity based on primary key.

Description: Enterprise Objects Framework 1.1 had a hook (classForEntity:values:) to allow a class to determine what subclass should be allocated based on the primary key.

Enterprise Objects Framework 2.0 is currently missing this hook, so the framework ends up performing more fetches than may be necessary to determine the class. This hook will reappear in future releases of the framework.

Workaround: None.

Oracle Adaptor

These problems exist in the Oracle adaptor supplied with this release of the Enterprise Objects Framework:

Reference: 52497

Problem: Optimistic locking on long columns fails for empty strings

Description: If your entity has a long column marked as "used for locking" and you are using optimistic locking, then you will be unable to update an object that has had any of its string attributes set to the empty string ("") unless you first refetch the object. This occurs because the Oracle server silently transforms empty strings into database NULLs, and the snapshot comparison that occurs when updating rows containing long columns will think that the another user has modified that row (by changing the "" to NULL) and will prevent the update.

Workaround: None.

Reference: 62425

Problem: Oracle Adaptor doesn't read in stored procedures inside of packages.

Description: There is no way to get the database to tell you the components (procedures and functions) that are inside a package definition. Clients can still create stored procedures in the model that will call into packages, it's just that model description using EOModeler won't create these at connect time.

Workaround: None.

Reference: 62868

Problem: Oracle Stored Procedures arguments of type NUMBER may have problems in foreign locales.

Description: There is no way to get the database to tell you the components (procedures and functions) that are inside a package definition. Clients can still create stored Workaround: None.

Reference: 64123

Problem: The Oracle adaptor occasionally inserts NULLs for BLOBs that have values.

Description: When the OracleAdaptor needs to pass NSDecimalNumbers in as arguments to a stored procedure invocation, it converts the number to a string on the client and lets the Oracle database convert that to an Oracle NUMBER type on the server.

Workaround: None.

Sybase Adaptor

These problems exist in the Sybase adaptor supplied with this release of the Enterprise Objects Framework:

Reference: 61481

Problem: When debugging, the new Sybase CT-Lib adaptor blocks if you you try to step over a call that requires a trip to the Sybase server.

Description: If you're in the debugger and try to step over a fetchObjects method, the debugger blocks.

Workaround: Interrupt the debugger using Control-C, then issue a continue command.

Reference: 61999

Problem: An update fails for text that disallows NULL and has an empty field.

Description: Whenever a text or image column is being updated, the Sybase adaptor attempts to ensure that the column has been initialized correctly by assigning NULL to it. In cases where null is not allowed this does not work.

Workaround: Modify the table definition to allow nulls.

Reference: 63181

Problem: You can't use [SybaseChannel executeStoredProcedure:] to start a fetch

Description: The executeStoredProcedure: method doesn't start a fetch, so any subsequent calls to fetchAttributes: will fail.

Workaround: None.

Informix Adaptor

These problems exist in the Informix adaptor supplied with this release of the Enterprise Objects Framework:

Reference: 63208

Problem: Informix adaptor ingores attributes passed to fetchAttributes:withZone:

Workaround: Call setSelectedAttributes before evaluateExpression. But once you have called evaluateExpression, you can't change the attribute list.

Reference: 63225

Problem: Informix adaptor does nothing for returnValuesForLastStoredProcedureInvocation

Workaround: None.

Reference: 64031

Problem: UserDefaults different between Enterprise Objects Framework1.2 and Enterprise Objects Framework2.0 InformixAdaptors.

Description: In Enterprise Objects Framework 1.2, the InformixAdaptor stores defautls in the following domain EOFInformixAdaptor and uses the following keys: INFORMIXDIR, DBDATE, DBLANG, DBMONEY, InformixLogErrors, ShowSystables, ShowTableOwner, Beautify, DefaultIsolationLevel, GlobalOptimization, GlobalExplain, GlobalLockMode, GlobalPDQPriority, GlobalDataSkip, GlobalConstraints, DatabaseExclusive Enterprise Objects Framework 2.0 stores defaults in the standard NSGlobalDomain and prefixed all keys with "Informix". i.e.: InformixINFORMIXDIR, InformixDBDATE, InformixDBLANG, InformixDBMONEY, InformixLogErrors, InformixShowSystables, InformixShowTableOwner, InformixBeautify,, InformixDefaultIsolationLevel, InformixGlobalOptimization, InformixGlobalExplain, InformixGlobalLockMode, InformixGlobalPDQPriority, InformixGlobalDataSkip, InformixGlobalConstraints, InformixDatabaseExclusive.

Workaround: None.

EOModeler

These problems exist in EOModeler with this release of the Enterprise Objects Framework:

Reference: 64289

Problem: Can't save changes to exiting model files on NT.

Description: If you open an existing .eomodeld file with the EOModeler on NT, make a change, and try to save, you get an alert panel saying "Error saving model file: Unable to Workaround: Edit the generated SQL by hand.

Reference: 64335

Problem: Clicking in the . column of the Inheritance Inspector multiple times can cause a crash.

Workaround: None.

Reference: 64339

Problem: Derived attributes don't work properly.

Description: Sometimes when you're trying to create a derived attribute, you may encounter seemingly random errors-- the pop-up list in the Inspector reverting to Column, the text you typed in the field being blown away, an error panel telling you "Unable to modify the attribute," and so on.

Workaround: None.

Installing EOF Release 2.0 (prerelease 1) for Mach

This document shows you how to install Enterprise Objects Framework Release 2.0 for Mach. You can install the contents of the *OpenStep Developer for Mach* CD-ROM on any computer, as long as it's running OpenStep Release 4.0 for Mach.

With Enterprise Objects Framework Release 2.0 for Mach you can develop applications that run on all OpenStep for Mach computers. You decide exactly which computer architectures an application runs on when you compile the application. You can specify that the application's executable file supports only one architecture (such as Intel®-based computers), or you can use NeXT's *Multi-Architecture Binary* support to create a single application that runs on multiple architectures.

Important: To build applications with Multi-Architecture Binary support, you must install all EOF packages for every type of architecture that you want to support. See the library installation instructions later in this document for information on how to do this.

Your computer must be running OpenStep Release 4.0 for Mach before you install Enterprise Objects Framework Release 2.0 for Mach. You can find the OpenStep version number with the Workspace Manager™ application's Info Panel command.

Warning: Don't install Enterprise Objects Framework Release 2.0 for Mach on a computer that isn't running OpenStep Release 4.0 for Mach. The installation may appear to be successful, but may result in applications crashing without warning. The *OpenStep Developer for Mach* CD-ROM contains these packages in its /NextCD/Packages directory:

| | |
|---|---|
| EO2Developer.pkg | Contains applications and header files you need to develop EOF applications |
| EO2User.pkg | Contains software libraries you need to use EOF applications |
| EO2InformixAdaptor.pkg | Contains header files and software libraries you need to access Informix adaptors from EOF |
| EO2OracleAdaptor.pkg | Contains header files and software libraries you need to access Oracle adaptors from EOF |
| EO2SybaseAdaptor.pkg | Contains header files and software libraries you need to access Sybase adaptors from EOF |

In addition to these packages, the *OpenStep Developer for Mach* CD-ROM contains many other files, which you shouldn't generally have to use. These files are the same as those installed by the packages. They're provided in case you need to retrieve a file that you've accidentally deleted.

Installing Enterprise Objects Framework Release 2.0 for Mach takes about 30 minutes.

Preparing to Install Enterprise Objects Framework Release 2.0 for Mach

1. Make sure your computer is running OpenStep Release 4.0 for Mach.

To find the OpenStep version, click the Workspace Manager application's Info Panel command in the Info menu. The Info panel that's displayed shows the release of OpenStep that you are running.

2. Determine whether your computer will export its copy of the Enterprise Objects Framework tools to other computers.

If your computer is the only one that will use this copy of the tools, you can install them (as described later) so that they run only on your computer's architecture. However, if your computer exports the tools over NFS, you might need to install the tools so that they run on multiple architectures. Installing the tools for additional architectures requires about 5 MB more disk space for each architecture.

3. Determine which computer architectures might run the applications you create.

When you install the libraries (as described below), you must specify each architecture that the applications you create need to run on. However, if your applications will be deployed only on the same architecture as you're developing on, you can install libraries that just support your computer's architecture.

4. Make sure you have enough disk space.

You need about 20 MB of free space on your hard disk to install the Enterprise Objects Framework package with tools that run on only one architecture.

5. If the CD-ROM drive isn't already connected, turn off the computer, connect the CD-ROM drive, and restart the computer.

6. Log in as root.

Only the superuser, root, can install Enterprise Objects Framework Release 2.0 for Mach. If you're not sure how to log in as root, see your system administrator.

7. In /NextLibrary/Receipts, deinstall EODeveloper.pkg. Double-click the package and click the Delete button in its Installer package window, click Delete again to confirm that you want to delete the package.

a. Insert the *OpenStep Developer for Mach* CD-ROM. When it appears in the File Viewer, click it to select it.

Now you're ready to install the Enterprise Objects Framework Release 2.0 for Mach tools, and libraries, as described below.

Installing the tools

1. Double-click the EO2Developer.pkg file in the /NextCD/Packages directory on the *OpenStep Developer for Mach* CD-ROM.

2. Click the Install button in the Installer package window.

An Install Package panel opens, where you select which architectures the files should be installed for. Your computer's architecture is already selected.

3. Select any additional architectures you wish the development tools to run on.

4. Click Install in the Install Package panel.

5. Make sure your computer is running OpenStep Release 4.0 for Mach (which you can check on the Workspace Manager's Info panel). If your computer isn't running OpenStep Release 4.0 for Mach, click Cancel. Don't continue with this installation until you've upgraded your computer to OpenStep Release 4.0 for Mach.

If you've deleted EODeveloper.pkg and your computer is running OpenStep Release 4.0 for Mach, click Continue.

The Installer window displays information about the progress of the installation. Installation takes up to 30 minutes.

Installing EO2User

1. Double-click the EO2User.pkg file in the /NextCD/Packages directory on the *OpenStep Developer for Mach* CD-ROM.

2. Click the Install button in the Installer package window.

An Install Package panel opens, where you select which architectures the files should be installed for. Your computer's architecture is already selected.

3. Select the additional architectures you wish to develop for.

Important: You should select every architecture that might run the applications you create.

4. Click Install in the Install Package panel.

5. If a panel opens, warning you that some files already exist and will be overwritten, make sure your computer is running OpenStep Release 4.0 for Mach (which you can check on the Workspace Manager's Info panel). If your computer is not running OpenStep Release 4.0 for Mach, click Cancel. Don't continue with this installation until you've upgraded your computer to OpenStep Release 4.0 for Mach.

If your computer is running OpenStep Release 4.0 for Mach, click Continue.

The Installer window displays information about the progress of the installation. Installation takes up to 25 minutes.

Installing Adaptor Packages

1. Double-click the adaptor package or packages you want to install in the /NextCD/Packages directory on the *OpenStep Developer for Mach* CD-ROM.

2. Click the Install button in the Installer package window.

An Install Package panel opens, where you select which architectures the files should be installed for. Your computer's architecture is already selected.

3. Select the additional architectures you wish to develop for.

Important: You should select every architecture that might run the applications you create.

4. Click Install in the Install Package panel.

5. If a panel opens, warning you that some files already exist and will be overwritten, make sure your computer is running OpenStep Release 4.0 for Mach (which you can check on the Workspace Manager's Info panel). If your computer is not running OpenStep Release 4.0 for Mach, click Cancel. Don't continue with this installation until you've upgraded your computer to OpenStep Release 4.0 for Mach.

After Installing Enterprise Objects Framework Release 2.0 for Mach

When the installation process is finished, choose Quit from the Installer menu and log out. You can now log in and begin using the tools and libraries of Enterprise Objects Framework Release 2.0 for Mach.

Copyright © 1996 NeXT Computer, Inc. All rights reserved. NeXT, the NeXT logo, and NEXTSTEP are registered trademarks of NeXT Computer, Inc. in the U.S. and other countries. OpenStep, Interface Builder and Workspace Manager are trademarks of NeXT Computer, Inc. All other trademarks mentioned belong to their respective owners.

Installing EOF Release 1.2 (prerelease 2) for Mach

This document shows you how to install Enterprise Objects Framework Release 1.2 for Mach. You can install the contents of the *OpenStep Developer for Mach* CD-ROM on any computer, as long as it's running OpenStep Release 4.0 for Mach.

With Enterprise Objects Framework Release 1.2 for Mach, you can develop applications that run on all OpenStep for Mach computers. You decide exactly which computer architectures an application runs on when you compile the application. You can specify that the application's executable file supports only one architecture (such as Intel®-based computers), or you can use NeXT's *Multi-Architecture Binary* support to create a single application that runs on multiple architectures.

Important: To build applications with Multi-Architecture Binary support, you must install all EOF packages for every type of architecture that you want to support. See the library installation instructions later in this document for information on how to do this.

Your computer must be running OpenStep Release 4.0 for Mach before you install Enterprise Objects Framework Release 1.2 for Mach. You can find the OpenStep version number with the Workspace Manager™ application's Info Panel command.

Warning: Don't install Enterprise Objects Framework Release 1.2 for Mach on a computer that isn't running OpenStep Release 4.0 for Mach. The installation may appear to be successful, but may result in applications crashing without warning. The *OpenStep Developer for Mach* CD-ROM contains these EOF1 packages in its /NextCD/Packages directory:

| | |
|---|---|
| EOIDeveloper.pkg | Contains application and header files you need to develop EOF applications |
| EOIUser.pkg | Contains software libraries you need to use EOF applications |
| EOIInformixAdaptor.pkg | Contains header files and software libraries you need to access Informix adaptors from EOF |
| EOIOracleAdaptor.pkg | Contains header files and software libraries you need to access Oracle adaptors from EOF |
| EOISybaseAdaptor.pkg | Contains header files and software libraries you need to access Sybase adaptors from EOF |

In addition to these packages, the *OpenStep Developer for Mach* CD-ROM contains many other files, which you shouldn't generally have to use. These files are the same as those installed by the packages. They're provided in case you need to retrieve a file that you've accidentally deleted, or in case you wish to use the documentation on CD-ROM instead of installing it on your hard disk.

Installing Enterprise Objects Framework Release 1.2 for Mach takes about 30 minutes.

Preparing to Install Enterprise Objects Framework Release 1.2 for Mach

1. Make sure your computer is running OpenStep Release 4.0 for Mach.

To find the OpenStep version, click the Workspace Manager application's Info Panel command in the Info menu. The Info panel that's displayed shows the release of OpenStep that you are running.

2. Determine whether your computer will export its copy of the Enterprise Objects Framework tools to other computers.

If your computer is the only one that will use this copy of the tools, you can install them (as described later) so that they run only on your computer's architecture. However, if your computer exports the tools over NFS, you might need to install the tools so that they run on multiple architectures. Installing the tools for additional architectures requires about 5 MB more disk space for each architecture.

3. Determine which computer architectures might run the applications you create.

When you install the libraries (as described below), you must specify each architecture that the applications you create need to run on. However, if your applications will be deployed only on the same architecture as you're developing on, you can install libraries that just support your computer's architecture.

4. Make sure you have enough disk space.

You need about 20 MB of free space on your hard disk to install the Enterprise Objects Framework packages with tools that run on on only one architecture. If the CD-ROM drive isn't already connected, turn off the computer, connect the CD-ROM drive, and restart the computer.

5. If the CD-ROM drive isn't already connected, turn off the computer, connect the CD-ROM drive, and restart the computer.

6. Log in as root.

Only the superuser, root, can install Enterprise Objects Framework Release 1.2 for Mach. If you're not sure how to log in as root, see your system administrator.

7. In /NextLibrary/Receipts, deinstall EODeveloper.pkg. Double-click the package and click the Delete button in its Installer package window, click Delete again to confirm that you want to delete the package.

8. Insert the *OpenStep Developer for Mach* CD-ROM. When it appears in the File Viewer, click it to select it.

Now you're ready to install the Enterprise Objects Framework Release 1.2 for Mach tools, libraries, and documentation, as described below.

Installing the tools

1. Double-click the EOFDevelopers.pkg file in the /NextCD/Packages directory on the *OpenStep Developer for Mach* CD-ROM.

2. Click the Install button in the Installer package window.

An Install Package panel opens, where you select which architectures the files should be installed for. Your computer's architecture is already selected.

3. Select any additional architectures you wish with the development tools to run on.

4. Click Install in the Install Package panel.

5. Make sure your computer is running OpenStep Release 4.0 for Mach (which you can check on the Workspace Manager's Info panel). If your computer isn't running OpenStep Release 4.0 for Mach, click Cancel. Don't continue with this installation until you've upgraded your computer to OpenStep Release 4.0 for Mach.

If you've deleted EODevelopers.pkg and your computer is running OpenStep Release 4.0 for Mach, click Continue.

The Installer window displays information about the progress of the installation. Installation takes up to 30 minutes.

Installing EOFUser

1. Double-click the EOFUser.pkg file in the /NextCD/Packages directory on the *OpenStep Developer for Mach* CD-ROM.

2. Click the Install button in the Installer package window.

An Install Package panel opens, where you select which architectures the files should be installed for. Your computer's architecture is already selected.

3. Select the additional architectures you wish to develop for.

Important: You should select every architecture that might run the applications you create.

4. Click Install in the Install Package panel

What is claimed is:

1. A program storage device readable by a machine, tangibly embodying a program of instructions executable by the machine to perform method steps for monitoring changes made to an object graph comprising a plurality of data bearing objects containing data from a database, said method steps comprising the steps of:

prior to making any change to a first data bearing object in said object graph, in response to an event that initiates execution of application code, transmitting a message indicating that said first data bearing object expects to undergo a change from said first data bearing object to an object graph manager;

taking a snapshot of said first data bearing object upon said object graph manager receiving said message indicating said expected change;

making one or more changes to said first data bearing object during said execution of application code in response to said event;

transmitting a message indicating.an end of said execution of application code in response to said event to said object graph manager; and identifying said change made to said first data bearing object upon said object graph manager receiving said message indicating said end of execution by comparing said data bearing object after said change has been made to said snapshot of said object.

2. The program storage device of claim 1 in which said method further comprises the steps of:

transmitting a message indicating that said first data bearing object has undergone a change from said object graph manager to an interested object.

3. The program storage device of claim 2 in which said method further comprises the steps of:

transmitting a message indicating how said first data bearing object has changed from said object graph manager to an interested object.

4. The program storage device of claim 3 in which said interested object is an object registered with said object graph manager as an object to be informed of any changes to said first data bearing object.

5. The program storage device of claim 4 wherein said step of transmitting a message indicating that said first data bearing object expects to undergo a change comprises the steps of:

registering said object graph manager as an observer with said first data bearing object; and broadcasting said message indicating that said first data bearing object expects to undergo a change from said first data bearing object to registered observers of said data bearing object.

6. The program storage device of claim 5 in which said interested object comprises a user interface manager object managing values displayed in a user interface, and further comprising the steps of:

after said user interface manager object has received said message indicating that said first data bearing object has undergone change, transmitting a message from said user interface manager object to said first data bearing object requesting values for data of said first data bearing object;

transmitting said values for said data of said first data bearing object from said first data bearing object to said user interface manager object; and updating said values displayed in said user interface corresponding to said values for said data of said first data bearing object.

7. A computer system comprising:

a processor;

a memory coupled to said processor;

object code executed by said processor that provides at least one method for monitoring changes made to an object graph comprising a plurality of data bearing objects containing data from a database;

said object code configured to:

prior to making any change to a first data bearing object in said object graph in response to an event that initiates execution of application code, transmit a message indicating that said first data bearing object expects to undergo a change from said first data bearing object to an object graph manager;

take a snapshot of said first data bearing object upon said object graph manager receiving said message indicating said expected change;

make one or more changes to said first data bearing object during said execution of application code in response to said event;

transmit a message indicating an end of said execution of application code in response to said event to said object graph manager.

8. The computer system of claim 7 wherein said object code executed by said processor configured to monitor changes made to an object graph comprising a plurality of data bearing objects containing data from a database, further comprises:

object code executed by said processor configured to transmit a message indicating that said first data bearing object has undergone a change from said object graph manager to an interested object.

9. The computer system of claim 8 wherein said interested object is an object registered with said object graph manager as an object to be informed of any changes to said first data bearing object.

10. The computer system of claim 7, wherein said object code for transmitting a message indicating that said first data bearing object expects to undergo a change comprises object code executed by said processor to:

register said object graph manager as an observer with said first data bearing object;

broadcast said message indicating that said first data bearing object expects to undergo a change from said first data bearing object to registered observers of said data bearing object.

11. The computer system of claim 8 wherein said interested object comprises a user interface manager object managing values displayed in a user interface, and further comprises object code configured to:

indicate, after said user interface manager object has received said message, that said first data bearing object has undergone a change transmit a message from said user interface manager object to said first data bearing object requesting values for data of said first data bearing object;

transmit said values for said data of said first data bearing object from said first data bearing object to said user interface manager object, update said values displayed in said user interface corresponding to said values for said data of said first data bearing object.

12. A computer system comprising:

a processor;

a memory coupled to said processor;

object code executed by said processor that provides at least one method for modifying a database in accordance with changes made to an object graph comprising a plurality of data bearing objects containing data from said database;

said object code configured to:
- prior to making any change to a first data bearing object in said object graph, transmit a message indicating an expected change to said first data bearing object to an object graph manager;
- take a snapshot of said first data bearing object upon said object graph manager receiving said message indicating said expected change;
- make one or more changes to said first data bearing object;
- transmit a commit message to said object graph manager requesting that changes made to said first data bearing object be committed to said database;
- take a second snapshot of said first data bearing object upon said object graph manager receiving said commit message;
- detect said one or more changes to said first data bearing object by comparing said second snapshot to said first snapshot;
- store data corresponding to said detected one or more changes in said database.

13. The computer system of claim 12, wherein said object code executed by said processor configured to provide at least one method for modifying a database in accordance with changes made to an object graph comprising a plurality of data bearing objects containing data from said database, comprises:
- object code executed by said processor configured to store data corresponding to said detected one or more changes in said database comprising the step of sending a change request from said object graph manager to an object store.

14. The computer system of claim 13 wherein said object store comprises an object store coordinator that interfaces between said object graph manager and a plurality of databases.

15. The computer system of claim 14 wherein said plurality of databases comprise databases distributed over a computer network.

16. A computer system comprising:
a processor;
a memory coupled to said processor;
object code executed by said processor that provides at least one method for undoing changes made to an object graph comprising a plurality of data bearing objects containing data from a database;
said object code configured to:
- prior to making any change to a first data bearing object in said object graph in response to an event that initiates execution of application code, transmit a message indicating that said first data bearing object expects to undergo a change from said first data bearing object to an object graph manager;
- take a snapshot of said first data bearing object upon said object graph manager receiving said message indicating said expected change;
- make one or more changes to said first data bearing object during said execution of application code in response to said event;
- transmit a message indicating an end of said execution of application code in response to said event to said object graph manager; record said snapshot on an undo stack.

17. The computer system of claim 16, wherein said object code executed by said processor configured to undo changes made to an object graph comprising a plurality of data bearing objects containing data from a database, comprises:
- object code executed by said processor configured to determine whether a previous snapshot of said data bearing object has already been taken during said execution of application code in response to said event prior to taking said snapshot of said data bearing, and taking said snapshot only if no such previous snapshot has been taken.

18. The computer system of claim 16, wherein said object code executed by said processor configured to undo changes made to an object graph comprising a plurality of data bearing objects containing data from a database, comprises:
- object code executed by said processor configured to:
  - record said snapshot in a recent snapshot table after taking said snapshot; and
  - clear said recent snapshot table after recording said snapshot on said undo stack.

* * * * *